(12) United States Patent
Zediker et al.

(10) Patent No.: US 9,327,810 B2
(45) Date of Patent: *May 3, 2016

(54) HIGH POWER LASER ROV SYSTEMS AND METHODS FOR TREATING SUBSEA STRUCTURES

(71) Applicant: Foro Energy, Inc., Houston, TX (US)

(72) Inventors: Mark S Zediker, Castle Rock, CO (US); Brian O Faircloth, Evergreen, CO (US); Charles C Rinzler, Boston, MA (US)

(73) Assignee: Foro Energy, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,172

(22) Filed: Jul. 2, 2015

(65) Prior Publication Data

US 2015/0307174 A1 Oct. 29, 2015

Related U.S. Application Data

(63) Continuation of application No. 13/347,445, filed on Jan. 10, 2012, now Pat. No. 9,080,425, which is a continuation-in-part of application No. 13/210,581, filed on Aug. 16, 2011, now Pat. No. 8,662,160, and a (Continued)

(51) Int. Cl.
*B63C 11/44* (2006.01)
*B63C 11/40* (2006.01)
*B63C 11/48* (2006.01)
*E21B 41/04* (2006.01)
*B63G 8/00* (2006.01)

(Continued)

(52) U.S. Cl.
CPC .............. *B63G 8/001* (2013.01); *B08B 7/0071* (2013.01); *B08B 9/023* (2013.01); *B08B 9/027* (2013.01); *E21B 41/04* (2013.01); *B63G 2008/007* (2013.01); *G02B 6/4296* (2013.01)

(58) Field of Classification Search
CPC ............................ B63G 8/00; B63G 2008/005
USPC .............. 405/190, 191, 185, 192, 193, 154.1; 219/121.67, 121.72
See application file for complete search history.

(56) References Cited

U.S. PATENT DOCUMENTS 914,636 A 3/1909 Case
2,548,463 A 4/1951 Blood
(Continued)

FOREIGN PATENT DOCUMENTS

EP 0 295 045 A2 12/1988
EP 0 515 983 A1 12/1992
(Continued)

OTHER PUBLICATIONS

U.S. Appl. No. 12/543,986, filed Aug. 19, 2013, Moxley et al.
(Continued)

*Primary Examiner* — Benjamin Fiorello
*Assistant Examiner* — Edwin Toledo-Duran
(74) *Attorney, Agent, or Firm* — Glen P. Belvis; Steptoe & Johnson

(57) ABSTRACT

There is provided a high power laser system for powering a remotely located laser device, such as an ROV, using a high power laser fiber optic tether and a photo-conversion device, such as a laser photovoltaic assembly. Laser device systems, such as ROV systems that utilizes a high power laser cutting and/or cleaning tools are also provided.

38 Claims, 20 Drawing Sheets

Related U.S. Application Data continuation-in-part of application No. 12/840,978, filed on Jul. 21, 2010, now Pat. No. 8,571,368, and a continuation-in-part of application No. 12/706,576, filed on Feb. 16, 2010, and a continuation-in-part of application No. 12/544,136, filed on Aug. 19, 2009, now Pat. No. 8,511,401, and a continuation-in-part of application No. 12/543,968, filed on Aug. 19, 2009, now Pat. No. 8,636,085.

(60) Provisional application No. 61/493,174, filed on Jun. 3, 2011, provisional application No. 61/431,830, filed on Feb. 7, 2011, provisional application No. 61/431,827, filed on Jan. 11, 2011, provisional application No. 61/374,594, filed on Aug. 17, 2010, provisional application No. 61/295,562, filed on Jan. 15, 2010, provisional application No. 61/153,271, filed on Feb. 17, 2009, provisional application No. 61/106,472, filed on Oct. 17, 2008.

(51) Int. Cl.
*B08B 7/00* (2006.01)
*B08B 9/023* (2006.01)
*B08B 9/027* (2006.01)
*G02B 6/42* (2006.01)

(56) References Cited

U.S. PATENT DOCUMENTS

| | | | |
|---|---|---|---|
| 2,742,555 A | 4/1956 | Murray | |
| 3,122,212 A | 2/1964 | Karlovitz | |
| 3,383,491 A | 5/1968 | Muncheryan | |
| 3,461,964 A * | 8/1969 | Venghiattis | E21B 7/15 166/297 |
| 3,493,060 A | 2/1970 | Van Dyk | |
| 3,503,804 A | 3/1970 | Schneider at al. | |
| 3,539,221 A | 11/1970 | Gladstone | |
| 3,544,165 A | 12/1970 | Snedden | |
| 3,556,600 A | 1/1971 | Shoupp et al. | |
| 3,574,357 A | 4/1971 | Alexandru | |
| 3,586,413 A | 6/1971 | Adams | |
| 3,652,447 A | 3/1972 | Yant | |
| 3,693,718 A | 9/1972 | Stout | |
| 3,699,649 A | 10/1972 | McWilliams | |
| 3,802,203 A | 4/1974 | Ichise et al. | |
| 3,820,605 A | 6/1974 | Barber at al. | |
| 3,821,510 A | 6/1974 | Muncheryan | |
| 3,823,788 A | 7/1974 | Garrison et al. | |
| 3,871,485 A | 3/1975 | Keenan, Jr. | |
| 3,882,945 A | 5/1975 | Keenan, Jr. | |
| 3,938,599 A | 2/1976 | Horn | |
| 3,960,448 A | 6/1976 | Schmidt et al. | |
| 3,977,478 A | 8/1976 | Shuck | |
| 3,992,095 A | 11/1976 | Jacoby et al. | |
| 3,998,281 A | 12/1976 | Salisbury et al. | |
| 4,019,331 A | 4/1977 | Rom et al. | |
| 4,025,091 A | 5/1977 | Zeile, Jr. | |
| 4,026,356 A | 5/1977 | Shuck | |
| 4,047,580 A | 9/1977 | Yahiro et al. | |
| 4,057,118 A | 11/1977 | Ford | |
| 4,061,190 A | 12/1977 | Bloomfield | |
| 4,066,138 A | 1/1978 | Salisbury et al. | |
| 4,090,572 A | 5/1978 | Welch | |
| 4,113,036 A | 9/1978 | Stout | |
| 4,125,757 A | 11/1978 | Ross | |
| 4,151,393 A | 4/1979 | Fenneman et al. | |
| 4,162,400 A | 7/1979 | Pitts, Jr. | |
| 4,189,705 A | 2/1980 | Pitts, Jr. | |
| 4,194,536 A | 3/1980 | Stine et al. | |
| 4,199,034 A | 4/1980 | Salisbury et al. | |
| 4,227,582 A * | 10/1980 | Price | E21B 7/15 166/297 |
| 4,228,856 A | 10/1980 | Reale | |
| 4,243,298 A | 1/1981 | Kao et al. | |
| 4,249,925 A | 2/1981 | Kawashima | |
| 4,252,015 A | 2/1981 | Harbon et al. | |
| 4,256,146 A | 3/1981 | Genini et al. | |
| 4,266,609 A | 5/1981 | Rom et al. | |
| 4,280,535 A | 7/1981 | Willis | |
| 4,281,891 A | 8/1981 | Shinohara et al. | |
| 4,282,940 A | 8/1981 | Salisbury et al. | |
| 4,332,401 A | 6/1982 | Stephenson et al. | |
| 4,336,415 A | 6/1982 | Walling | |
| 4,340,245 A | 7/1982 | Stalder | |
| 4,367,917 A | 1/1983 | Gray | |
| 4,370,886 A | 2/1983 | Smith, Jr. et al. | |
| 4,374,530 A | 2/1983 | Walling | |
| 4,375,164 A | 3/1983 | Dodge et al. | |
| 4,389,645 A | 6/1983 | Wharton | |
| 4,415,184 A | 11/1983 | Stephenson et al. | |
| 4,417,603 A | 11/1983 | Argy | |
| 4,423,980 A | 1/1984 | Warnock | |
| 4,436,177 A | 3/1984 | Elliston | |
| 4,444,420 A | 4/1984 | McStravick et al. | |
| 4,453,570 A | 6/1984 | Hutchison | |
| 4,459,731 A | 7/1984 | Hutchison | |
| 4,477,106 A | 10/1984 | Hutchison | |
| 4,504,112 A | 3/1985 | Gould et al. | |
| 4,522,464 A | 6/1985 | Thompson et al. | |
| 4,531,552 A | 7/1985 | Kim | |
| 4,565,351 A | 1/1986 | Conti et al. | |
| 4,575,610 A * | 3/1986 | Gavin | F16P 1/06 219/121.6 |
| 4,621,926 A * | 11/1986 | Merry | G01B 11/005 33/503 |
| 4,662,437 A | 5/1987 | Renfro | |
| 4,694,865 A | 9/1987 | Tauschmann | |
| 4,725,116 A | 2/1988 | Spencer et al. | |
| 4,741,405 A | 5/1988 | Moeny et al. | |
| 4,744,420 A | 5/1988 | Patterson | |
| 4,770,493 A | 9/1988 | Ara et al. | |
| 4,793,383 A | 12/1988 | Gyory et al. | |
| 4,820,899 A * | 4/1989 | Hikima | B23K 26/067 219/121.74 |
| 4,830,113 A | 5/1989 | Geyer | |
| 4,850,450 A * | 7/1989 | Hoyle | G01V 1/523 181/102 |
| 4,860,654 A | 8/1989 | Chawla et al. | |
| 4,860,655 A | 8/1989 | Chawla | |
| 4,872,520 A | 10/1989 | Nelson | |
| 4,924,870 A | 5/1990 | Wlodarczyk et al. | |
| 4,952,771 A | 8/1990 | Wrobel | |
| 4,989,236 A | 1/1991 | Myllymäki | |
| 4,997,250 A | 3/1991 | Ortiz, Jr. | |
| 5,003,144 A | 3/1991 | Lindroth et al. | |
| 5,004,166 A | 4/1991 | Sellar | |
| 5,009,482 A * | 4/1991 | Lincoln | G02B 6/32 385/35 |
| 5,011,282 A * | 4/1991 | Ream | B23K 26/043 219/121.78 |
| 5,033,545 A | 7/1991 | Sudol | |
| 5,049,738 A | 9/1991 | Gergely et al. | |
| 5,066,294 A * | 11/1991 | Cosmescu | A61B 18/20 356/138 |
| 5,084,617 A | 1/1992 | Gergely | |
| 5,086,842 A | 2/1992 | Cholet | |
| 5,107,936 A | 4/1992 | Foppe | |
| 5,121,872 A | 6/1992 | Legget | |
| 5,125,061 A | 6/1992 | Marlier et al. | |
| 5,125,063 A | 6/1992 | Panuska et al. | |
| 5,128,882 A | 7/1992 | Cooper et al. | |
| 5,140,664 A | 8/1992 | Bosisio et al. | |
| 5,142,138 A * | 8/1992 | Yonezawa | B41F 33/027 250/208.1 |
| 5,163,321 A | 11/1992 | Perales | |
| 5,168,940 A | 12/1992 | Foppe | |
| 5,172,112 A | 12/1992 | Jennings | |
| 5,207,533 A * | 5/1993 | Federspiel | E21B 7/30 405/156 |
| 5,212,755 A | 5/1993 | Holmberg | |
| 5,269,377 A | 12/1993 | Martin | |
| 5,285,204 A | 2/1994 | Sas-Jaworsky | |

(56) References Cited

U.S. PATENT DOCUMENTS

| | | | |
|---|---|---|---|
| 5,308,951 A | 5/1994 | Mori | |
| 5,348,097 A | 9/1994 | Giannesini et al. | |
| 5,351,533 A | 10/1994 | Macadam et al. | |
| 5,353,875 A | 10/1994 | Schultz et al. | |
| 5,355,967 A | 10/1994 | Mueller et al. | |
| 5,356,081 A | 10/1994 | Sellar | |
| 5,396,805 A | 3/1995 | Surjaatmadja | |
| 5,411,081 A | 5/1995 | Moore et al. | |
| 5,411,085 A | 5/1995 | Moore et al. | |
| 5,411,105 A | 5/1995 | Gray | |
| 5,413,045 A | 5/1995 | Miszewski | |
| 5,413,170 A | 5/1995 | Moore | |
| 5,418,350 A | 5/1995 | Freneaux et al. | |
| 5,419,188 A | 5/1995 | Rademaker et al. | |
| 5,423,383 A | 6/1995 | Pringle | |
| 5,425,420 A | 6/1995 | Pringle | |
| 5,430,816 A * | 7/1995 | Furuya | B23K 26/067 219/121.6 |
| 5,435,351 A | 7/1995 | Head | |
| 5,435,395 A | 7/1995 | Connell | |
| 5,463,711 A | 10/1995 | Chu | |
| 5,465,793 A | 11/1995 | Pringle | |
| 5,469,878 A | 11/1995 | Pringle | |
| 5,479,860 A | 1/1996 | Ellis | |
| 5,483,988 A | 1/1996 | Pringle | |
| 5,488,992 A | 2/1996 | Pringle | |
| 5,500,768 A | 3/1996 | Doggett et al. | |
| 5,503,014 A | 4/1996 | Griffith | |
| 5,503,370 A | 4/1996 | Newman et al. | |
| 5,505,259 A | 4/1996 | Wittrisch et al. | |
| 5,515,926 A | 5/1996 | Boychuk | |
| 5,526,887 A | 6/1996 | Vestavik | |
| 5,561,516 A | 10/1996 | Noble et al. | |
| 5,566,764 A | 10/1996 | Elliston | |
| 5,573,225 A | 11/1996 | Boyle et al. | |
| 5,577,560 A | 11/1996 | Coronado et al. | |
| 5,586,609 A | 12/1996 | Schuh | |
| 5,599,004 A | 2/1997 | Newman et al. | |
| 5,615,052 A | 3/1997 | Doggett | |
| 5,638,904 A | 6/1997 | Misselbrook et al. | |
| 5,655,745 A | 8/1997 | Morrill | |
| 5,694,408 A | 12/1997 | Bott et al. | |
| 5,707,939 A | 1/1998 | Patel | |
| 5,757,484 A | 5/1998 | Miles et al. | |
| 5,759,859 A | 6/1998 | Sausa | |
| 5,771,984 A | 6/1998 | Potter et al. | |
| 5,772,656 A * | 6/1998 | Klopotek | A61F 9/00804 219/121.6 |
| 5,773,791 A | 6/1998 | Kuykendal | |
| 5,794,703 A | 8/1998 | Newman et al. | |
| 5,813,465 A | 9/1998 | Terrell et al. | |
| 5,825,958 A * | 10/1998 | Gollihar | A61B 18/22 372/6 |
| 5,828,003 A | 10/1998 | Thomeer et al. | |
| 5,832,006 A | 11/1998 | Rice et al. | |
| 5,833,003 A | 11/1998 | Longbottom et al. | |
| 5,847,825 A | 12/1998 | Alexander | |
| 5,862,273 A | 1/1999 | Pelletier | |
| 5,862,862 A | 1/1999 | Terrell | |
| 5,896,482 A | 4/1999 | Blee et al. | |
| 5,896,938 A | 4/1999 | Moeny et al. | |
| 5,902,499 A | 5/1999 | Richerzhagen | |
| 5,909,306 A | 6/1999 | Goldberg et al. | |
| 5,913,337 A | 6/1999 | Williams et al. | |
| 5,924,489 A | 7/1999 | Hatcher | |
| 5,929,986 A | 7/1999 | Slater et al. | |
| 5,933,945 A | 8/1999 | Thomeer et al. | |
| 5,938,954 A | 8/1999 | Onuma et al. | |
| 5,947,051 A * | 9/1999 | Geiger | B62D 57/00 114/222 |
| 5,973,783 A | 10/1999 | Goldner et al. | |
| 5,986,756 A | 11/1999 | Slater et al. | |
| 5,995,882 A * | 11/1999 | Patterson | B63C 11/42 114/312 |
| RE36,525 E | 1/2000 | Pringle | |
| 6,015,015 A | 1/2000 | Luft et al. | |
| 6,038,363 A | 3/2000 | Slater et al. | |
| 6,059,037 A | 5/2000 | Longbottom et al. | |
| 6,060,662 A | 5/2000 | Rafie et al. | |
| 6,065,540 A | 5/2000 | Thomeer et al. | |
| RE36,723 E | 6/2000 | Moore et al. | |
| 6,076,602 A | 6/2000 | Gano et al. | |
| 6,092,601 A | 7/2000 | Gano et al. | |
| 6,104,022 A | 8/2000 | Young et al. | |
| RE36,880 E | 9/2000 | Pringle | |
| 6,116,344 A | 9/2000 | Longbottom et al. | |
| 6,135,206 A | 10/2000 | Gano et al. | |
| 6,147,754 A | 11/2000 | Theriault et al. | |
| 6,157,893 A | 12/2000 | Berger et al. | |
| 6,166,546 A | 12/2000 | Scheihing et al. | |
| 6,180,913 B1 | 1/2001 | Kolmeder et al. | |
| 6,215,734 B1 | 4/2001 | Moeny et al. | |
| 6,227,300 B1 | 5/2001 | Cunningham | |
| 6,250,391 B1 | 6/2001 | Proudfoot | |
| 6,265,653 B1 * | 7/2001 | Haigh et al. | 136/249 |
| 6,273,193 B1 | 8/2001 | Hermann et al. | |
| 6,275,645 B1 | 8/2001 | Vereecken et al. | |
| 6,281,489 B1 | 8/2001 | Tubel et al. | |
| 6,301,423 B1 | 10/2001 | Olson | |
| 6,309,195 B1 | 10/2001 | Bottos et al. | |
| 6,317,387 B1 * | 11/2001 | D'Amaddio | G01N 29/11 114/222 |
| 6,321,839 B1 | 11/2001 | Vereecken et al. | |
| 6,352,114 B1 | 3/2002 | Toalson et al. | |
| 6,355,928 B1 | 3/2002 | Skinner et al. | |
| 6,356,683 B1 | 3/2002 | Hu et al. | |
| 6,377,591 B1 | 4/2002 | Hollister et al. | |
| 6,384,738 B1 | 5/2002 | Carstensen et al. | |
| 6,386,300 B1 | 5/2002 | Curlett et al. | |
| 6,401,825 B1 | 6/2002 | Woodrow | |
| 6,426,479 B1 | 7/2002 | Bischof | |
| 6,437,326 B1 | 8/2002 | Yamate et al. | |
| 6,450,257 B1 | 9/2002 | Douglas | |
| 6,494,259 B2 | 12/2002 | Surjaatmadja | |
| 6,497,290 B1 | 12/2002 | Misselbrook et al. | |
| 6,536,743 B2 * | 3/2003 | Selcer et al. | 254/333 |
| 6,555,784 B2 * | 4/2003 | Iehisa | B23K 26/0604 219/121.76 |
| 6,557,249 B1 | 5/2003 | Pruett et al. | |
| 6,561,289 B2 | 5/2003 | Portman et al. | |
| 6,564,046 B1 | 5/2003 | Chateau | |
| 6,584,382 B2 * | 6/2003 | Karem | G05D 1/0038 701/3 |
| 6,591,046 B2 | 7/2003 | Stottlemyer | |
| 6,615,922 B2 | 9/2003 | Deul et al. | |
| 6,626,249 B2 | 9/2003 | Rosa | |
| 6,644,848 B1 | 11/2003 | Clayton et al. | |
| 6,661,815 B1 | 12/2003 | Kozlovsky et al. | |
| 6,672,407 B2 * | 1/2004 | Streich | E21B 49/02 166/338 |
| 6,710,720 B2 | 3/2004 | Carstensen et al. | |
| 6,712,150 B1 | 3/2004 | Misselbrook et al. | |
| 6,725,924 B2 | 4/2004 | Davidson et al. | |
| 6,747,743 B2 | 6/2004 | Skinner et al. | |
| 6,755,262 B2 | 6/2004 | Parker | |
| 6,808,023 B2 | 10/2004 | Smith et al. | |
| 6,832,654 B2 | 12/2004 | Ravensbergen et al. | |
| 6,847,034 B2 | 1/2005 | Shah et al. | |
| 6,851,488 B2 | 2/2005 | Batarseh | |
| 6,867,858 B2 | 3/2005 | Owen et al. | |
| 6,870,128 B2 | 3/2005 | Kobayashi et al. | |
| 6,874,361 B1 | 4/2005 | Meltz et al. | |
| 6,880,646 B2 | 4/2005 | Batarseh | |
| 6,885,784 B2 | 4/2005 | Bohnert | |
| 6,888,097 B2 | 5/2005 | Batarseh | |
| 6,888,127 B2 | 5/2005 | Jones et al. | |
| 6,912,898 B2 | 7/2005 | Jones et al. | |
| 6,913,079 B2 | 7/2005 | Tubel | |
| 6,920,395 B2 | 7/2005 | Brown | |
| 6,920,946 B2 | 7/2005 | Oglesby | |
| 6,923,273 B2 | 8/2005 | Terry et al. | |
| 6,957,576 B2 | 10/2005 | Skinner et al. | |
| 6,967,322 B2 | 11/2005 | Jones et al. | |
| 6,977,367 B2 | 12/2005 | Tubel et al. | |

(56) References Cited

U.S. PATENT DOCUMENTS

| | | | |
|---|---|---|---|
| 6,978,832 B2 | 12/2005 | Gardner et al. | |
| 6,981,561 B2 | 1/2006 | Krueger et al. | |
| 6,994,162 B2 | 2/2006 | Robison | |
| 7,038,164 B2 * | 5/2006 | Denney | B23K 26/032 219/121.67 |
| 7,038,166 B2 * | 5/2006 | Denney | B23K 26/032 219/121.68 |
| 7,040,746 B2 | 5/2006 | McCain et al. | |
| 7,055,604 B2 | 6/2006 | Jee et al. | |
| 7,055,629 B2 | 6/2006 | Oglesby | |
| 7,057,134 B2 * | 6/2006 | Denney | B23K 26/032 219/121.68 |
| 7,072,044 B2 | 7/2006 | Kringlebotn et al. | |
| 7,072,588 B2 | 7/2006 | Skinner | |
| 7,086,484 B2 | 8/2006 | Smith, Jr. | |
| 7,087,865 B2 | 8/2006 | Lerner | |
| 7,088,437 B2 | 8/2006 | Blomster et al. | |
| 7,126,332 B2 | 10/2006 | Blanz et al. | |
| 7,134,488 B2 | 11/2006 | Tudor et al. | |
| 7,134,514 B2 | 11/2006 | Riel et al. | |
| 7,140,435 B2 | 11/2006 | Defretin et al. | |
| 7,147,064 B2 | 12/2006 | Batarseh et al. | |
| 7,152,700 B2 | 12/2006 | Church et al. | |
| 7,163,875 B2 | 1/2007 | Richerzhagen | |
| 7,172,026 B2 | 2/2007 | Misselbrook | |
| 7,172,038 B2 | 2/2007 | Terry et al. | |
| 7,174,067 B2 | 2/2007 | Murshid et al. | |
| 7,188,687 B2 | 3/2007 | Rudd et al. | |
| 7,195,731 B2 | 3/2007 | Jones | |
| 7,196,786 B2 | 3/2007 | DiFoggio | |
| 7,199,869 B2 | 4/2007 | MacDougall | |
| 7,201,222 B2 | 4/2007 | Kanady et al. | |
| 7,210,343 B2 | 5/2007 | Shammai et al. | |
| 7,212,283 B2 | 5/2007 | Hother et al. | |
| 7,223,935 B2 | 5/2007 | Wessner | |
| 7,249,633 B2 | 7/2007 | Ravensbergen et al. | |
| 7,264,057 B2 | 9/2007 | Rytlewski et al. | |
| 7,270,195 B2 | 9/2007 | MacGregor et al. | |
| 7,273,108 B2 | 9/2007 | Misselbrook | |
| 7,286,223 B2 * | 10/2007 | Denney | B23K 26/03 356/318 |
| 7,289,206 B2 * | 10/2007 | Denney | B23K 26/03 356/318 |
| 7,334,637 B2 | 2/2008 | Smith, Jr. | |
| 7,337,660 B2 | 3/2008 | Ibrahim et al. | |
| 7,362,422 B2 | 4/2008 | DiFoggio et al. | |
| 7,365,285 B2 | 4/2008 | Toida | |
| 7,372,230 B2 | 5/2008 | McKay | |
| 7,394,064 B2 | 7/2008 | Marsh | |
| 7,395,696 B2 | 7/2008 | Bissonnette et al. | |
| 7,416,032 B2 | 8/2008 | Moeny et al. | |
| 7,416,258 B2 | 8/2008 | Reed et al. | |
| 7,424,190 B2 | 9/2008 | Dowd et al. | |
| 7,471,831 B2 | 12/2008 | Bearman et al. | |
| 7,487,834 B2 | 2/2009 | Reed et al. | |
| 7,490,664 B2 | 2/2009 | Skinner et al. | |
| 7,494,272 B2 | 2/2009 | Thomas et al. | |
| 7,503,404 B2 | 3/2009 | McDaniel et al. | |
| 7,515,782 B2 | 4/2009 | Zhang et al. | |
| 7,516,802 B2 | 4/2009 | Smith, Jr. | |
| 7,518,722 B2 | 4/2009 | Julian et al. | |
| 7,527,108 B2 | 5/2009 | Moeny | |
| 7,530,406 B2 | 5/2009 | Moeny et al. | |
| 7,559,378 B2 | 7/2009 | Moeny | |
| 7,587,111 B2 | 9/2009 | de Montmorillon et al. | |
| 7,600,564 B2 | 10/2009 | Shampine et al. | |
| 7,603,011 B2 | 10/2009 | Varkey et al. | |
| 7,617,873 B2 | 11/2009 | Lovell et al. | |
| 7,624,743 B2 | 12/2009 | Sarkar et al. | |
| 7,628,227 B2 | 12/2009 | Marsh | |
| 7,646,794 B2 | 1/2010 | Sakurai et al. | |
| 7,646,953 B2 | 1/2010 | Dowd et al. | |
| 7,647,948 B2 | 1/2010 | Quigley et al. | |
| 7,671,983 B2 | 3/2010 | Shammai et al. | |
| 7,715,664 B1 | 5/2010 | Shou et al. | |
| 7,720,323 B2 | 5/2010 | Yamate et al. | |
| 7,769,260 B2 | 8/2010 | Hansen et al. | |
| 7,802,384 B2 | 9/2010 | Kobayashi et al. | |
| 7,834,777 B2 | 11/2010 | Gold | |
| 7,843,633 B2 | 11/2010 | Nakamae et al. | |
| 7,848,368 B2 | 12/2010 | Gapontsev et al. | |
| 7,866,035 B2 * | 1/2011 | Cummings et al. | 29/831 |
| 7,900,699 B2 | 3/2011 | Ramos et al. | |
| 7,938,175 B2 | 5/2011 | Skinner et al. | |
| 8,011,454 B2 | 9/2011 | Castillo | |
| 8,074,332 B2 | 12/2011 | Keatch et al. | |
| 8,082,996 B2 | 12/2011 | Kocis et al. | |
| 8,091,638 B2 | 1/2012 | Dusterhoft et al. | |
| 8,109,345 B2 | 2/2012 | Jeffryes | |
| 8,175,433 B2 | 5/2012 | Caldwell et al. | |
| 2002/0007945 A1 | 1/2002 | Neuroth et al. | |
| 2002/0039465 A1 | 4/2002 | Skinner | |
| 2002/0185474 A1 | 12/2002 | Dunsky et al. | |
| 2002/0189806 A1 | 12/2002 | Davidson et al. | |
| 2003/0000741 A1 | 1/2003 | Rosa | |
| 2003/0053783 A1 | 3/2003 | Shirasaki | |
| 2003/0056990 A1 | 3/2003 | Oglesby | |
| 2003/0085040 A1 | 5/2003 | Hemphill | |
| 2003/0094281 A1 | 5/2003 | Tubel | |
| 2003/0132029 A1 | 7/2003 | Parker | |
| 2003/0145991 A1 | 8/2003 | Olsen | |
| 2003/0159283 A1 | 8/2003 | White | |
| 2003/0160164 A1 | 8/2003 | Jones et al. | |
| 2003/0226826 A1 | 12/2003 | Kobayashi et al. | |
| 2004/0006429 A1 | 1/2004 | Brown | |
| 2004/0016295 A1 | 1/2004 | Skinner et al. | |
| 2004/0020643 A1 | 2/2004 | Thomeer et al. | |
| 2004/0026382 A1 | 2/2004 | Richerzhagen | |
| 2004/0033017 A1 | 2/2004 | Kringlebotn et al. | |
| 2004/0074979 A1 | 4/2004 | McGuire | |
| 2004/0093950 A1 | 5/2004 | Bohnert | |
| 2004/0112642 A1 | 6/2004 | Krueger et al. | |
| 2004/0119471 A1 | 6/2004 | Blanz et al. | |
| 2004/0129418 A1 | 7/2004 | Jee et al. | |
| 2004/0195003 A1 | 10/2004 | Batarseh | |
| 2004/0206505 A1 | 10/2004 | Batarseh | |
| 2004/0207731 A1 | 10/2004 | Bearman et al. | |
| 2004/0211894 A1 | 10/2004 | Hother et al. | |
| 2004/0218176 A1 | 11/2004 | Shammai et al. | |
| 2004/0244970 A1 | 12/2004 | Smith, Jr. | |
| 2004/0252748 A1 | 12/2004 | Gleitman | |
| 2004/0256103 A1 | 12/2004 | Batarseh | |
| 2005/0007583 A1 | 1/2005 | DiFoggio | |
| 2005/0012244 A1 | 1/2005 | Jones | |
| 2005/0034857 A1 | 2/2005 | Defretin et al. | |
| 2005/0094129 A1 | 5/2005 | MacDougall | |
| 2005/0099618 A1 | 5/2005 | DiFoggio et al. | |
| 2005/0115741 A1 | 6/2005 | Terry et al. | |
| 2005/0121235 A1 | 6/2005 | Larsen et al. | |
| 2005/0189146 A1 | 9/2005 | Oglesby | |
| 2005/0201652 A1 | 9/2005 | Ellwood, Jr. | |
| 2005/0230107 A1 | 10/2005 | McDaniel et al. | |
| 2005/0252286 A1 | 11/2005 | Ibrahim et al. | |
| 2005/0263281 A1 | 12/2005 | Lovell et al. | |
| 2005/0263497 A1 | 12/2005 | Lehane et al. | |
| 2005/0268704 A1 | 12/2005 | Bissonnette et al. | |
| 2005/0269132 A1 | 12/2005 | Batarseh et al. | |
| 2005/0272512 A1 | 12/2005 | Bissonnette et al. | |
| 2005/0272513 A1 | 12/2005 | Bissonnette et al. | |
| 2005/0272514 A1 | 12/2005 | Bissonnette et al. | |
| 2005/0282645 A1 | 12/2005 | Bissonnette et al. | |
| 2006/0038997 A1 | 2/2006 | Julian | |
| 2006/0048800 A1 * | 3/2006 | Rast | A47L 1/02 134/56 R |
| 2006/0049345 A1 | 3/2006 | Rao et al. | |
| 2006/0065815 A1 | 3/2006 | Jurca | |
| 2006/0070770 A1 | 4/2006 | Marsh | |
| 2006/0102343 A1 | 5/2006 | Skinner et al. | |
| 2006/0102607 A1 | 5/2006 | Adams et al. | |
| 2006/0118303 A1 | 6/2006 | Schultz et al. | |
| 2006/0137875 A1 | 6/2006 | Dusterhoft et al. | |
| 2006/0169677 A1 | 8/2006 | Deshi | |
| 2006/0185843 A1 | 8/2006 | Smith, Jr. | |
| 2006/0191684 A1 | 8/2006 | Smith, Jr. | |

(56) References Cited

U.S. PATENT DOCUMENTS

| | | |
|---|---|---|
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Dale et al. |
| 2007/0081157 A1 | 4/2007 | Csutak et al. |
| 2007/0125163 A1 | 6/2007 | Dria et al. |
| 2007/0167736 A1* | 7/2007 | Dietz .................. G01R 33/286 600/411 |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0023202 A1 | 1/2008 | Keatch et al. |
| 2008/0053702 A1 | 3/2008 | Smith, Jr. |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0124816 A1 | 5/2008 | Bruland et al. |
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2008/0314883 A1 | 12/2008 | Juodkazis et al. |
| 2009/0020333 A1 | 1/2009 | Marsh |
| 2009/0031870 A1 | 2/2009 | O'Connor |
| 2009/0033176 A1 | 2/2009 | Huang et al. |
| 2009/0045177 A1 | 2/2009 | Koseki et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0208295 A1* | 8/2009 | Kinert .................. E21B 17/006 405/224.2 |
| 2009/0260834 A1 | 10/2009 | Henson et al. |
| 2009/0266552 A1 | 10/2009 | Barra |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | De Montmorillon et al. |
| 2009/0281453 A1* | 11/2009 | Tsonton .................. A61B 5/055 600/567 |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler |
| 2010/0044103 A1 | 2/2010 | Moxley |
| 2010/0044104 A1 | 2/2010 | Zediker |
| 2010/0044105 A1 | 2/2010 | Faircloth |
| 2010/0044106 A1 | 2/2010 | Zediker |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0155059 A1 | 6/2010 | Ullah |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0197119 A1 | 8/2010 | Lai et al. |
| 2010/0215326 A1 | 8/2010 | Zediker |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0326659 A1 | 12/2010 | Schultz et al. |
| 2010/0326665 A1 | 12/2010 | Redlinger et al. |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt |
| 2012/0068086 A1 | 3/2012 | DeWitt |
| 2012/0068523 A1 | 3/2012 | Bowles |
| 2012/0074110 A1 | 3/2012 | Zediker |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0217015 A1 | 8/2012 | Zediker |
| 2012/0217017 A1 | 8/2012 | Zediker |
| 2012/0217018 A1 | 8/2012 | Zediker |
| 2012/0217019 A1 | 8/2012 | Zediker |
| 2012/0248078 A1 | 10/2012 | Zediker |
| 2012/0255774 A1 | 10/2012 | Grubb |
| 2012/0255933 A1 | 10/2012 | McKay |
| 2012/0261188 A1 | 10/2012 | Zediker |
| 2012/0266803 A1 | 10/2012 | Zediker et al. |
| 2012/0267168 A1 | 10/2012 | Grubb |
| 2012/0273269 A1* | 11/2012 | Rinzler .................. E21B 7/14 175/16 |
| 2012/0273470 A1 | 11/2012 | Zediker |
| 2012/0275159 A1 | 11/2012 | Fraze |
| 2013/0011102 A1 | 1/2013 | Rinzler |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev |
| 2013/0228557 A1 | 9/2013 | Zediker |
| 2013/0266031 A1 | 10/2013 | Norton |
| 2013/0319984 A1 | 12/2013 | Linyaev |

(56) References Cited

U.S. PATENT DOCUMENTS

| | | |
|---|---|---|
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0 565 287 A1 | 10/1993 |
| EP | 0 950 170 B1 | 9/2002 |
| FR | 2 716 924 A1 | 9/1995 |
| GB | 1 284 454 | 8/1972 |
| GB | 2420358 B | 5/2006 |
| JP | 09072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/366,882, filed Feb. 6, 2012, McKay et al.
U.S. Appl. No. 13/403,132, filed Feb. 23, 2012, Zediker et al.
U.S. Appl. No. 13/403,287, filed Feb. 23, 2012, Grubb et al.
U.S. Appl. No. 13/403,615, filed Feb. 23, 2012, Grubb et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,509, filed Feb. 23, 2012, Fraze et al.
U.S. Appl. No. 13/403,741, filed Feb. 23, 2012, Zediker et al.
U.S. Appl. No. 13/486,795, filed Feb. 23, 2012, Rinzler et al.
U.S. Appl. No. 13/565,345, filed Feb. 23, 2012, Zediker et al.
U.S. Appl. No. 13/768,149, filed Feb. 15, 2013, Zediker et al.
U.S. Appl. No. 13/777,650, filed Feb. 26, 2013, Zediker et al.
U.S. Appl. No. 13/782,869, filed Mar. 1, 2013, Schroit et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
International Search Report and Written Opinion for PCT App. No. PCT/US10/24368, dated Nov. 2, 2010, 16 pgs.
International Search Report for PCT Application No. PCT/US09/54295, dated Apr. 26, 2010, 16 pgs.
International Search Report for PCT Application No. PCT/US2011/044548, dated Jan. 24, 2012, 17 pgs.
International Search Report for PCT Application No. PCT/US2011/047902, dated Jan. 17, 2012, 9 pgs.
International Search Report for PCT Application No. PCT/US2011/050044 dated Feb. 1, 2012, 26 pgs.
International Search Report for PCT Application No. PCT/US2012/028277, dated May 30, 2012, 11 pgs.
International Search Report for PCT Application No. PCT/US2012/026265, dated May 30, 2012, 14 pgs.
International Search Report for PCT Application No. PCT/US2012/026280, dated May 30, 2012, 12 pgs.
International Search Report for PCT Application No. PCT/US2012/026337, dated Jun. 7, 2012, 21 pgs.
International Search Report for PCT Application No. PCT/US2012/026471, dated May 30, 2012, 13 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
International Search Report for PCT Application No. PCT/US2012/026494, dated May 31, 2012, 12 pgs.
International Search Report for PCT Application No. PCT/US2012/020789, dated Jun. 29, 2012, 9 pgs.
International Search Report for PCT Application No. PCT/US2012/040490, dated Oct. 22, 2012, 14 pgs.
International Search Report for PCT Application No. PCT/US2012/049338, dated Jan. 22, 2013, 14 pgs.
Abdulagatova, Z. et al., "Effect of Temperature and Pressure on the Thermal Conductivity of Sandstone", *international Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Agrawal Dinesh et al., "Microstructural by TEM of WC/Co composites Prepared by Conventional and Microwave Processes", Materials Research Lab, The Pennsylvania State University, *15th International Plansee Seminar*, vol. 2, . 2001, pp. 677-684.
Agrawal Dinesh et al., Report on "Development of Advanced Drill Components for BHA Using Mircowave Technology Incorporating

(56) References Cited

OTHER PUBLICATIONS

Carbide Diamond Composites and Functionally Graded Materials", Microwave Processing and Engineering Center, Material Research Institute, The Pennsylvania State University, 2003, 10 pgs.

Agrawal Dinesh et al., Report on "Graded Steele-Tungsten Cardide/Cobalt-Diamond Systems Using Microwave Heating", Material Research Institute, Penn State University, *Proceedings of the 2002 International Conference on Functionally Graded Materials*, 2002, pp. 50-58.

Agrawal Govind P., "Nonlinear Fiber Optics", Chap. 9, Fourth Edition, Academic Press copyright 2007, pp. 334-337.

Ahmadi, M. et al., "The Effect of Interaction Time and Saturation of Rock on Specific Energy in ND:YAG Laser Perforating", *Optics and Laser Technology*, vol. 43, 2011, pp. 226-231.

Ai, H.A. et al., "Simulation of dynamic response of granite: A numerical approach of shock-induced damage beneath impact craters", *International Journal of Impact Engineering*, vol. 33, 2006, pp. 1-10.

Akhatov, I. et al., "Collapse and Rebound of a Laser-Induced Cavitation Bubble", *Physics of Fluids*, vol. 13, No. 10, Oct. 2001, pp. 2805-2819.

Albertson, M, L. et al., "Diffusion of Submerged Jets", a paper for the *American Society of Civil Engineers*, Nov. 5, 1852, pp. 1571-1596.

Al-Harthi, A. A. et al., "The Porosity and Engineering Properties of Vesicular Basalt in Saudi Arabia", *Engineering Geology*, vol. 64, 1999, pp. 313-320.

Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.

Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.

Anovitz, L. M. et al., "A New Approach to Quantification of Metamorphism Using Ultra-Small and Small Angle Neutron Scattering": *Geochimica et Cosmochimica Acta*, vol. 73, 2009, pp. 7303-7324.

Anton, Richard J. et al., "Dynamic Vickers indentation of brittle materials", *Wear*, vol. 239, 2000, pp. 27-35.

Antonucci, V. et al., "Numerical and Experimental Study of a Concentrated Indentation Force on Polymer Matrix Composites", an excerpt from the *Proceedings of the COMSOL Conference*, 2009, 4 pages.

Aptukov, V. N., "Two Stages of Spallation", publisher unknown, while the date of the publication is unknown, it is believed to be prior to Aug. 19, 2009, 6 pages.

Ashby, M. F. et al., "The Failure of Brittle Solids Containing Small Cracks Under Compressive Stress States". *Acta Metall.*, vol. 34, No. 3, 1986, pp. 497-510.

ASTM International, "Standard Test Method for Thermal Conductivity of Solids by Means of the Guarded-Comparative-Longitudinal Heat Flow Technique", Standard under the fixed Designation E1225-09, 2009, pp. 1-9.

Atkinson, B. K., "Introduction to Fracture Mechanics and Its Geophysical Applications", *Fracture Mechanics of Rock*, 1987, pp. 1-26.

Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.

Author unknown, by RIO Technical Services, "Sub-Task 1: Current Capabilities of Hydraulic Motors. Air/Nitrogen Motors, and Electric Downhole Motors", a final report for Department of Energy National Petroleum Technology Office for the Contract Task 03NT30429, Jan. 30, 2004, 26 pages.

Avar, B. B. et al., "Porosity Dependence of the Elastic Modulof Lithophysae-rich Tuff: Numerical and Experimental Investigations", *International Journal of Rock Mechanics & Mining Sciences*, vol. 40, 2003, pp. 919-928.

Aydin, A. et al., "The Schmidt hammer in rock material characterization", *Engineering Geology*, vol. 81, 2005, pp. 1-14.

Backers, T. et al., "Tensile Fracture Propagation and Acoustic Emission Activity in Sandstone: The Effect of Loading Rate", *International Journal of Rock Mechanics & Mining Sciences*, vol. 42. 2005, pp. 1094-1101.

Baek, S.Y. et al., "Simulation of the Coupled Thermal/Optical Effects for Liquid Immersion Micro-/Nanolithography", source unknown, believed to be publically available prior to 2012, 13 pages.

Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.

Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.

Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.

Baird, J. A. "GEODYN: A Geological Formation/Drillstring Dynamics Computer Program", *Society of Petroleum Engineers of AIME*, 1964, 9 pgs.

Baird, J. A. et al., "Analyzing the Dynamic Behavior of Downhole Equipment During Drilling", government Sandia Report, SAND-84-0758C, DE84 008840, 7 pages.

Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.

Batarseh, S. I. et al., "Innovation in Wellbore Perforation Using High-Power Laser", *International Petroleum Technology Conference*, IPTC N0. 10981, Nov. 2005, 7 pages.

Batarseh, S. et al. "Well Perforation Using High-Power Lasers", *Society of Petroleum Engineers*, SPE 84418, 2003, pp. 1-10.

Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.

Baykasoglu, A. et al., "Prediction of Compressive and Tensile Strength of Limestone via Genetic Programming", *Expert Systems with Applications*, vol. 35, 2008, pp. 111-123.

BDM Corporation, Geothermal Completion Technology Life-Cycle Cost Model (GEOCOM), *Sandia National Laboratories*, for the U.S. Dept. of Energy, vols. 1 and 2, 1982, 222 pgs.

Bechtel SAIC Company LLC, "Heat Capacity Analysis", a report prepared for Department of Energy, Nov. 2004, 100 pages.

Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.

Belyaev, V. V., "Spall Damage Modelling and Dynamic Fracture Specificities of Ceramics", *Journal of Materials Processing Technology*, vol. 32, 1992, pp. 135-144.

Benavente, D. et al., "The Combined Influence of Mineralogical, Hygric and Thermal Properties on the Durability of PoroBuilding Stones", *Eur. J. Mineral*, vol. 20, Aug. 2008, pp. 673-685.

Beste, U. et al., "Micro-scratch evaluation of rock types—a means to comprehend rock drill wear", *Tribology International*, vol. 37. 2004, pp. 203-210.

Bieniawski, Z. T., "Mechanism of Brittle Fracture of Rock: Part I—Theory of the Fracture Process", *Int. J. Rock Mech. Min. Sci.*, vol. 4, 1967, pp. 395-406.

Bilotsky, Y. et al., "Modelling Multilayers Systems with Time-Depended Heaviside and New Transition Functions", excerpt from the Proceedings of the 2006 Nordic COMSOL Conference, 2006, 4 pages.

Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006, 27 pages.

Blackwell, B. F., "Temperature Profile in Semi-infinite Body With Exponential Source and Convective Boundary Condition", *Journal of Heat Transfer, Transactions of the ASME*, vol. 112, 1990, pp. 567-571.

(56) References Cited

OTHER PUBLICATIONS

Blackwell, D. D. et al., "Geothermal Resources in Sedimentary Basins", a presentation for the Geothermal Energy Generation in Oil and Gas Settings, Mar. 13, 2006, 28 pages.

Blair, S. C. et al., "Analysis of Compressive Fracture in Rock Using Statistical Techniques: Part I. A Non-linear Rule-based Mode", *Int. J. Rock Mech. Min. Sci.*, vol. 35 No. 7, 1998, pp. 837-848.

Blomqvist, M. et al., "All-in-Quartz Optics for Low Focal Shifts", *SPIE Photonics West Conference in San Francisco*, Jan. 2011, 12 pages.

Boechat, A. A. P. et al., "Bend Loss in Large Core Multimode Optical Fiber Beam Delivery Systems", *Applied Optics.*, vol. 30 No. 3, Jan. 20, 1991, pp. 321-327.

Balme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.

Britz, Dieter, "Digital Simulation in Electrochemistry", *Lect. Notes Phys.*, vol. 666, pp. 103-117.

Brown, G., "Development, Testing and Track Record of Fiber-Optic, Wet-Mate, Connectors", *IEEE*, 2003, pp. 83-88.

Browning, J. A. et al., "Recent Advances in Flame Jet Working of Minerals", *7th Symposium on Rock Mechanics*, Pennsylvania State Univ., 1965, pp. 281-313.

Brujan E. A. et al., "Dynamics of Laser-Induced Cavitation Bubbles Near an Elastic Bounder", *J. Fluid Mech.*, vol. 433, 2001, pp. 251-281.

Burdine, N. T., "Rock Failure Under Dynamic Loading Conditions", Society of Petroleum Engineers Journal, Mar. 1963, pp. 1-8.

Bybee, K., "Modeling Laser-Spallation Rock Drilling" *JPT*, an SPE available at www.spe.org/jpt, Feb. 2006, 2 pp. 62-63.

Bybee, Karen, highlight of "Drilling a Hole in Granite Submerged in Water by Use of CO2 Laser", an SPE available at www.spe.org/jpt, *JPT*, Feb. 2010, pp. 48, 50 and 51.

Cai, W. et al., "Strength of Glass from Hertzian Line Contact", *Optomechanics 2011: Innovations and Solutions*, 2011, 5 pages.

Capetta, I. S. et al., "Fatigue Damage Evaluation on Mechanical Components Under Multiaxial Loadings", European Comsol Conference, University of Ferrara, Oct. 16, 2009, 25 pages.

Cardenas, R., "Protected Polycrystalline Diamond Compact Bits for Hard Rock Drilling", Report No. DOE-99049-1381, *U.S. Department of Energy*, 2000, pp. 1-79.

Carstens, J. P. et al., "Rock Cutting by Laser", a paper of *Society of Petroleum Engineers of AIME*, 1971, 11 pages.

Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.

Caruso, C. et al., "Dynamic Crack Propagation in Fiber Reinforced Composites", Excerpt from the Proceedings of the COMSOL Conference, 2009, 5 pages.

Chastain, T. et al., "Deepwater Drilling Riser System", *SPE Drilling Engineering*, Aug. 1986, pp. 325-328.

Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.

Chen, K., paper titled "Analysis of Oil Film Interferometry Implementation in Non-Ideal Conditions", source unknown, Jan. 7, 2010, pp. 1-18.

Chraplyvy, A. R., "Limitations on Lightwave Communications Imposed by Optical-Fiber Nonlinearities", *Journal of Lightwave Technology*, vol. 8, No. 10, Oct. 1990, pp. 1548-1557.

Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.

Cimetiere, A. et al., "A Damage Model for Concrete Beams in Compression", *Mechanics Research Communications*, vol. 34, 2007, pp. 91-96.

Clegg, John et al., "Improved Optimisation of Bit Selection Using Mathematically Modelled Bit-Performance Indices", *IADC/SPE International 102287*, 2006, pp. 1-10.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Close, F. et al., "Successful Drilling of Basalt in a West of Shetland Deepwater Discovery", *SPE International 96575*, Society of Petroleum Engineers, 2006, pp. 1-10.

Cobern, Martin E., "Downhole Vibration Monitoring & Control System Quarterly Technical Report #1", *APS Technology, Inc.*, Quarterly Technical Report #1, DVMCS, 2003, pp. 1-15.

Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.

Cohen, J. H., "High-Power Slim-Hole Drilling System", a paper presented at the conference entitled Natural Gas RD&D Contractor's Review Meeting, Office of Scientific and Technical Information, Apr. 1995, 10 pages.

Cone, C., "Case History of the University Block 9 (Wolfcamp) Field—Gas-Water Injection Secondary Recovery Project", *Journal of Petroleum Technology*, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

Coray, P. S. et al., "Measurements on 5:1 Scale Abrasive Water Jet Cutting Head Models", source unknown, available prior to 2012, 15 pages.

Cruden, D. M., "The Static Fatigue of Brittle Rock Under Uniaxial Compression", *Int. J. Rock Mech. Min. Sci. & Geomech. Abstr.*, vol. 11, 1974, pp. 67-73.

da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.

Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.

Dahl, Filip et al., "Development of a new direct test method for estimating cutter life, based on the Sievers J miniature drill test", *Tunnelling and Underground Space Technology*, vol. 22, 2007, pp. 106-116.

Damzen, M. J. et al., "Stimulated Bullion Scattering", Chapter 8—SBS in Optical Fibres, OP Publishing Ltd, Published by Institute of Physics, London, England, 2003, pp. 137-153.

Das, A. C. et al., "Acousto-ultrasonic study of thermal shock damage in castable refractory", *Journal of Materials Science Letters*, vol. 10, 1991, pp. 173-175.

de Castro Lima, J. J. et al., "Linear Thermal Expansion of Granitic Rocks: Influence of Apparent Porosity, Grain Size and Quartz Content", *Bull Eng Geol Env.*, 2004, vol. 63, pp. 215-220.

De Guire, Mark R., "Thermal Expansion Coefficient (start)", *EMSE 201—Introduction to Materials Science & Engineering*, 2003, pp. 15.1-15.15.

Degallaix, J. et al., "Simulation of Bulk-Absorption Thermal Lensing in Transmissive Optics of Gravitational Waves Detector", *Appl. Phys.*, B77, 2003, pp. 409-414.

(56) References Cited

OTHER PUBLICATIONS

Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.

Diamond-Cutter Drill Bits, by Geothermal Energy Program, Office of Geothermal and Wind Technologies, 2000, 2 pgs.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.

Dinçer, Ismail et al., "Correlation between Schmidt hardness, uniaxial compressive strength and Young's modulfor andesites, basalts and tuffs", *Bull Eng Geol Env*, vol. 63, 2004, pp. 141-148.

Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.

Dumans, C. F. F. et al., "PDC Bit Selection Method Through the Analysis of Past Bit Performances", a paper prepared for presentation at the SPE (Society of Petroleum Engineers—Latin American Petroleum Engineering Conference), Oct. 1990, pp. 1-6.

Dunn, James C., "Geothermal Technology Development at Sandia", *Geothermal Research Division, Sandia National Laboratories*, 1987, pp. 1-6.

Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.

Dyskin, A. V. et al., "Asymptotic Analysis of Crack Interaction with Free Boundary", *International Journal of Solids and Structure*, vol. 37, 2000, pp. 857-886.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Eichler, H.J. et al., "Stimulated Brillouin Scattering in Multimode Fibers for Optical Phase Conjugation", *Optics Communications*, vol. 208, 2002, pp. 427-431.

Eighmy, T. T. et al., "Microfracture Surface Charaterizations: Implications for In Situ Remedial Methods in Fractured Rock", *Bedrock Bioremediation Center, Final Report, National Risk Management Research Laboratoty, Office of Research and Development, U.S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.

Ersoy, A., "Wear Characteristics of PDC Pin and Hybrid Core Bits in Rock Drilling", *Wear*, vol. 188, 1995, pp. 150-165.

Extreme Coil Drilling, by Extreme Drilling Corporation, 2009, 10 pgs.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Ferro, D. et al., "Vickers and Knoop hardness of electron beam deposited ZrC and HfC thin films on titanium", *Surface & Coatings Technology*, vol. 200, 2006, pp. 4701-4707.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Field. F. A., "A Simple Crack-Extension Criterion for Time-Dependent Spallation", *J. Mech. Phys. Solid*, vol. 19, 1971, pp. 61-70.

Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.

Finger, J. T. et al., "PDC Bit Research at Sandia National Laboratories", Sandia Report No. SAND89-0079-UC-253, a report prepared for Department of Energy, Jun. 1989, 88 pages.

Finger, John T. et al., "PDC Bit Research at Sandia National Laboratories", Sandia Report, *Geothermal Research Division 6252, Sandia National Laboratories*, SAND89-0879-UC-253, 1989, pp. 1-88.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C. et al., "Laser Drilling: Determination of Energy Required to Remove Rock", *Society of Petroleum Engineers* International, SPE 71466, 2001, pp. 1-11.

Gahan, B. C., et al., "Laser Drilling—Drilling with the Power of Light: High Energy Laser Perforation and Completion Techniques", Annual Technical Progress Report by the Gas Technology Institute, to the Department of Energy, Nov. 2006, 94 pages.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", *Society of Petroleum Engineers*, SPE 97093, 2005, pp. 1-7.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Gale, J. F. W. et al., "Natural Fractures in the Barnett Shale and Their Importance for Hydraulic Fracture Treatments", The American Assoction of Petroleum Geologists, *AAPG Bulletin*, vol. 91, No. 4, Apr. 2007, pp. 603-622.

Gardner, R. D. et al., "Flourescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

(56) References Cited

OTHER PUBLICATIONS

Glowka, David A. et al., "Progress in the Advanced Synthetic-Diamond Drill Bit Program", *Sandia National Laboratories*, SAND95-2617C, 1994, pp. 1-9.

Glowka, David A., "Design Considerations for a Hard-Rock PDC Drill Bit", *Geothermal Technology Development Division 6241, Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-UC-66c, 1987, pp. 1-206.

Glowka, David A., "The Use of Single—Cutter Data in the Analysis of PDC Bit Designs", *61st Annual Technical Conference and Exhibition of Society of Petroleum Engineers*, 1986, pp. 1-37.

Gonthier, F. "High-power All-Fiber® components: The missing link for high power fiber fasers", source unknown, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecients of surface and reservoir rocks at COIL, CO2 and Nd:YAG laser wavelenghts", source unknown, 13 pages.

Graves, R. M. et al., "StarWars Laser Technology Applied to Drilling and Completing Gas Wells", *SPE*, No. 49259, a paper prepared for presentation at the 1898 SPE Annual Technical Conference end Exhibition, 1998, pp. 761-770.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Dritling and Completing Oil and Natural Gas Weils", Topical Report, *Petroleum Engineering Department, Colorado School of Mines*, 2001, pp. 1-157.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "InhomogeneoBoundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Gurarie, V. N., "Stress Resistance Parameters of Brittle Solids Under Laser/Plasma Pulse Heating", *Materials Science and Engineering*, vol. A288, 2000, pp. 168-172.

Gurarie, V, N., "Stress resistance parameters of brittle solids under laser/plasma pulse heating" *Materials Science and Engineering*, vol. A288, 2000, pp. 168-172.

Habib, P. et al., "The Influence of Residual Stresses on Rock Hardness", *Rock Mechanics*, vol. 6, 1974, pp. 15-24.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hall, Kevin, "The role of thermal stress fatigue in the breakdown of rock in cold regions", *Geomorphology*, vol. 31, 1999, pp. 47-63.

Hammer, D. X. et al., "Shielding Properties of Laser-Induced Breakdown in Water for Pulse Durations from 5 ns. to 125 fs", *Applied Optics*, vol. 36, No. 22, Aug. 1, 1997, pp. 5630-5640.

Han, Wei, "Computational and experimental investigations of laser drilling and welding for microelectronic packaging", Dorchester Polytechnic Institute, A Dissertation submitted in May 2004, 242 pgs.

Hancock, M. J., "The 1-D Heat Equation: 18.303 Linear Partial Differential Equations", source unknown, 2004, pp. 1-41.

Hareland, G. et al., "Drag—Bit Model Including Wear", *SPE*, No. 26957, a paper prepared for presentation at the Latin American/Caribbean Petroleum Engineering Conference, Apr. 1994, pp. 657-667.

Hareland, G. et al., "Cutting Efficiency of a Single PDC Cutter on Hard Rock", *Journal of Canadian Petroleum Technology*, vol. 48, No. 6, 2009, pp. 1-6.

Hareland, G., et al., "A Driiling Rate Model for Roller Cone Bits and Its Application", *SPE*, No. 129592, a paper prepared for presentation at the CPS/SPE International Oil and Gas Conference and Exhibition, Jun. 2010, pp. 1-7.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Hashida, T. et al., "Numerical Simulation with Experimental Verification of the Fracture Behavior in Granite Under Confining Pressures based on the Tension-Softening Model", *International Journal of Fracture*, vol. 59, 1993, pp. 227-244.

Hasting, M. A. et al., "Evaluation of the Environmental Impacts of induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

Healy, Thomas E., "Fatigue Crack Growth in Lithium Hydride", *Lawrence Livermore National Laboratory*, 1993, pp. 1-32.

Hettema, M. H. H. et al., "The Influence of Steam Pressure on Thermal Spalling of Sedimentary Rock: Theory and Experiments", *Int. J. Rock Mech. Min. Sci.*, vol. 35, No. 1, 1998, pp. 3-15.

Hibbs, Louis E. et al., "Wear Mechanisms for Polycrystalline-Diamond Compacts as Utilized fro Drilling in Geothermal Environments", *Sandia National Laboratories*, for the United States Government, Report No. SAND-82-7213, 1983, 287 pgs.

Hoek, E., "Fracture of Anisotropic Rock", *Journal the South African Institute of Mining and Metallurgy*, vol. 64, No. 10, 1964, pp. 501-523.

Hood, M., "Waterjet-Assisted Rock Cutting Systems—The Present State of the Art", *International Journal of Mining Engineering*, vol. 3, 1985, pp. 91-111.

Hoover, Ed R. et al., "Failure Mechanisms of Polycrystalline-Diamond Compact Drill Bits in Geothermal Environments", Sandia Report, *Sandia National Laboratories*, SAND81-1404. 1981, pp. 1-35.

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Howells, G., "Super-Water [R] Jetting Applications from 1974 to 1999", paper presented st the Proceedings of the 10th American Waterjet Confeence in Houston, Texas, 1999, 25 pages.

Hu, H. et al., "SimultaneoVelocity and Concentration Measurements of a Turbulent Jet Mixing Flow", *Ann. N.Y. Acad. Sci.*, vol. 972, 2002, pp. 254-259.

Huang. C. et al., "A Dynamic Damage Growth Model for Uniaxial Compressive Response of Rock Aggregates", *Mechanics of Materials*, vol. 34, 2002, pp. 267-277.

Huang, H. et al., "Intrinsic Length Scales in Tool-Rock Interaction", *International Journal of Geomechanics*, Jan./Feb. 2008, pp. 39-44.

Huenges, E. et al., "The Stimulation of a Sedimentary Geothermal Reservoir in the North German Basin: Case Study Grob

(56) References Cited

OTHER PUBLICATIONS

Schonebeck", *Proceedings, Twenty-Ninth Workshop on Geothermal Reservoir Engineering*, Stanford University, Stanford, California, Jan. 26-28, 2004, 4 pages.

Huff, C. F. et al., "Recent Developments in Polycrystalline Diamond-Drill-Bit Design", *Drilling Technology Division—4741, Sandia National Laboratories*, 1980, pp. 1-29.

Hutchinson, J. W., "Mixed Mode Cracking in Layered Materials", *Advances in Applied Mechanics*, vol. 29, 1992, pp. 63-191.

IADC Dull Grading System for Fixed Cutter Bits, by Hughes Christensen, 1996, 14 pgs.

Imbt, W. C. et al., "Porosity in Limestone and Dolomite Petroleum Reservoirs", paper presented at the Mid Continent District, Division of Production, Oklahoma City, Oklahoma, Jun. 1946. pages 364-372.

Jackson, M. K. et al., "Nozzle Design for Coherent Water Jet Production", source unknown, believed to be published prior to 2012, pp. 53-89.

Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.

Jain, R. K. et al., "Development of Underwater Laser Cutting Technique for Steel and Ziraloy for Nuclear Applications", *Journal of Physics for Indian Academy of Sciences*, vol. 75 No. 6, Dec. 2010, pp. 1253-1258.

Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.

Jimeno, Carlos Lopez et al., Drilling and Blasting of Rocks, a. a. Baikema Publishers, 1995, 30 pgs.

Judzis, A. et al., "Investigation of Smaller Footprint Drilling System; Ultra-High Rotary Speed Diamond Drilling Has Potential for Reduced Energy Requirements", IADC/SPE No. 99020, 33 pages.

Jurewicz, B. R.. "Rock Excavation with Laser Assistance", *Int. J. Rock Mech. Min. Sci. & Geomech. Abstr*. vol. 13, 1976, pp. 207-219.

Kahraman, S. et al., "Dominant rock properties affecting the penetration rate of percussive drills", *International Journal of Rock Mechanics and Mining Sciences*, 2003, vol. 40, pp. 711-723.

Karakas, M., "Semianalytical Productivity Models for Perforated Completions", *SPE*, No. 18247, a paper for SPE (Society of Petroleum Engineers) Production Engineering, Feb. 1991, pp. 73-82.

Karasawa, H. et al., "Development of PDC Bits for Downhole Motors", *Proceedings 17th NZ Geothermal Workshop*, 1995, pp. 145-150.

Kelsey, James R.. "Drilling Technology/GDO", Sandia National Laboratories, SAND-85-1866c, DE85 017231, 1985, pp. 1-7.

Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.

Kerr, Callin Joe, "PDC Drill Bit Design and Field Application Evolution", *Journal of Petroleum Technology*, 1988, pp. 327-332.

Ketata, C. et al., "Knowledge Selection for Laser Drilling in the Oil and Gas Industry", *Computer Society*, 2005, pp. 1-6.

Khan, Ovais U. et al., "Laser heating of sheet metal and thermal stress development", *Journal of Materials Processing Technology*, vol. 155-156, 2004, pp. 2045-2050.

Khandelwal, M., "Prediction of Thermal Conductivity of Rocks by Soft Computing", *Int. J. Earth Sci.* (*Geol. Rundsch*), May 11, 2010, 7 pages.

Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1886.

Kim, K. R. et al., "$CO_2$ laser-plume interaction in materials processing", *Journal of Applied Physics*, vol. 89, No. 1, 2001, pp. 681-688.

Kiwata, T. et al., "Flow Visualization and Characteristics of a Coaxial Jet with a Tabbed Annular Nozzle", *JSME International Journal Series B*, vol. 49, No. 4, 2006, pp. 906-913.

Klotz, K. et al., "Coatings with intrinsic stress profile: Refined creep analysis of (Ti,Al)N and cracking due to cyclic laser heating", *Thin Solid Films*, vol. 496, 2006, pp. 469-474.

Kobayashi, T. et al., "Drilling a 2-inch in Diameter Hole in Granites Submerged in Water by CO2 Lasers", *SPE*, No. 119914, a paper prepared for presentation at the SPE/ADC Drilling Conference and Exhibition, Mar. 2009, 6 pages.

Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.

Kobyakov, A. et al., "Design Concept for Optical Fibers with Enhanced SBS Threshold", *Optics Express*, vol. 13, No. 14, Jul. 11, 2005, pp. 5338-5346.

Kolari, K., "Damage Mechanics Model for Brittle Failure of Transversely Isotropic Solids (Finite Element Implementation)", *VTT Publications 628*, 2007, 210 pages.

Kollé, J. J., "A Comparison of Water Jet, Abrasive Jet and Rotary Diamond Drilling in Hard Rock", *Tempress Technologies Inc.*, 1999, pp. 1-8.

Kolle, J. J., "HydroPulse Drilling", a Final Report for Department of Energy under Cooperative Development Agreement No. DE-FC26-FT34367, Apr. 2004, 28 pages.

Kovalev, V. I. et al., "Observation of Hole Burning in Spectrum in SBS in Optical Fibres Under CW Monochromatic Laser Excitation", *IEEE*, Jun. 3, 2010, pp. 56-57.

Koyamada, V. et al., "Simulating and Designing Brillouin Gain Spectrum in Single-Mode Fibers", *Journal of Lightwave Technology*, vol. 22, No. 2, Feb. 2004, pp. 631-639.

Krajcinovic, D. et al., "A Micromechanical Damage Model for Concrete", *Engineering Fracture Mechanics*, vol. 25, No. 5/6, 1986, pp. 585-596.

Kranz, R. L., "Microcracks in Rocks: A Review", *Tectonophysics*, vol. 100, 1983, pp. 449-480.

Kubacki, Emily et al., "Optics for Fiber Laser Applications", *CVI Laser, LLC*, Technical Reference Document #20050415, 2005, 5 pgs.

Kujawski, Daniel, "A fatigue crack driving force parameter with load ratio effects", *International Journal of Fatigue*, vol. 23, 2001, pp. S239-S246.

Labuz, J. F. et al., "Experiments with Rock: Remarks on Strength and Stability Issues", *International Journal of Rock Mechanics & Mining Science*, vol. 44, 2007, pp. 525-537.

Labuz, J. F. et al., "Size Effects in Fracture of Rock", *Rock Mechanics for Industry*, Amadei, Kranz, Scott & Smeallie (eds), 1999, pp. 1137-1143.

Labuz, J. F. et al., "Microrack-dependent fracture of damaged rock", *International Journal of Fracture*, vol. 51, 1991, pp. 231-240.

Lacy, Lewis L., "Dynamic Rock Mechanics Testing for Optimized Fracture Designs", *Society of Petroleum Engineers International, Annual Technical Conference and Exhibition*, 1997, pp. 23-36.

Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.

Langeveld, C. J., "PDC Bit Dynamics", a paper prepared for presentation at the 1992 IADC/SPE Drilling Conference, Feb. 1992, pp. 227-241.

Lau, John H., "Thermal Fatigue Life Prediction of Flip Chip Solder Joints by Fracture Mechanics Method", *Engineering Fracture Mechanics*, vol. 45, No. 5, 1993, pp. 643-654.

Lee, S. H. et al., "Themo-Poroelastic Analysis of Injection-Induced Rock Deformation and Damage Evoution", *Proceedings Thirty-Fifth Workshop on Geothermal Reservoir Engineering*. Feb. 2010, 9 pages.

Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.

Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.

Leong, K. H. et al., "Lasers and Beam Delivery for Rock Drilling", *Argonne National Laboratory*, ANL/TD/TM03-01, 2003, pp. 1-35.

(56) References Cited

OTHER PUBLICATIONS

Leong, K. H., "Modeling Laser Beam-Rock Interaction", a report prepared for Department of Energy (http://www.doe.gov/bridge), 8 pages.

Leung, M. et al., "Theoretical study of heat transfer with moving phase-change interface in thawing of frozen food", *Journal of Physics D: Applied Physics*, vol. 38, 2005, pp. 477-482.

Li, Q. et al., "Experimental Research on Crack Propagation and Failure in Rock-type Materials under Compression", *EJGE*, vol. 13, Bund. D, 2008, p. 1-13.

Li, X. B. et al., "Experimental Investigation in the Breakage of Hard Rock by the PDC Cutters with Combined Action Modes", *Tunnelling and Underground Space Technology*, vol. 16., 2001, pp. 107-114.

Liddle, D. et al., "Cross Sector Decommissioning Workshop", presentation, Mar. 23, 2011, 14 pages.

Lima, R. S. et al., "Elastic ModulMeasurements via Laser-Ultrasonic and Knoop Indentation Techniques in Thermally Sprayed Coatings", *Journal of Thermal Spray Technology*, vol. 14(1), 2005, pp. 52-60.

Lin, Y. T., "The Impact of Bit Performance on Geothermal-Well Cost", *Sandia National Laboratories*, SAND-81-1470C, 1981, pp, 1-6.

Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.

Loland, K. E., "ContinuoDamage Model for Load-Response Estimation of Concrete", *Cement and Concrete Research*, vol. 10, 1980, pp. 395-402.

Lomov, I. N. et al., "Explosion in the Granite Field: Hardening and Softening Behavior in Rocks", *U.S. Department of Energy, Lawrence Livermore National Laboratory*, 2001, pp. 1-7.

Long, S. G. et al., "Thermal fatigue of particle reinforced metal-matrix composite induced by laser heating and mechanical load", *Composites Science and Technology*, vol. 65, 2005, pp. 1391-1400.

Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.

Lubarda, V. A. et al., "Damage Model for Brittle Elastic Solids with Unequal Tensile and Compressive Strengths", *Engineering Fracture Mechanics*, vol. 29, No. 5, 1994, pp. 681-692.

Lucia, F. J. et al., "Characterization of Diageneticaily Altered Carbonate Reservoirs, South Cowden Grayburg Reservoir, West Texas", a paper prepared for presentation at the 1996 SPE Annual Technical Conference and Exhibition, Oct. 1996, pp. 883-893.

Luffel, D. L. et al., "Travis Peak Core Permeability and Porosity Relationships at Reservoir Stress", *SPE Formation Evaluation*, Sep. 1991, pp. 310-318.

Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.

Lund, M. et al., "Specific Ion Binding to Macromolecules: Effect of Hydrophobicity and Ion Pairing", *Langmuir*, 2008 vol. 24, 2008, pp. 3387-3391.

Lyons, K. David et al., "NETL Extreme Drilling Laboratory Studies High Pressure High Temperature Drilling Phenomena", *U.S. Department of Energy, National Energy Technology Laboratory*, 2007, pp. 1-6.

Manrique, E. J. et al., "EOR Field Experiences in Carbonate Reservoirs in the United States", *SPE Reservoir Evaluation & Engineering*, Dec. 2007, pp. 667-686.

Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.

Marcuse, D., "Curvature Loss Formula for Optical Fibers", *J. Opt. Soc. Am.*, vol. 66, No. 3, 1976, pp. 216-220.

Marshall, David B. et al., "Indentation of Brittle Materials", *Microindentation Techniques in Materials Science and Engineering, ASTM STP 889; American Society for Testing and Materials*, 1986, pp. 26-46.

Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.

Martins, A. et al., "Modeling of Bend Losses in Single-Mode Optical Fibers", *Institutu de Telecomunicacoes*, Portugal, 3 pages.

Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.

Maurer, William C., "Advanced Drilling Techniques", published by Petroleum Publishing Co., copyright 1960, 26 pgs.

Maurer, William C., "Novel Drilling Techniques", published by Pergamon Press, UK, copyright 1968, pp. 1-64.

Mazerov, Katie, "Bigger coil sizes, hybrid rigs, rotary steerable advances push coiled tubing drilling to next level", *Drilling Contractor*, 2008, pp. 54-60.

McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.

McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.

Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.

Meister, S. et al., "Glass Fibers for Stimulated Brillouin Scattering and Phase Conjugation", *Laser and Particle Beams*, vol. 25, 2007, pp. 15-21.

Mejia-Rodriguez, G. et al., "Multi-Scale Materiai Modeling of Fracture and Crack Propagation", Final Project Report in Multi-Scale Methods in Applied Mathematics, while the date of the publication is unknown, it is believed to be prior to Aug. 19, 2009, pp. 1-9.

Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.

Mensa-Wilmot, Graham et al., "Advanced Cutting Structure Improves PDC Bit Performance in Hard and Abrasive Drilling Environments", *Society of Petroleum Engineers International*, 2003, pp. 1-13.

Messaoud, Louafi, "Influence of Fluids on the Essential Parameters of Rotary Percussive Drilling", *Laboratoire d'Environnement (Tébessa)*, vol. 14, 2009, pp. 1-8.

Messica, A. et al., "Theory of Fiber-Optic Evanescent-Wave Spectroscopy and Sensor", *Applied Optics*, vol. 35, No. 13, May 1, 1996, pp. 2274-2284.

Mills, W. R. et al., "Pulsed Neutron Porosity Logging", SPWLA Twenty-Ninth Annual Logging Symposium, Jun. 1988, pp. 1-21.

Mirkovich, V. V., "Experimental Study Relating Thermal Conductivity to Thermal Piercing of Rocks", *Int. J. Rock Mech. Min. Sci.*, vol. 5, 1968, pp. 205-218.

Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.

Moavenzadeh, F. et al., "Thin Disk Technique for Analyzing Fock Fractures Induced by Laser Irradiation", a report prepared for the Department of Transportation under Contract C-85-65, May 1968, 91 pages.

Mocofanescu, A. et al., "SBS threshold for single made and multimode GRIN fibers in an all fiber configuration", *Optics Express*, vol. 13, No. 6, 2005, pp. 2019-2024.

Montross, C. S. et al., "Laser-Induced Shock Wave Generation and Shock Wave Enhancement in Basalt", *International Journal of Rock Mechanics and Mining Sciences*, 1999, pp. 849-855.

(56) References Cited

OTHER PUBLICATIONS

Moradian, Z. A. et al., "Predicting the Uniaxial Compressive Strength and Static Young's Modulof Intact Sedimentary Rocks Using the Ultrasonic Test", *International Journal of Geomechanics*, vol. 9, No. 1, 2009, pp. 14-19.

Morozumi, Y. et al., "Growth and Structures of Surface Disturbances of a Round Liquid Jet in a Coaxial Airflow", *Fluid Dynamics Research*, vol. 34, 2004, pp. 217-231.

Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.

Moshier, S. O., "Microporosity in Micritic Limestones: A Review", *Sedimentary Geology*, vol. 63, 1989, pp. 191-213.

Mostafa, M. S. et al., "Investigation of Thermal Properties of Some Basalt Samples in Egypt", *Journal of Thermal Analysis and Calorimetry*, vol. 75, 2004, pp. 178-188.

Mukhin, I. B. et al., "Experimental Study of Kilowatt-Average-Power Faraday Isolators", OSA/ASSP, 2007, 3 pages.

Multari, R. A. et al., "Effect of Sampling Geometry on Elemental Emissions in Laser-Induced Breakdown Spectoscopy", *Applied Spectroscopy*, vol. 50, No. 12, 1996, pp. 1483-1499.

Munro, R. G., "Effective Medium Theory of the Porosity Dependence of Bulk Moduli", *Communications of American Ceramic Society*, vol. 84, No. 5, 2001, pp. 1190-1192.

Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.

Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.

Muto, Shigeki et al., "Laser cutting for thick concrete by multi-pass technique", *Chinese Optics Letters*, vol. 5 Supplement, 2007, pp. S39-S41.

Myung, I. J., "Tutorial on Maximum Likelihood Estimation", *Journal of Mathematical Psychology*, vol. 47, 2003, pp. 90-100.

Nakano, A. et al., "Visualization for Heat and Mass Transport Phenomena in Supercritical Artificial Air", *Cryogenics*, vol. 45, 2005, pp. 557-565.

Naqavi, I. Z. et al., "Laser heating of multilayer assembly and stress levels: elasto-plastic consideration", *Heat and Mass Transfer*, vol. 40, 2003, pp. 25-32.

Nara, Y. et al., "Study of Subcritical Crack Growth in Andesite Using the Double Torsion Test", *International Journal of Rock Mechanics & Mining Sciences*, vol. 42, 2005, pp. 521-530.

Nara, Y. et al., "Sub-critical crack growth in anisotropic rock", *International Journal of Rock Mechanics and Mining Sciences*, vol. 43, 2006, pp. 437-453.

Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.

Nicklaus, K. et al., "Optical Isolator for Unpolarized Laser Radiation at Multi-Kilowatt Average Power", *Optical Society of America*, 2005, 3 pages.

Nikles, M. et al., "Brillouin Gain Spectrum Characterization in Single-Mode Optical Fibers", *Journal of Lightwave Technology*, vol. 15, No. 10, Oct. 1997, pp. 1842-1851.

Nilsen, B. et al., "Recent Developments in Site investigation and Testing for Hard Rock TBM Projects", *1999 RETC Proceedings*, 1999, pp. 715-731.

Nimick, F. B., "Empirical Relationships Between Porosity and the Mechanical Properties of Tuff", *Key Questions in Rock Mechanics*, Cundall et al. (eds), 1988, pp. 741-742.

Nolen-Hoeksema, R., "Fracture Development and Mechnical Stratigraphy of Austin Chalk, Texas: Discussion", a discussion for the American Association of Petroleum Geologists Bulletin, vol. 73, No. 6, Jun. 1989, pp. 792-793.

O'Hare, Jim et al., "Design Index: A Systematic Method of PDC Drill-Bit Selection", *Society of Petroleum Engineers International*, IADC/SPE Drilling Conference, 2000, pp. 1-15.

Oglesby, K. et al., "Advanced Ultra High Speed Motor for Drilling", a project update by Impact Technologies LLC for the Department of Energy, Sep. 12, 2005, 36 pages.

Okon, P. et al., "Laser Welding of Aluminium Alloy 5083", *21st International Congress on Applications of Lasers and Electro-Optics*, 2002, pp. 1-9.

Olsen, F. O., "Fundamental Mechanisms of Cutting Front Formation in Laser Cutting", *SPE*, vol. 2207, pp. 402-413.

Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.

Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.

Ortiz, Bias et al., Improved Bit Stability Reduces Downhole Harmonics (Vibrations), *International Association of Drilling Contractors/Society of Petroleum Engineers Inc.*, 1996, pp. 379-389.

Ouyang, L. B. et al., "General Single Phase Wellbore Flow Model", a report prepared for the COE/PETC, May 2, 1997, 51 pages.

Palashchenko, Yuri A., "Pure Rolling of Bit Cones Doubles Performance", *I & Gas Journal*, vol. 106, 2008, 8 pgs.

Palchaev, D. K. et al., "Thermal Expansion of Silicon Carbide Materials", *Journal of Engineering Physics and Thermophysics*, vol. 66, No. 6, 1994, 3 pages.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, R. et al., "Drilling Large Diameter Holes in Rocks Using Multiple Laser Beams (504)", while the date of the publication is unknown, it is believed to be prior to Aug. 19, 2009, 6 pages.

Parker, Richard A. et al., "Laser Drilling Effects of Beam Application Methods on Improving Rock Removal", *Society of Petroleum Engineers*, SPE 84353, 2003, pp. 1-7.

Patricio, M. et al., "Crack Propagation Analysis", while the date of the publication is unknown, it is believed to be prior to Aug. 19, 2009, 24 pages.

Pavlina, E. J. et al., "Correlation of Yield Strength and Tensile Strength with Hardness for Steels", *Journals of Materials Engineering and Performance*, vol. 17, No. 6, 2008, pp. 888-893.

Peebler, R. P. et al., "Formation Evaluation with Logs in the Deep Anadarko Basin", *SPE of AIME*, 1972, 15 pages.

Pepper, D. W. et al., "Benchmarking COMSOL Multiphysics 3.5a—CFD Problems", a presentation, Oct. 10, 2009, 54 pages.

Percussion Drilling Manual, by Smith Tools, 2002, 67 pgs.

Pettitt, R. et al., "Evolution of a Hybrid Roller Cone/PDC Core Bit", a paper prepared for Geothermal Resources Council 1980 Annual Meeting, Sep. 1980, 7 pages.

Phani, K. K. et al., "Pororsity Dependence of Ultrasonic Velocity and Elastic Modulin Sintered Uranium Dioxide—a discussion", *Journal of Materials Science Letters*, vol. 5, 1986, pp. 427-430.

Ping, Cao et al., "Testing study of subcritical crack growth rate and fracture toughness in different rocks", *Transactions of NonferroMetals Society of China*, vol. 16, 2006, pp. 709-714.

Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert (ed.)*, VGE, 2004, pp. 1-6.

Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.

Plinninger, Ralf J. et al., "Predicting Tool Wear in Drill and Blast", *Tunnels & Tunneling International Magazine*, 2002, pp. 1-5.

(56) References Cited

OTHER PUBLICATIONS

Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.

Polsky, Yarom et al., "Enhanced Geothermat Systems (EGS) Well Construction Technology Evaluation Report", *Sandia National Laboratories*, Sandia Report, SAND2008-7866, 2008, pp. 1-108.

Pooniwala, S. et al., "Lasers: The Next Bit", a paper prepared for the presentation at the 2006 SPE (Society of Petroleum Engineers) Eastern Regional Meeting, Oct. 2006, pp. 1-10.

Pooniwala, Shahvir, "Lasers: The Next Bit", *Society of Petroleum Engineers*, No. SPE 104223, 2006, 10 pgs.

Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.

Potyondy, D. O. et al., "A Bonded-particle model for rock", *International Journal of Rock Mechanics and Mining Sciences*, vol. 41, 2004, pp. 1329-1364.

Potyondy, D. O., "Simulating Stress Corrosion with a Bonded-Particle Model for Rock", *International Journal of Rock Mechanics & Mining Sciences*, vol. 44, 2007, pp. 677-691.

Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.

Powell, M. et al., "Optimization of UHP Waterjet Cutting Head, The Orifice", Flow International, while the date of publication is unknown, it is believed to be prior to Aug. 19, 2009, 19 pages.

Price, R. H. et al., "Analysis of the Elastic and Strength Properties of Yuccs Mountain tuff, Nevada", 26th Symposium on Rock Mechanics, Jun. 1985, pp. 89-96.

Qixian, Luo et al., "Using compression wave ultrasonic transducers to measure the velocity of surface waves and hence determine dynamic modulof elasticity for concrete", *Construction and Building Materials*, vol. 10, No. 4, 1996, pp. 237-242.

Quinn, R. D. et al., "A Method for Calculating Transient Surface Temperatures and Surface Heating Rates for High-Speed Aircraft", NASA, Dec. 2000, 35 pages.

Radkte, Robert, "New High Strength and faster Drilling TSP Diamond Cutters", Report by *Technology International, Inc.*, DOE Award No. DE-FC26-97FT34368, 2006, 97 pgs.

Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.

Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.

Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.

Ravishankar, M. K., "Some Results on Search Complexity vs Accuracy", DARPA Spoken Systems Technology Workshop, Feb. 1997, 4 pages.

Raymond, David W., "PDC Bit Testing at Sandia Reveals Influence of Chatter in Hard-Rock Drilling", *Geothermal Resources Council Monthly Bulletin*, SAND99-2655J, 1999, 7 pgs.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of IgneoRocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", *Tectonophysics*, vol. 337 ,2001, pp. 117-133.

Rosler, M., "Generalized Hermite Polynomials and the Heat Equation for Dunkl Operators", a paper, while the date of the publication is unknown, it is believed to be prior to Aug. 19, 2009, pp. 1-24.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rossmanith, H. P. et al., "Wave Propagation, Damage Evolution, and Dynamic Fracture Extension, Part I. Percussion Drilling", *Materials Science*, vol. 32, No. 3, 1996, pp. 350-358.

Rubin, A. M. et al., "Dynamic Tensile-Failure-Induced Velocity Deficits in Rock", *Geophysical Research Letters*, vol. 18, No. 2, Feb. 1991, pp. 219-222.

Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Sano, Osam et al., "Acoustic Emission During Slow Crack Growth", *Department Mining and Mineral Engineering, NII-Electronic Library Service*, 1980, pp. 381-388.

Santarelli, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for the Department of Energy, Apr. 1989, 69 pages.

Scaggs, M. et al., "Thermal Lensing Compensation Objective for High Power Lasers", Published by Haas Lasers Technologies, Inc., while the date of publication is unknown, it is believed to be prior to Aug. 19, 2009, 7 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schormair, Nik et al., "The influence of anisotropy on hard rock drilling and cutting", *The Geological Society of London, IAEG*, Paper No. 491, 2006, pp. 1-11.

(56) References Cited

OTHER PUBLICATIONS

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.
Shannon, G. J. et al., "High power laser welding in hyperbaric gas and water environments", *Journal of Laser Applications*, vol. 9, 1997, pp. 129-136.
Shiraki, K. et al., "SBS Threshold of a Fiber with a Brillouin Frequency Shift Distribution", *Journal of Lightwave Technology*, vol. 14, No. 1, Jan. 1996, pp. 50-57.
Shuja, S. Z. et al., "Laser heating of semi-infinite solid with consecutive pulses: Influence of materaial properties on temperature field", *Optics & Laser Technology*, vol. 40, 2008, pp. 472-480.
Simple Drilling Methods, WEDC Loughborough University, United Kingdom, 1995, 4 pgs.
Singh, T. N. et al., "Prediction of Thermal Conductivity of Rock Through Physico-Mechanical Properties", *Building and Environment*, vol. 42, 2007, pp. 146-155.
Sinha, D., "Cantilever Drilling—Ushering a New Genre of Drilling", a paper prepared for presentation at the SPE/IADC Middle East Drilling Technology Conference and Exhibition, Oct. 2003, 6 pages.
Sinor, A. et al., "Drag Bit Wear Model", *SPE Drilling Engineering*, Jun. 1989, pp. 128-136.
Smith, D., "Using Coupling Variables to Solve Compressible Flow, Multiphase Flow and Plasma Processing Problems", COMSOL Users Conference 2006, 38 pages.
Smith, E., "Crack Propagation at a Constant Crack Tip Stress Intensity Factor", *Int. Journal of Fracture*, vol. 16, 1980, pp. R215-R218.
Sneider, RM et al., "Rock Types, Depositional History, and Diangenetic Effects, Ivishak reservoir Prudhoe Bay Field", *SPE Reservoir Engineering*, Feb. 1997, pp. 23-30.
Soeder, D. J. et al., "Pore Geometry in High- and Low-Permeability Sandstones, Travis Peak Formation, East Texas", *SPE Formation Evaluation*, Dec. 1990, pp. 421-430.
Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.
Somerton, W. H. et al., "Thermal Expansion of Fluid Saturated Rocks Under Stress", SPWLA Twenty-Second Annual Logging Symposium, Jun. 1981, pp. 1-8.
Sousa, L. M. O. et al., "Influence of Microfractures and Porosity on the Physico-Mechanical Properties and Weathering of Ornamental Granites", *Engineering Geology*, vol. 77, 2005, pp. 153-168.
Sousa, Luis M. O. et al., "Influence of microfractures and porosity on the physico-mechanical properties and weathering of ornamental granites", *Engineering Geology*, vol. 77, 2005, pp. 153-168.
Stone, Charles M. et al., "Qualification of a Computer Program for Drill String Dynamics", *Sandia National Laboratories*, SAND-85-0633C, 1985, pp. 1-20.
Stowell, J. F. W., "Characterization of Opening-Mode Fracture Systems in the Austin Chalk", *Gulf Coast Association of Geological Societies Transactions*, vol. L1, 2001, pp. 313-320.
Straka, W. A. et al., "Cavitation Inception in Quiescent and Co-Flow Nozzle Jets", 9th International Conference on Hydrodynamics, Oct. 2010, pp. 813-819.
Suarez, M. C. et al., "COMSOL in a New Tensorial Formulation of Non-Isothermal Poroelasticity", publisher unknown, while the date of the publication is unknown, it is believed to be prior to Aug. 19, 2009, 2 pages.
Summers, D. A., "Water Jet Cutting Related to Jet & Rock Properties", publisher unknown, while the date of the publication is unknown, it is believed to be prior to Aug. 19, 2009, 13 pages.
Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.
Takarli, Mokhfi et al., "Damage in granite under heating/cooling cycles and water freeze-thaw condition", *International Journal of Rock Mechanics and Mining Sciences*, vol. 45, 2008, pp. 1164-1175.
Tanaka, K. at al., "The Generalized Relationship Between the Parameters C and m of Paris' Law for Fatigue Crack Growth", *Scripta Metallurgica*, vol. 15, No. 3, 1981, pp. 259-264.
Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.
Tang, C. A. et al., "Coupled analysis of flow, stress and damage (FSD) in rock failure", *International Journal of Rock Mechanics and Mining Sciences*, vol. 39, 2002, pp. 477-489.
Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastructure Development in the Northern Regions, Jun. 2005, 7 pages.
Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.
Terzopoulos, D. et al., "Modeling Inelastic Deformation: Viscoelasticity, Plasticity, Fracture", *SIGGRAPH '88*, Aug. 1988, pp. 269-278.
Thomas, R. P., "Heat Flow Mapping at the Geysers Geothermal Field", published by the California Department of Conservation Division of Oil and Gas, 1986, 56 pages.
Thompson, G. D., "Effects of Formation Compressive Strength on Perforator Performance", a paper presented of the Southern District API Division of Production, Mar. 1962, pp. 191-197.
Thorsteinsson, Hildigunnur et al., "The Impacts of Drilling and Reservoir Technology Advances on EGS Exploitation", *Proceedings, Thirty-Third Workshop on Geothermal Reservoir Engineenng, Institute for Sustainable Energy, Environment, and Economy (JSEEE)*, 2008, pp. 1-14.
Tovo, R. et al., "Fatigue Damage Evaluation on Mechanical Components Under Multiaxial Loadings", excerpt from the Proceedings of the COMSOL Conference, 2009, 8 pages.
Tuler, F. R. et al., "A Criterion for the Time Dependence of Dynamic Fracture", *The International Journal of Fracture Mechanics*, vol. 4, No. 4, Dec. 1968, pp. 431-437.
Turner, D. et al., "New DC Motor for Downhole Drilling and Pumping Applications", a paper prepared for presentation at the SPE/ICoTA Coiled Tubing Roundtable, Mar. 2001, pp. 1-7.
Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.
Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.
U.S. Dept of Energy, "Chapter 6—Drilling Technology and Costs, from Report for the Future of Geothermal Energy", 2005, 53 pgs.
U.S. Appl. No. 12/840,978, filed Jul. 21, 2009, 61 pgs.
Udd, E. et al., "Fiber Optic Distributed Sensing Systems for Harsh Aerospace Environments", publisher unknown, while the date of the publication is unknown, it is believed to be prior to Aug. 19, 2009, 12 pages.
Valsangkar, A. J. et al., Stress-Strain Relationship for Empirical Equations of Creep in Rocks, *Engineering Geology*, Mar. 29, 1971, 5 pages.
Varnado, S. G. et al., "The Design and Use of Polycrystalline Diamond Compact Drag Bits in the Geothermal Environment", *Society of Petroleum Engineers of AIME*, SPE 8378, 1979, pp. 1-11.
Wagh, A. S. et al., "Dependence of Ceramic Fracture Properties on Porosity", *Journal of Material Sience*, vol. 28, 1993, pp. 3589-3593.
Wagner, F. et al., "The Laser Microjet Technology—10 Years of Development (M401)", publisher unknown, while the date of the publication is unknown, it is believed to be prior to Aug. 19, 2009, 9 pages.

(56) References Cited

OTHER PUBLICATIONS

Waldron, K. et al., "The Microstructures of Perthitic Alkali Feldspars Revealed by Hydroflouric Acid Etching", *Contributions to Mineralogy and Petrology*, vol. 116, 1994, pp. 360-364.
Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.
Wandera, C. et al., "Characterzaton of the Melt Removal Rate in Laser Cuttng of Thick-Section Stainless Steel", *Journal of Laser Applications*, vol. 22, No. 2, May 2010, pp. 62-70.
Wandera, C. et al., "Inert Gas Cuting of Thick-Section Stainless Steel and Medium Section Aluminun Using a High Power Fiber Laser", *Journal of Chemical Physics*, vol. 116, No. 4, Jan. 22, 2002, pp. 154-161.
Wandera, C. et al., "Laser Power Requirement for Cutting of Thick-Section Steel and Effects of Processing Parameters on Mild Steel Cut Quality", a paper accepted for publication in the Proceedings IMechE Part E, *Journal of Engineering Manufacture*, vol. 225, 2011, 23 pages.
Wandera, C. et al., "Optimization of Parameters for Fiber Laser Cutting of 10mm Stainless Steel Plate", a paper for publication in the Proceeding iMechE Part B. *Journal of Engineering Manufacture*, vol. 225, 2011, 22 pages.
Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.
Wang, C. H., "Introduction to Fractures Mechanics", published by DSTO Aeronautical and Maritime Research Laboratory, Jul. 1996, 82 pages.
Wang, G. et al., "Particle Modeling Simulation of Thermal Effects on Ore Breakage", *Computational Materials Science*, vol. 43, 2008, pp. 892-901.
Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.
Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.
Warren, T. M. et al., "Laboratory Drilling Performance of PDC Bits", *SPE Drilling Engineering*, Jun. 1988, pp. 125-135.
Wen-gui, Cao et al., "Damage constituitive model for strain-softening rock based on normal distribution and its parameter determination", *J. Cent. South Univ. Technol.*, vol. 14, No. 5, 2007, pp. 719-724.
White, E. J. et al., "Reservoir Rock Characteristics of the Madison Limestone in the Williston Basin", *The Log Analyst*, Sep.-Oct. 1970, pp. 17-25.
White, E. J. et al., "Rock Matrix Properties of the Ratcliffe Interval (Madison Limestone) Flat Lake Field, Montana", *SPE of AIME*, Jun. 1968, 16 pages.
Wiercigroch, M., "Dynamics of ultrasonic percussive drilling of hard rocks", *Journal of Sound and Vibration*, vol. 280, 2005, pp. 739-757.
Wilkinson, M. A. et al., "Experimental Measurement of Surface Temperatures During Flame-Jet induced Thermal Spallation", *Rock Mechanics and Rock Engineering*, 1993, pp. 29-62.
Williams, R. E. et al., "Experiments in Thermal Spallation of VarioRocks", *Transactions of the ASME*, vol. 118, 1996, pp. 2-8.
Willis, David A. et al., "Heat transfer and phase change during picosecond laser ablation of nickel", *International Journal of Heat and Mass Transfer*, vol. 45, 2002, pp. 3911-3918.
Winters, W. J. et al., "Roller Bit Model with Rock Ductility and Cone Offset", a paper prepared for presentation at 62nd Annuai Technical Conference and Exhibition of the Society of Petroleum Engineers, Sep. 1987, 12 pages.
Wippich, M. et al., "Tunable Lasers and Fiber-Bragg-Grating Sensors", Obatined from the at: from the Internet website of The Industrial Physicist at: http://www.aip.org/tip/INPHFA/vol-9/iss-3/p24.html, on May 18, 2010, pp. 1-5.
Wong, Teng-fong et al., "Microcrack statistics, Weibull distribution and micromechanical modeling of compressive failure in rock", *Mechanics of Materials*, vol. 38, 2006, pp. 664-681.
Wood, Tom, "Dual Purpose COTD™ Rigs Establish New Operational Records", *Treme Coil Drilling Corp., Drilling Technology Without Borders*, 2009, pp, 1-18.
Wu, X. Y. et al., "The Effects of Thermal Softening and Heat Conductin on the Dynamic Growth of Voids", *International Journal of Solids and Structures*, vol. 40, 2003, pp. 4461-4478.
Xia, K. et al., "Effects of microstructures on dynamic compression of Barre granite", *International Journal of Rock Mechanics and Mining Sciences*, vol. 45, 2008, pp. 879-887, available at: www.sciencedirect.com.
Xiao, J. Q. et al., "Inverted S-Shaped Model for Nonlinear Fatigue Damage of Rock", *International Journal of Rock Mechanics & Mining Sciences*, vol. 46, 2009, pp. 643-648.
Xu, Z et al. "Modeling of Laser Spallation Drilling of Rocks fro gas- and Oilwell Drilling", *Society of Petroleum Engineers*, SPE 95746, 2005, pp. 1-6.
Xu, Z. et al., "Application of High Powered Lasers to Perforated Completions", *International Congress on Applications of Laser & Electro-Optics*, Oct. 2003, 6 pages.
Xu, Z. et al., "Laser Rock Driliing by a Super-Pulsed CO2 Laser Beam", a manuscript created for the Department of Energy, while the date of the publication is unknown, it is believed to be prior to Aug. 19, 2009, 9 pages.
Xu, Z. et al., "Laser Spallation of Rocks for Oil Well Drilling", Proceedings of the 23rd International Congress on Applications of Lasers and Electro-Optics, 2004, pp. 1-6.
Xu, Z. et al., "Modeling of Laser Spallation Drilling of Rocks for Gas-and Oilwell Drilling", a paper prepared for the presentation at the 2005 SPE (Society of Petroleum Engineers) Annual Technical Conference and Exhibition, Oct. 2005, 6 pages.
Xu, Z. et al., "Rock Perforation by Pulsed Nd:YAG Laser", Proceedings of the 23rd International Congress on Applications of Lasers and Electro-Optics 2004, 2004, 5 pages.
Xu, Z. et al., "Specific Energy of Pulsed Laser Rock Drilling", *Journal of Laser Applications*, vol. 15, No. 1, Feb. 2003, pp. 25-30.
Xu, Z. et al., "Specific Energy for Laser Removal of Rocks", *Proceedings of the 20th International Congress on Applications of Lasers & Electra-Optics*, 2001, pp. 1-8.
Xu, Z. et al., "Specific energy for pulsed laser rock drilling", *Journal of Laser Applications*, vol. 15, No. 1, 2003, pp. 25-30.
Xu, Zhiyue et al., "Laser Spallation of Rocks for Oil Well Drilling", *Proceedings of the 23rd International Congress on Applications of Lasers and Electro-Optics*, 2004, pp. 1-6.
Yabe, T. et al., "The Constrained Interpolation Profile Method for Multiphase Analysis", *Journal of Computational Physics*, vol. 169, 2001, pp. 556-593.
Yamamoto, K. Y. et al., "Detection of Metals in the Environment Using a Portable Laser-Induced Breakdown Spectroscopy Instrument", *Applied Spectroscopy*, vol. 50, No. 2, 1996.
Yamashita, Y. et al., "Underwater Laser Welding by 4kW CW YAG Laser", *Journal of Nuclear Science and Technology*, vol. 38, No. 10, Oct. 2001, pp. 891-895.
Yamshchikov, V. S. et al., "An Evaluation of the Microcrack Density of Rocks by Ultrasonic Velocimetric Method", *Moscow Mining Institute*, (Translated from *Fiziko-Tekhnicheskie Problemy Razrabotki Poleznykh Iskopaemykh*), 1985, pp. 363-366.
Yasar, E. et al., "Determination of the Thermal Conductivity from Physico-Mechanical Properties", *Bull Eng. Geol. Environ.*, vol. 67, 2008, pp. 219-225.
Yilbas, B. S. et al., "Laser short pulse heating: Influence of pulse intensity on temperature and stress fields", *Applied Surface Science*, vol. 252, 2006, pp. 8428-8437.
Yilbas, B. S. et al., "Laser treatment of aluminum surface: Analysis of thermal stress field in the irradiated región". *Journal of Materials Processing Technology*, vol. 209, 2009, pp. 77-88.

(56) References Cited

OTHER PUBLICATIONS

Yilbas, B. S. et al., "Nano-second laser pulse heating and assisting gas jet considerations", *International Journal of Machine Tools & Manufacture*, vol. 40, 2000, pp. 1023-1038.
Yilbas, B. S. et al., "Repetitive laser pulse heating with a convective boundary condition at the surface", *Journal of Physics D: Applied Physics*, vol. 34, 2001, pp. 222-231.
York, J. L. et al., "The Influence of Flashing and Cavitation on Spray Formation", a progress report for UMRI Project 2815 with Delavan Manufacturing Company, Oct. 1959, 27 pages.
Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.
Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.
Zehnder, A. T., "Lecture Notes on Fracture Mechanics", 2007, 227 pages.
Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): Rock Mechanics Across Borders and Disciplines, Jun. 2004, 9 pages.
Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.
Zeuch, D.H. et al., "Rock Breakage Mechanism Wirt a PDC Cutter", *Society of Petroleum Engineers, 60th Annual Technical Conference*, Las Vegas, Sep. 22-25, 1985, 11 pgs.
Zhai, Yue et al., "Dynamic failure analysis on granite under uniaxial impact compressive load", *Front. Archit. Civ. Eng. China*, vol. 2. No. 3, 2008, pp. 253-260.
Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.
Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.
Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254- 257.
Zhou, X.P., "Microcrack Interaction Brittle Rock Subjected to Uniaxial Tensile Loads", *Theoretical and Applied Fracture Mechanics*, vol. 47, 2007, pp. 68-76.
Zhou, Zehua et al., "A New Thermal-Shock-Resistance Model for Ceramics: Establishment and validation", *Materials Science and Engineering*, A 405, 2005, pp. 272-276.
Zhu, Dongming et al., "Influence of High Cycle Thermal Loads on Thermal Fatigue Behavior of Thick Thermal Barrier Coatings", *National Aeronautics and Space Administration: Army Research Laboratory*, Technical Report ARL-TR-1341, NASA TP-3676, 1997, pp. 1-50.
Zhu, Dongming et al., "Investigation of thermal fatigue behavior of thermal barrier coating systems", *Surface and Coatings Technology*, vol. 94-95, 1997, pp. 94-101.
Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.
Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.
Zhu, X. et al., "High-Power ZBLAN Glass Fiber Lasers: Review and Prospect", *Advances in OptoElectronics*, vol. 2010, pp. 1-23.
Zietz, J. et al., "Determinants of House Prices: A Quantile Regression Approach", *Department of Economics and Finance Working Paper Series*, May 2007, 27 pages.
Zuckerman, N. et al., "Jet Impingement Heat Transfer: Physics, Correlations, and Numerical Modeling", *Advances in Heat Transfer*, vol. 39, 2006, pp. 565-631.
A Built-for-Purpose Coiled Tubing Rig, by Schulumberger Wells, No. DE-PS26-03NT15474, 2006, 1 pg.
"Chapter I—Laser-Assisted Rock-Cutting Tests", publisher unknown, while the date of the publication is unknown, it is believed to be prior to Aug. 19, 2009, 64 pages.
"Chapter 7: Energy Conversion Systems—Options and Issues", publisher unknown, while the date of the publication is unknown, it is believed to be prior to Aug. 19, 2009, pp. 7-1 to 7-32 and table of contents page.
"Cross Process Innovations", Obtained from the Internat at: http://www.mrl.columbia.edu/ntm/CrossProcess/CrossProcessSect5.htm, on Feb. 2, 2010, 11 pages.
"Fourier Series, Generalized Functions, Laplace Transform", publisher unknown, white the date of the publication is unknown, it is believed to be prior to Aug. 19, 2009, 6 pages.
"Introduction to Optical Liquids", published by Cargille-Sacher Laboratories Inc., Obtained from the Internet at: http://www.cargille.com/opticalintro.shtml, on Dec. 23, 2008.
"Laser Drilling", Oil & Natural Gas Projects (Exploration & Production Technologies) Technical Paper, Dept. of Energy, Jul. 2007, 3 pages.
"Leaders in Industry Luncheon", IPAA & TIPRO, Jul. 8, 2009, 19 pages.
"Measurement and Control of Abrasive Water-Jet Vetocity", publisher unknown, while the date of the publication is unknown it is believed to be prior to Aug. 19, 2009, 8 pages.
"NonhomogeneoPDE—Heat Equation with a Forcing Term", a lecture, 2010, 6 pages.
"Performance Indicators for Geothermal Power Plants", prepared by International Geothermal Association for World Energy Council Working Group on Performance of Renewable Energy Plants, author unknown, Mar. 2011, 7 pages.
"Rock Mechanics and Rock Engineering", publisher unknown, while the date of the publication is unknown, it is believed to be prior to Aug. 19, 2009, 69 pages.
"Shock Tube", Cosmol MultiPhysics 3.5a, 2008, 5 pages.
"Silicone Fluids: Stable, Inert Media", Gelest, Inc., while the date of the publication is unknown, it is believed to be prior to Aug. 19, 2009, 27 pages.
"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.
"Underwater Laser Cutting", TWI Ltd, May/Jun. 2011, 2 pages.
Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13. 2013, 73 pages.
Utility U.S. Appl. No. 13/800,933, filed Mar. 13, 2013, 73 pages.
Utility U.S. Appl. No. 13/ 49,831, filed Mar. 25, 2013, 83 pages.

\* cited by examiner

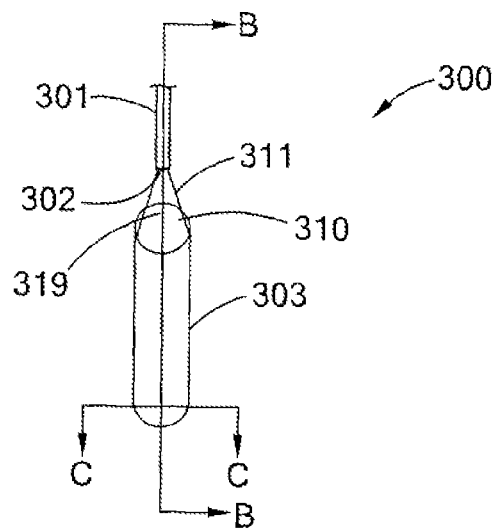
Fig. 3A
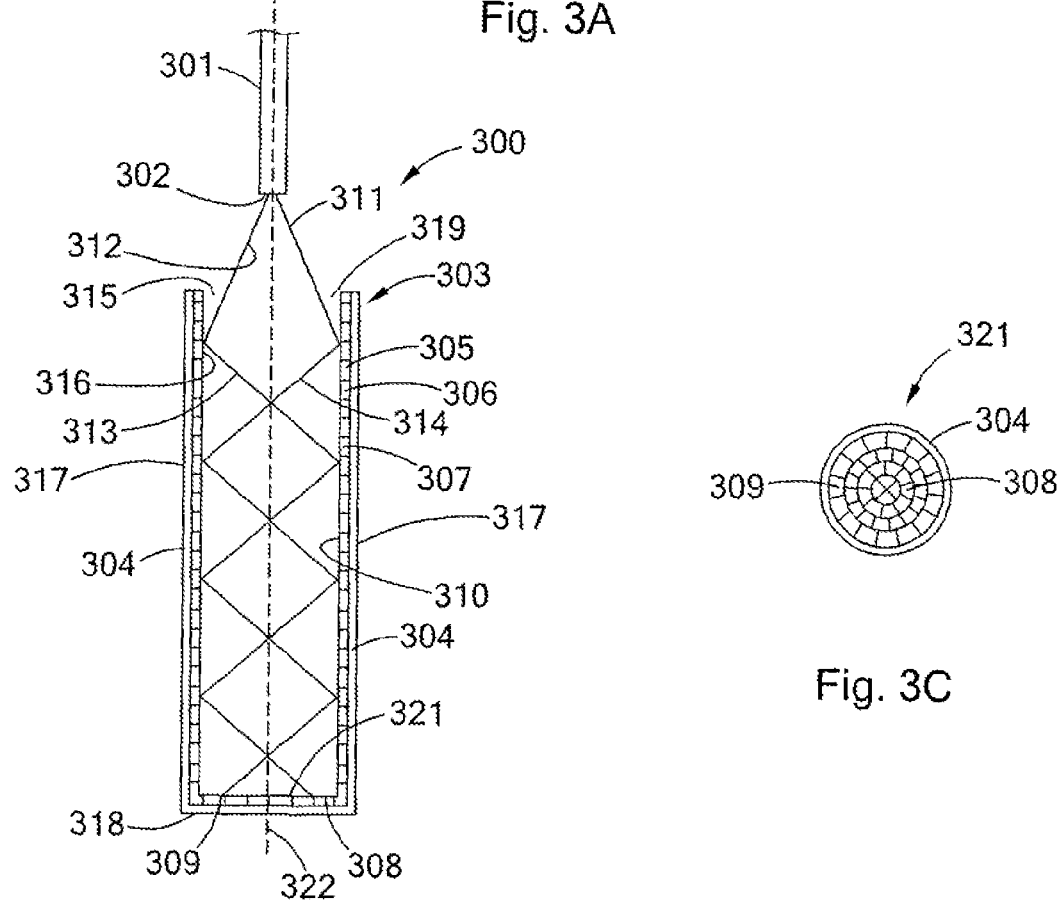
Fig. 3B
Fig. 3C

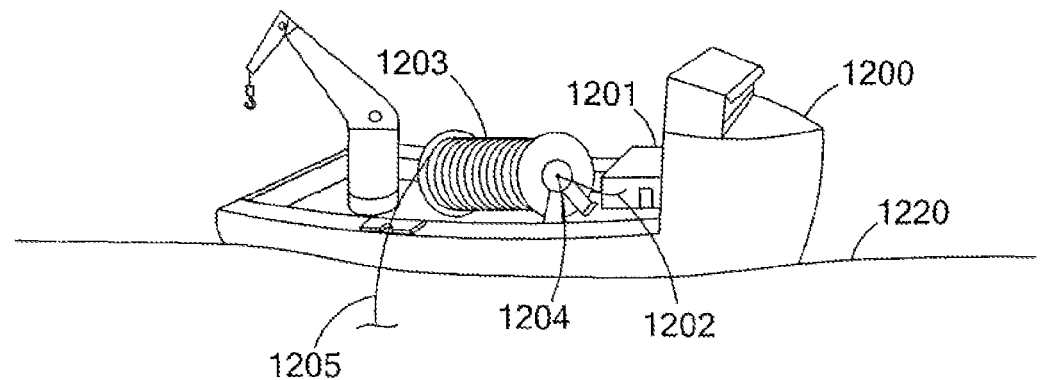
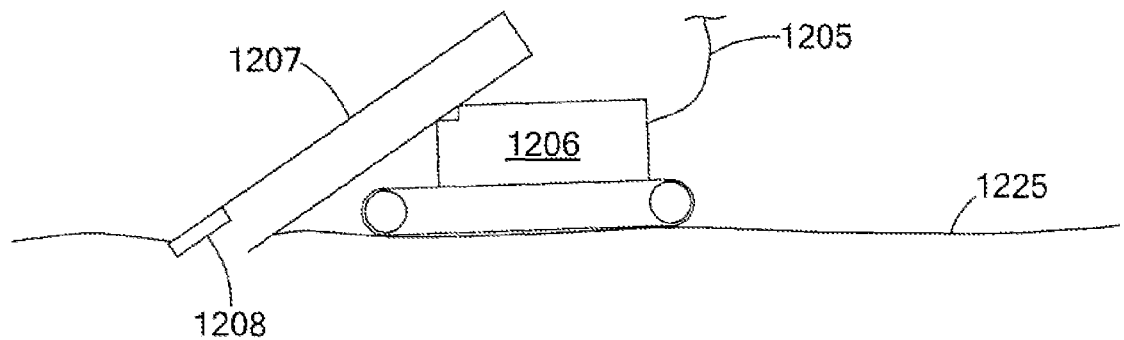
Fig. 12

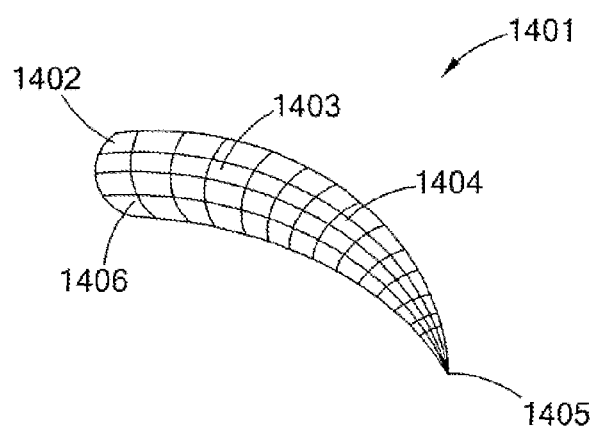
Fig. 14
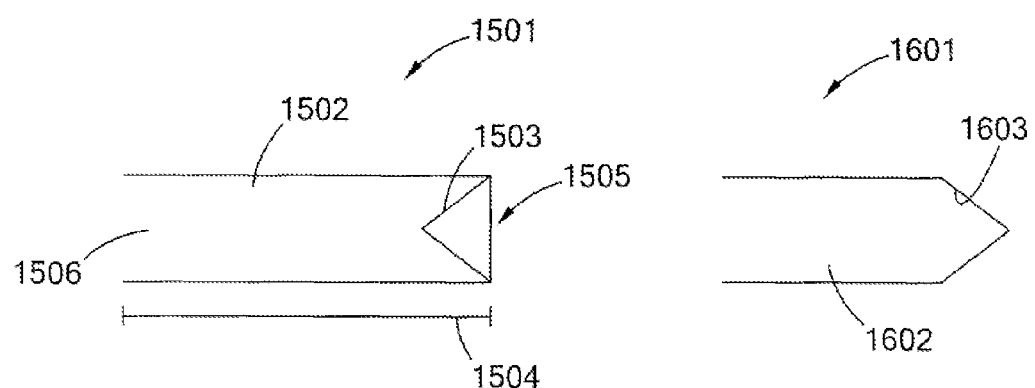
Fig. 15                                      Fig. 16

HIGH POWER LASER ROV SYSTEMS AND METHODS FOR TREATING SUBSEA STRUCTURES

This application is a continuation of U.S. patent application Ser. No. 13/347,445 which: (i) claims, under 35 U.S.C. §119(e)(1), the benefit of the filing date of Jan. 11, 2011 of provisional application Ser. No. 61/431,827; (ii) claims, under 35 U.S.C. §119(e)(1), the benefit of the filing date of Feb. 7, 2011 of provisional application Ser. No. 61/431,830; (iii) is a continuation-in-part of U.S. patent application Ser. No. 12/706,576 filed Feb. 16, 2010, which is a continuation-in-part of U.S. patent application Ser. No. 12/544,136 filed Aug. 19, 2009, and which claims under 35 U.S.C. §119(e)(1) the benefit of the filing date of Feb. 17, 2009 of provisional application Ser. No. 61/153,271, and the benefit of the filing date of Jan. 15, 2010 of provisional application Ser. No. 61/295,562; (iv) is a continuation-in-part of U.S. patent application Ser. No. 12/840,978 filed Jul. 21, 2010; (v) is a continuation-in-part of Ser. No. 12/543,968 filed Aug. 19, 2009; (vi) is a continuation-in-part of Ser. No. 12/544,136 filed Aug. 19, 2008, which claims under 35 U.S.C. §119(e)(1) the benefit of the filing date of Oct. 17, 2008 of provisional application Ser. No. 61/106,472, and the benefit of the filing date of Feb. 17, 2009 of provisional application Ser. No. 61/153,271; (vii) is a continuation-in-part of Ser. No. 13/210,581 filed Aug. 16, 2011, which claims under 35 U.S.C. §119(e)(1) the benefit of the filing date of Aug. 17, 2010 of provisional application Ser. No. 61/374,594; and (viii) claims, under 35 U.S.C. §119(e)(1), the benefit of the filing date of Jun. 3, 2011 of provisional application Ser. No. 61/493,174, the entire disclosures of each of which are incorporated herein by reference.

BACKGROUND OF THE INVENTION

1. Field of the Invention

The present inventions relate to assemblies that utilize laser energy to provide electrical, mechanical or electro-mechanical energy for use in apparatuses, and in particular apparatuses that operate in remote, hostile, extreme or difficult to access locations, such as, subsea equipment, mining equipment, drilling equipment, flow control equipment, plugging and abandonment equipment and nuclear remediation equipment. The present inventions relate to laser apparatus that may perform laser cutting operations, cleaning operations, or other types of laser operations, as well as, potentially other non-laser operations; and which apparatus may also have assemblies that utilize laser energy to provide electrical, mechanical or electro-mechanical energy. By way of illustration the present inventions embrace subsea equipment that utilize tethers, such as subsea vehicles, remotely operated vehicles ("ROV"s), subsea tractors, subsea trenchers, and subsea excavation tools. Thus, and in particular, the present inventions relate to novel subsea vehicles that utilize high power laser energy, including high power laser cables and tethers. The present inventions further relate to subsea laser tools that can be used with an ROV or as a stand-alone tool. These tools deliver high power laser beams to cut, clean, remove material, and perform other tasks that may be accomplished by high power laser energy. These tools and related apparatus and systems bring high power laser technology to the seafloor, subsea environment, and equipment and structures located below the surface of the water; as well as, to other extreme or difficult to access environments or locations, such as within a borehole, a mine, or a nuclear facility.

As used herein, unless specified otherwise the terms "blowout preventer," "BOP," and "BOP stack" are to be given their broadest possible meaning, and include: (i) devices positioned at or near the borehole surface, e.g., the seafloor, which are used to contain or manage pressures or flows associated with a borehole; (ii) devices for containing or managing pressures or flows in a borehole that are associated with a subsea riser; (iii) devices having any number and combination of gates, valves or elastomeric packers for controlling or managing borehole pressures or flows; (iv) a subsea BOP stack, which stack could contain, for example, ram shears, pipe rams, blind rams and annular preventers; and, (v) other such similar combinations and assemblies of flow and pressure management devices to control borehole pressures, flows or both and, in particular, to control or manage emergency flow or pressure situations.

As used herein, unless specified otherwise "offshore" and "offshore drilling activities", "offshore activities" and similar such terms are used in their broadest sense and would include activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed towers, tenders, platforms, barges, jack-ups, floating platforms, drill ships, dynamically positioned drill ships, semi-submersibles and dynamically positioned semi-submersibles. As used herein, unless specified otherwise the term "seafloor" is to be given its broadest possible meaning and would include any surface of the earth that lies under, or is at the bottom of, any body of water, whether fresh or salt water, whether manmade or naturally occurring. As used herein, unless specified otherwise the terms "well" and "borehole" are to be given their broadest possible meaning and include any hole that is bored or otherwise made into the earth's surface, e.g., the seafloor or sea bed, and would further include exploratory, production, abandoned, reentered, reworked, and injection wells.

As used herein, unless specified otherwise the term "fixed platform," would include any structure that has at least a portion of its weight supported by the seafloor. Fixed platforms would include structures such as: free-standing caissons, well-protector jackets, pylons, braced caissons, piled-jackets, skirted piled-jackets, compliant towers, gravity structures, gravity based structures, skirted gravity structures, concrete gravity structures, concrete deep water structures and other combinations and variations of these. Fixed platforms extend from at or below the seafloor to and above the surface of the body of water, e.g., sea level. Deck structures are positioned above the surface of the body of water a top of vertical support members that extend down in to the water to the seafloor. Fixed platforms may have a single vertical support, or multiple vertical supports, e.g., pylons, legs, etc., such as a three, four, or more support members, which may be made from steel, such as large hollow tubular structures, concrete, such as concrete reinforced with metal such as rebar, and combinations of these. These vertical support members are joined together by horizontal and other support members. In a piled-jacket platform the jacket is a derrick like structure having hollow essentially vertical members near its bottom. Piles extend out from these hollow bottom members into the seabed to anchor the platform to the seabed.

The construction and configuration of fixed platforms can vary greatly depending upon several factors, including the intended use for the platform, load and weight requirements, seafloor conditions and geology, location and sea conditions, such as currents, storms, and wave heights. Various types of fixed platforms can be used over a great range of depths from a few feet to several thousands of feet. For example, they may be used in water depths that are very shallow, i.e., less than 50 feet, a few hundred feet, e.g., 100 to 300 feet, and a few thousand feet, e.g., up to about 3,000 feet or even greater depths may be obtained. These structures can be extremely complex and heavy, having a total assembled weight of more than 100,000 tons. They can extend many feet into the seafloor, as deep as 100 feet or more below the seafloor.

As used herein the term "drill pipe" is to be given its broadest possible meaning and includes all forms of pipe used for drilling activities; and refers to a single section or piece of pipe. As used herein the terms "stand of drill pipe," "drill pipe stand," "stand of pipe," "stand" and similar type terms are to be given their broadest possible meaning and include two, three or four sections of drill pipe that have been connected. e.g., joined together, typically by joints having threaded connections. As used herein the terms "drill string," "string," "string of drill pipe," "string of pipe" and similar type terms are to be given their broadest definition and would include a stand or stands joined together for the purpose of being employed in a borehole. Thus, a drill string could include many stands and many hundreds of sections of drill pipe.

As used herein the term "tubular" is to be given its broadest possible meaning and includes drill pipe, casing, riser, coiled tube, composite tube and any similar structures having at least one channel therein that are, or could be used, in the drilling industry. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of tubular is the thickness of the material between the internal diameter of the tubular and the external diameter of the tubular.

As used herein, unless specified otherwise the term "subsea vehicle" is to be given its broadest possible meaning and would include an manned or unmanned apparatus that that is capable of, or intended for, movement and operation on and under the surface of a body of water, whether the body of water is salt water, fresh water, naturally occurring, manmade, including within a structure, such as a pool of water located above a nuclear reactor, a commercial fish farm, a public aquarium or oceanarium, or a pool of water for testing large equipment, such as NASA's astronaut training pools. Subsea vehicles would include, for example, remotely operated vehicles ("ROVs"), unmanned underwater vehicles ("UUVs"), manned underwater vehicles ("MUVs"), autonomous underwater vehicles ("AUVs"), vehicles that have positive buoyancy, variable buoyancy, neutral buoyancy and negative buoyancy, as well as, tracked, wheeled, or skid vehicles, such as subsea tractors and trenchers, that move along, or are otherwise in contact with the seafloor, or a work object, and underwater robots. As used herein, unless specified otherwise, the term "subsea equipment" is to be given its broadest possible meaning and would all subsea vehicles, as well as, other subsea equipment.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

As used herein, unless specified otherwise, "optical connector", "fiber optics connector", "connector" and similar terms should be given their broadest possible meaning and include any component from which a laser beam is or can be propagated, any component into which a laser beam can be propagated, and any component that propagates, receives or both a laser beam in relation to, e.g., free space, (which would include a vacuum, a gas, a liquid, a foam and other non-optical component materials), an optical component, a wave guide, a fiber, and combinations of the forgoing.

As used herein, unless specified otherwise, the terms "ream", "reaming", a borehole, or similar such terms, should be given their broadest possible meaning and includes any activity performed on the sides of a borehole, such as, e.g., smoothing, increasing the diameter of the borehole, removing materials from the sides of the borehole, such as e.g., waxes or filter cakes, and under-reaming.

As used herein the terms "decommissioning," "plugging" and "abandoning" and similar such terms should be given their broadest possible meanings and would include activities relating to permanent abandonment, temporary abandonment, the cutting and removal of casing and other tubulars from a well (above the surface of the earth, below the surface of the earth and both), modification or removal of structures, apparatus, and equipment from a site to return the site to a prescribed condition, the plugback of a borehole to side track or bypass, the modification or removal of structures, apparatus, and equipment that would render such items in a prescribe inoperable condition, the modification or removal of structures, apparatus, and equipment to meet environmental, regulatory, or safety considerations present at the end of such items useful, economical or intended life cycle. Such activities would include for example the removal of onshore, e.g., land based, structures above the earth, below the earth and combinations of these, such as, e.g., the removal of tubulars from within a well in preparation for plugging. The removal of offshore structures above the surface of a body of water, below the surface, and below the seafloor and combinations of these, such as fixed drilling platforms, the removal of conductors, the removal of tubulars from within a well in preparation for plugging, the removal of structures within the earth, such as a section of a conductor that is located below the seafloor and combinations of these.

As used herein the terms "workover," "completion" and "workover and completion" and similar such terms should be given their broadest possible meanings and would include activities that place at or near the completion of drilling a well, activities that take place at or the near the commencement of production from the well, activities that take place on the well when the well is a producing or operating well, activities that take place to reopen or reenter an abandoned or plugged well or branch of a well, and would also include for example, perforating, cementing, acidizing, fracturing, pressure testing, the removal of well debris, removal of plugs, insertion or replacement of production tubing, forming windows in casing to drill or complete lateral or branch wellbores, cutting and milling operations in general, insertion of screens, stimulating, cleaning, testing, analyzing and other such activities. These terms would further include applying heat, directed energy, preferably in the form of a high power laser beam to heat, melt, soften, activate, vaporize, disengage, desiccate and combinations and variations of these, materials in a well, or other structure, to remove, assist in their removal, cleanout, condition and combinations and variation of these, such materials.

2. Discussion of Related Art

Underwater Activities

Over 70% of the earth's surface is covered with water. Over time there has been a considerable amount of activity on, construction in, and development of the seafloor and the water column between the seafloor and the surface of the water. These underwater endeavors would include, for example: underwater pipe lines for oil, gas, communications, and the transport of materials; offshore hydrocarbon exploration and production; offshore renewable energy production, such as tidal and current based systems; the construction and maintenance of supports extending from the seafloor to at or above the water surface, such as pylons, piles, towers, and other structures, that are used to support bridges, piers, windmills and other structures above the surface of the water; the construction and maintenance of water intakes and outlets for enterprises, such as power plants, factories and municipalities. In future years is it anticipated that such endeavors will increase and that new and more complicated underwater activities and structures will arise. Moreover, as with the case of offshore hydrocarbon exploration and production, these endeavors will be moving to deeper and deeper waters. Thus, for example, today drilling and production of hydrocarbon activities at depths of 5000 ft, 10,000 ft and even greater depths are contemplated and carried out.

By way of general illustration of an example of an underwater activity, in drilling a subsea well an initial borehole is made into the seabed and then subsequent and smaller diameter boreholes are drilled to extend the overall depth of the borehole. Thus, as the overall borehole gets deeper its diameter becomes smaller; resulting in what can be envisioned as a telescoping assembly of holes with the largest diameter hole being at the top of the borehole closest to the surface of the earth, e.g., the seafloor.

Thus, by way of example, the starting phases of a subsea drill process may be explained in general as follows. Once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity, are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead secured to it. (In other operations an additional smaller diameter borehole may be drilled, and a smaller diameter casing inserted into that borehole with the wellhead being secured to that smaller diameter casing.) A BOP is then secured to a riser and lowered by the riser to the sea floor; where the BOP is secured to the wellhead. From this point forward all drilling activity in the borehole takes place through the riser and the BOP.

The BOP, along with other equipment and procedures, is used to control and manage pressures and flows in a well. In general, a BOP is a stack of several mechanical devices that have a connected inner cavity extending through these devices. BOP's can have cavities, e.g., bore diameters ranging from about 4⅛" to 26¾." Tubulars are advanced from the offshore drilling rig down the riser, through the BOP cavity and into the borehole. Returns, e.g., drilling mud and cuttings, are removed from the borehole and transmitted through the BOP cavity, up the riser, and to the offshore drilling rig. The BOP stack typically has an annular preventer, which is an expandable packer that functions like a giant sphincter muscle around a tubular. Some annular preventers may also be used or capable of sealing off the cavity when a tubular is not present. When activated, this packer seals against a tubular that is in the BOP cavity, preventing material from flowing through the annulus formed between the outside diameter of the tubular and the wall of the BOP cavity. The BOP stack also typically has ram preventers. As used herein unless specified otherwise, the term "ram preventer" is to be given its broadest definition and would include any mechanical devices that clamp, grab, hold, cut, sever, crush, or combinations thereof, a tubular within a BOP stack, such as shear rams, blind rams, blind-shear rams, pipe rams, variable rams, variable pipe rams, and casing shear rams.

Regardless of the depth, performing subsea operations can be very difficult, costly, time-consuming and damagers. These obstacles and risks, however, greatly increase, and one could say exponentially increase, as the depth of the water becomes greater, and in particular for deep (e.g., about 1,000 ft), very-deep (e.g., about 5,000 ft) and ultra-deep (e.g., about 10,000 ft and greater) depths. Thus, to minimize the risk to human divers, and for those depths where human divers cannot safely go, and tasks that a human diver could not perform unassisted, subsea equipment has been developed.

Subsea Vehicle Tethers

Such subsea vehicles can be connected to surface support equipment that can be located on vessels, such as a ship, barge, or offshore drilling rig, or located on land, by a tether. In general, and prior to the present inventions, subsea vehicle tethers were limited to providing a way to transmit electrical power and control information from the surface support equipment to the subsea equipment and to obtain images, data, and control information back from the subsea equipment. As the complexity and power demands of subsea vehicles increases, so has the complexity and size of tethers, e.g., diameter, complexity, power capabilities, data capabilities, number of cables, wires, and components. Further as the depth of operations increases, and thus the length of the tether needed increases, the thickness of the electrical power supply wires must similarly increase. A tether for a subsea vehicle could include, by way of example, conductors for transmitting electrical power from the surface to subsea equipment, control throughput for telemetry, either metal wires or optical data fibers, video throughput, either metal wires or optical data fibers, data transmission throughput, either metal wires or optical data fibers, a strength member, buoyancy control material, and outer protective sheathing.

Tether Drag

A significant and long-standing problem with subsea vehicles, and in particular floating subsea vehicles, such as ROVs, is the drag that the tether creates. In order for a subsea vehicle to move, or to remain in a stationary position relative to a work piece, fixed structure or the sea floor when a current is present, the vehicle's thrusters, or other form of motive power, must produce enough thrust to overcome the drag created by the vehicle itself and the tether. In most ROV systems tether drag is a very significant drag factor; and as depth of operation increases tether drag quickly becomes the most significant drag factor; and tether drag can be many multiples greater and on an order of magnitude greater than vehicle drag. Thus, for example, it is reported that for a vehicle working at a depth of 500 ft, in a 1-knot current, and having a vehicle surface area of 10 $ft^2$ and a tether having a diameter 0.75" (inches) the vehicle drag would be 25.5 lbs (pounds) and the tether drag would be 106.3 lbs. (see R. Christ & R. Wegni, "The ROV Manual", at p. 32 (2007) (hereinafter Christ, "The ROV Manual").) Thus, "[w]hen operating at depth (versus at the surface), the greatest influence of current is on the tether cable." (Christ, "The ROV Manual," at p. 39.)

As tether length increases tether drag increases. Similarly, as tether diameter increases tether drag increases. Further, as the length of the tether increases, in particular in very deep operations, the diameter of the tether also typically increases, to accommodate the larger electrical power requirements for deeper operations. Thus, a paradigm exists where deep operations require more power and the diameter of the tether is increased to handle the additional power, which in turn further increases the tether drag and requires yet more power.

This paradigm has been described as—"More power drives the cable to become larger, which increases drag, etc. It quickly becomes a vicious design spiral." (Christ, "The ROV Manual," at p. 47.) Thus, it was postulated that the perfect ROV would have "a minimal tether diameter (for instance, a single strand of unshielded optical fiber)"; but then noted that this was not obtainable because "the smaller the tether cable diameter, the better—in all respects (except, of course, power delivery)." (Christ, "The ROV Manual," pp. 18, 29 (emphasis added).) Accordingly, it is believed that until the present inventions, no solution existed to the "vicious design spiral" presented by the tether-drag paradigm.

High Power Laser Beam Conveyance

Prior to the recent breakthroughs at Foro Energy, Inc., it was believed that the transmission of high power laser energy over great distances without substantial loss of power was unobtainable. These breakthroughs in the transmission of high power laser energy, and in particular energy levels greater than about 5 kW, are set forth, in part, in the novel and innovative teachings contained in US patent application publications 2010/0044106, 2010/0044103 and 2010/0215326, and in pending U.S. patent application Ser. Nos. 12/840,978, and 13/210,581; the entire disclosures of each of which are incorporated herein by reference.

SUMMARY

There has been a long-standing need for power sources, tools and related apparatus and systems that can access and perform operations in remote, harsh and difficult to access locations and environments, such as the seafloor, subsea, below the seafloor, off-shore, mines, boreholes, pipelines, nuclear facilities, chemical facilities and other facilities and locations. There has also been a long-standing need for power sources for use in such environments and under such conditions. There has further been a long-standing need for assemblies that perform precise and controlled cutting operations, boring operations, cleaning operations, removal operations, and other types of operations in such environments and locations. Moreover, in the design and operation of subsea vehicles and subsea equipment, as well as potentially other tethered equipment, the vicious design spiral presented by the tether-drag paradigm has been a long-standing problem. The present invention, among other things, solves these needs by providing the articles of manufacture, devices and processes taught herein.

There is provided a high power laser subsea vehicle system having a high power laser for providing a coherent light energy, a high power laser tether for transmitting the coherent light energy, a subsea vehicle having a device for converting the coherent light energy, so that the high power laser, the high power laser tether and the device for converting the coherent light energy are in optical association with one another; in this manner the coherent light energy is converted in the subsea vehicle to provide energy for an operation of the subsea vehicle. This high power laser subsea vehicle system may further include a subsea vehicle from the group of devices including: a remotely operated vehicle, a subsea tractor, a subsea trencher, and a subsea excavation tool. The forgoing high power laser subsea vehicle systems may also have operations of the subsea vehicle that are from the group including the operation of a thruster, the operation of a mechanical tool, the operation of a camera, and the operation of a light. Such high power laser subsea vehicle systems may also have a high power laser-cutting tool, which may include such a cutting tool that can be used for cleaning and other laser operations on work pieces, work areas and work locations.

Yet further there is provided a high power laser subsea vehicle system having a high power laser for providing a coherent light energy, a high power laser tether for transmitting the coherent light energy, a subsea vehicle having a device for converting the coherent light energy, so that the high power laser, the high power laser tether and the device for converting the coherent light energy are in optical association with one another; in this manner the coherent light energy is converted in the subsea vehicle to provide energy for an operation of the subsea vehicle, which system has: a first and a second high power optical fiber; in which at least one of the first or the second high power optical fibers has a core having a diameter of at least about 200 μm; and, in which the first high power optical fiber is in optical association with the laser-cutting tool, and the second high power optical fiber is in optical association with the device for converting the coherent light energy. Such a system may also have a third high power optical fiber in optical association with the high power laser and in optical association with a device for directing the coherent light energy, and in which at least one of the first or the second high power optical fibers is in optical association with the device for directing. And, may also have: a configuration in which the first high power optical fiber is in direct optical association with the laser-cutting tool, and the second high power optical fiber is in optical association with the device for converting the coherent light energy; and, a configuration in which the first high power optical fiber is in optical association with the laser-cutting tool, and the second high power optical fiber is in direct optical association with the device for converting the coherent light energy.

Additionally, there is provided a high power laser subsea vehicle system having an optical fiber having a core having a diameter of at least about 300 μm, 500 μm, and at least about 700 μm and a fiber length of at least about 1,000 feet, at least about 2,000 feet, at least about 5,000 feet, whereby the optical fiber is contained within and protected by the high power tether.

Yet further, there are provided high power laser subsea vehicle systems: in which the device for directing the laser beam is located within the subsea vehicle; having a device for delivering a high power laser beam to a work location below sea level; in which the device for converting the coherent light energy is selected from the group consisting of a quantum well, a micro array antenna, a steam engine, and a turbine engine; in which the device for converting the coherent light energy is a sterling engine; in which the device for converting the coherent light energy is a laser photovoltaic assembly; in which the device for converting the coherent light energy is a photovoltaic assembly; or, in which the device for converting the coherent light source is a photovoltaic cell.

Still further there is provided a high power laser subsea vehicle system, in which the laser photovoltaic assembly has: an optically active surface; and, a device for providing a predetermined energy distribution pattern to the optically active surface. The optically active surface may also have a plurality of photovoltaic cells.

Moreover, there is provided a high power laser system in which the optically active surface defines an inner surface of the laser photovoltaic assembly and has a plurality of photovoltaic cells. Still further, the high power laser system may include photovoltaic cells have a material selected from the following group: $Al_xIn_yGa_{1-x-y}As$, in which $0 \leq x \leq 0.45$ and $0 \leq y \leq 1$; $Si_xGe_{1-x}$, in which $0 \leq x \leq 1$; $Al_xIn_yGa_{1-x-y}P$, in which $0 \leq x \leq 0.80$ and $0 \leq y \leq 1$; $Al_xIn_yGa_{1-x-y}N$, in which $0 \leq x \leq 0.5$, and $0.1 \leq y \leq 1$; $In_xGa_{1-x}Sb$, in which $0 \leq x \leq 0.3$; $In_xGa_{1-x}N_yAs_{1-y}$, in which $0 \leq x \leq 0.3$ and $0 < y \leq 0.1$; and $In_xGa_{1-x}As_yP_{1-y}$, in which $0 \leq x \leq 1$ and $0 \leq y \leq 1$. Such photovoltaic cells may also have an alloy of one or more elements selected from the following group: Al, In, Ga, Si, Sb, N, P and As.

Furthermore, there is provided high power laser subsea vehicle systems: in which the device for providing a predetermined energy distribution pattern to the optically active surface haves a collimating lens; in which the device for providing a predetermined energy distribution pattern to the optically active surface haves an optical fiber face; in which the device for providing a predetermined energy distribution pattern to the optically active surface haves a lens; in which the laser photovoltaic assembly has: an optically active surface; a device for providing a predetermined energy distribution pattern to the optically active surface; and, a device for controlling the temperature of the photovoltaic assembly; in which the device for controlling the temperature of the photovoltaic assembly includes seawater; in which the device for controlling the temperature of the photovoltaic assembly includes water from a body of water in which the subsea vehicle is submerged or operating; in which the device for controlling the temperature of the photovoltaic assembly includes flowing water from a body of water in which the subsea vehicle is submerged around the laser photovoltaic assembly and then discharging the water to the body of water; in which the device for controlling the temperature of the photovoltaic assembly has flowing seawater; or in which the device for controlling the temperature of the photovoltaic assembly has non-recirculating water.

Yet further, there is provided a high power laser system for providing high power laser energy to an operations unit for use at a remote distant location for utilizing the high power laser energy at the local to provide a source of power, the system having: a high power laser for providing a high power laser beam of coherent light energy; a high power laser tether for transmitting the high power laser beam of coherent light energy; an operations unit; a device comprising a device for converting the coherent light energy; and, the high power laser, the high power laser tether and the device for converting the coherent light energy in optical association with one another; in this manner the coherent light energy is converted to provide energy for an operation of the operations unit. Such high power laser system may further include systems in which the operations unit is selected from the following group of devices or tools: a robot, a down hole tool, a drilling tool, a mining tool, a cutting tool, a cleaning tool, a remotely operated vehicle, a subsea tractor, a subsea trencher, and a subsea excavation tool.

Still further, there is provided a high power laser systems, including a subsea vehicle high power laser systems: in which the tether is characterized by: a weight-power-distance value of less than about 1,000; a weight-power-distance value less than about 500; a weight-power-distance value less than about 100; or a weight-power-distance value from about 2 to about 50.

Still further there is provided a high power laser subsea vehicle system of having a submersible tether management system, the tether management system having a frame, the frame having a laser housing, in which the laser housing is submergible and has a pressure rating of at least about 2,000 psi, and in which the high power laser is located within the laser housing and is protected thereby upon submersion.

Yet still further, there is provided a high power laser subsea vehicle systems: in which the high power laser subsea system provides at least about 5 kW of laser power to the device for converting the coherent light energy; in which the high power laser subsea system provides at least about 10 kW of laser power to the device for converting the coherent light energy; or in which the high power laser subsea system provides at least about 15 kW of laser power to the device for converting the coherent light energy.

Additionally, there is provided a high power laser ROV system having a support vessel, the support vessel having a laser housing containing a high power laser, the high power laser capable of propagating at least a 10 kW laser beam; a tether having a distal end and a proximal end defining a length there between, and having a high power optical fiber having a length equal to or greater than the length of the tether; a device for playing out and retrieving the tether; a remotely operated vehicle; the support vessel having a device for handling the remotely operated vehicle; and, a proximal end of the tether in optical communication with the high power laser and a distal end of the tether in optical communication with the remotely operated vehicle.

Additionally, there is provided high power laser systems, in which the tether has a plurality of high power optical fibers.

Still further there is provided a high power laser systems: in which the high power laser provides a laser beam having a predetermined wavelength range and the laser photovoltaic assembly is optimized for the predetermined wavelength range; in which the laser beam has a predetermined wavelength range selected in part for the reduction of non-linear effects; in which the laser beam has a predetermined wavelength range selected in part for the optimization of the laser photovoltaic assembly; in which the high power laser provides a laser beam having a predetermined wavelength range and the laser photovoltaic assembly and the wavelength range are matched; or in which the predetermined laser wavelength range is from about 1060 nm to 1080 nm and the laser photovoltaic assembly haves a photovoltaic cell.

Furthermore, there is provided a high power laser system having a high power laser, the high power laser capable of propagating at least a 15 kW laser beam; an umbilical having a distal end and a proximal end defining a length there between and the umbilical having a high power optical fiber; a device for playing out and retrieving the umbilical; a remote device having a photo-conversion device; and, the proximal end of the umbilical in optical communication with the high power laser and the distal end of the umbilical in optical communication with the remote device; in which the umbilical length is at least about 1000 feet and the system is capable of delivering at least about 10 kW to the remote device.

Still further, there is provided a high power laser system in which the laser photovoltaic assembly has: an optical fiber having a face for launching the laser beam into the photovoltaic device; a housing having an inner optically active surface and an outer surface; the housing having an opening for receiving the laser beam from the fiber face; and the housing having a cooling device.

Still further there is provided a high power laser system in which the inner optically active surface has a back reflections managing means.

Moreover there are provided high power laser systems: in which the inner optically active surface defines a disc; in which the inner optically active surface defines a portion of a sphere; in which the inner optically active surface defines a wood's horn; or in which the inner optically active surface defines a cylinder having an open end and a closed end.

There is provided a method of performing laser powered operations by a subsea device, the method including: optically associating a subsea device with a high power laser by means of a high power laser tether having a high power laser fiber; lowering the subsea device into a body of water; propagating a high power laser beam; launching the high power laser beam into the high power laser fiber in the high power laser tether; transmitting the high power laser beam through the high power laser fiber to the subsea device without substantial loss of power; converting at least a portion of the laser beam into electrical energy; and, utilizing the electrical energy to power an operation of the subsea device. Such method may also be such that at least a portion of the laser beam is directed at a work area located below a surface of the body of water.

BRIEF DESCRIPTION OF THE DRAWINGS

FIG. 3A is a perspective view of a laser-photovoltaic assembly in accordance with the present invention.

FIG. 3B is a cross-sectional view of the laser-photovoltaic system of FIG. 3A taken along line B-B of FIG. 3A.

FIG. 3C is a cross-sectional view of the laser-photovoltaic system of FIG. 3A taken along line C-C of FIG. 3A.

FIG. 12 is a perspective view of a laser subsea vehicle system of the present invention engaged in subsea laser operations in accordance with the present invention.

FIG. 14 is a cross-sectional perspective view of a laser-photovoltaic assembly in accordance with the present invention.

FIG. 15 is a cross-sectional schematic view of a laser-photovoltaic assembly in accordance with the present invention.

FIG. 16 is a cross-sectional schematic view of a laser-photovoltaic assembly in accordance with the present invention.

DESCRIPTION OF THE PREFERRED EMBODIMENTS

Figure 1:
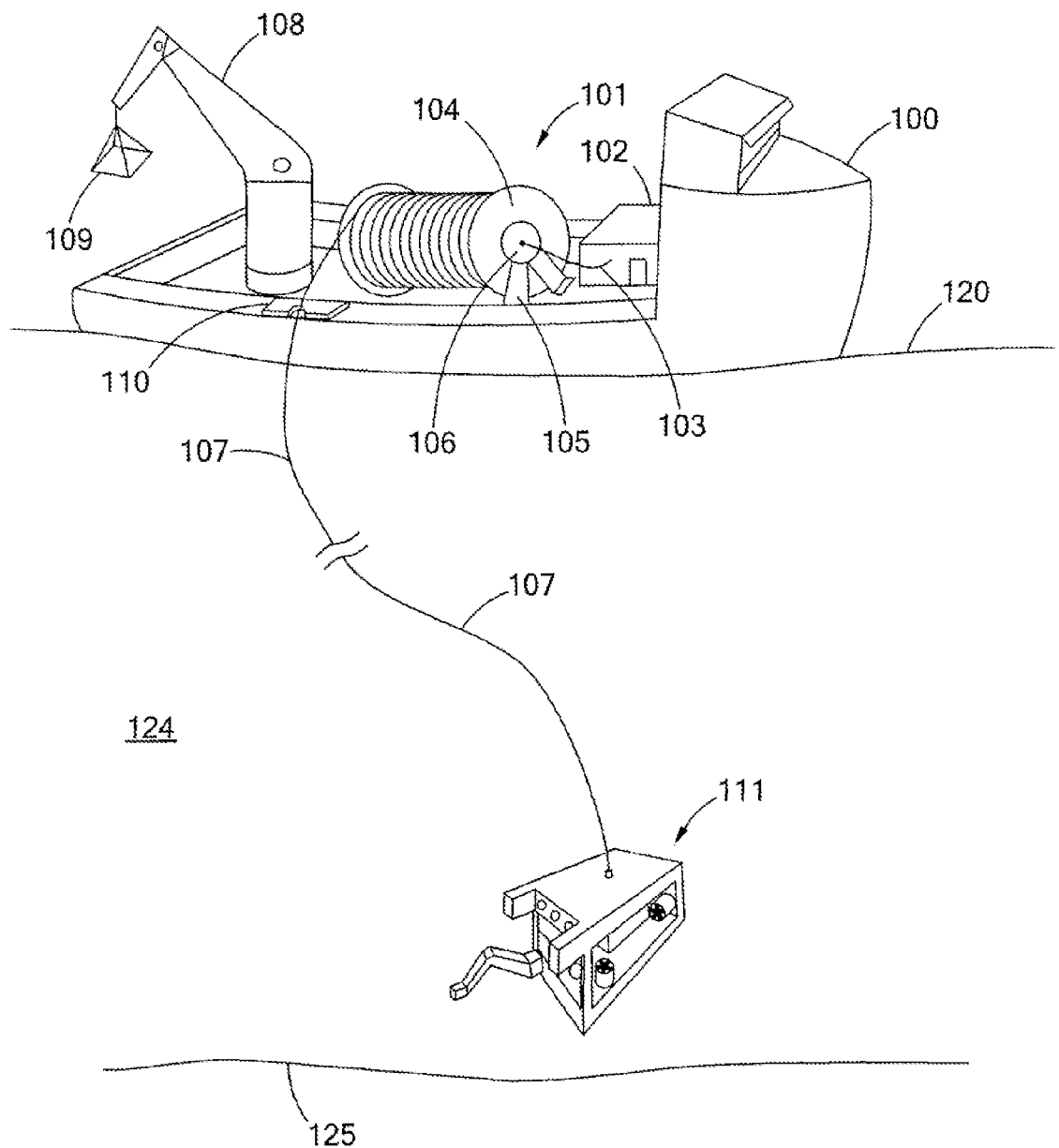
FIG. 1 is a perspective view of an embodiment of a laser subsea vehicle system in accordance with the present invention.

In general, the present inventions relate to system, tools and assemblies that utilize laser energy to perform various operations, for example, a laser apparatus that may perform laser cutting operations, cleaning operations, conversion of laser power to other forms of energy or power, or other types of laser operations, as well as, potentially other non-laser operations; and which may also have assemblies that utilize laser energy to provide electrical, mechanical, thermal, or electro-mechanical energies, and combinations and variations of these energies. The present inventions further provide the ability, to have and to use, such apparatus in remote, hostile, extreme, difficult to access locations, and combinations and variations of these, such as, subsea equipment, mining equipment, drilling equipment, flow control equipment, well and rig plugging, abandonment and decommissioning equipment, and nuclear remediation, monitoring and decommissioning equipment.

By way of illustration of laser equipment for use in remote and hazardous environments, the present inventions embrace novel subsea equipment that utilizes high power laser energy, including high power laser cables as tethers, such as subsea vehicles, remotely operated vehicles ("ROV"s), subsea tractors, subsea trenchers, and subsea excavation tools. It being recognized that the present inventions may also find applicability in many other applications and fields, in addition to the subsea field, such as mining, drilling, offshore above the surface, oil, natural gas and geothermal, construction, remediation, military, pipelines, nuclear and others. Thus, in general, and by way of illustration, the present inventions relate to laser subsea equipment and laser tools, systems for operating such equipment and tools, and may include laser powered subsea equipment, such as a laser subsea vehicle, e.g., a laser remotely operated vehicle ("ROV"), and subsea equipment, whether laser powered or not, that utilize high power laser delivery assemblies for performing subsea laser operations, such as the cutting, cleaning, welding or removal of material, objects and structures.

By way of general illustration there is provided a laser ROV system that uses a high power laser that is in optical communication, by way of a high power optical fiber cable, with a photo-electric conversion device that is located in an ROV.

The high power optical fiber cable can be made up of a high power optical fiber. These fibers may be very thin on the order of hundreds of μm (microns). These high power optical fibers have the capability to transmit high power laser energy having many kW of power over many hundreds and thousands of feet. The laser-ROVs of the present invention substantially reduce the tether drag associated with conventional electrical powered tethers, by substantially reducing the thickness of the tether. Further, and of particular value for smaller support vessels, the high power optical fibers weigh less per foot of fiber than electrical cables. This weight difference can be important, for example when comparing the weight of 10,000 feet of ROV tether for a conventional ROV, with the weight of 10,000 feet of, for example 600 μm high power optical fiber. Thus, the weight of the tether, which on many vessels is stored or positioned above the deck of the ship, can be substantially reduced.

Thus, for example, 10 kW of laser power may be delivered over an umbilical having a fiber having a 600 μm (micron) core, (the core having a weight of 0.62 g/m) the umbilical having a length of 1 km. This provides for a weight-power-distance ("WPD") value of 4. The WPB value is determined by the formula—$a*b^2*c$—where "a" is the delivered laser power, or maximum deliverable, power in kW; "b" is the weight of the core of a fiber in the umbilical in g/m; and "c" is the length of the umbilical in km. For multi-fiber umbilicals, if any one fiber meets the specified WPD value, than the umbilical is considered as having that WPD value. Preferably, umbilicals may have WPD values of less than about 500, less than about 200, and less than about 100. More, preferably the WPD values may be from about 2 to about 250, and from about 5 to about 50. Further, in some embodiments and applications greater WPD values are contemplated. For a conventional, electrically conductive wire "b" would the weight of the electrically conductive material, e.g., copper wire, in g/m. In general, "b" for copper wire would be on the order of magnitudes greater than for an optical fiber.

The energy that is transmitted down the high power optical fiber is in the form high power laser energy, i.e., high power light having a very narrow wavelength distribution. To be used in the ROV this high power may be converted to electrical, thermal, electro-mechanical and/or mechanical energy. A laser photo-conversion device may be used for this purpose and is located within, associated with, or as a part of the ROV. This device may be associated with a housing that is attached to the ROV frame, or it may be contained in an ROV tether management systems (TMS) (for example a TMS such as that disclosed in U.S. Pat. No. 6,260,504 the entire disclosure of which is incorporated herein by reference), or it may be otherwise associated with the ROV.

Photo-conversion devices can be any such device(s) that are known to the art, or may be later developed by the art, for the conversion of light energy, and in particular laser light energy (i.e., a laser photo-conversion device), into electrical, thermal, mechanical, electro-mechanical energies and combinations and variations of these energy types. For example, photovoltaic ("PV") devices may be used, a quantum well may be used, a micro array antenna assembly that employs the direct coupling of photons to a micro array antenna (the term micro array antenna is used in the broadest sense possible and would include for example nano-wires, semi conducting nano-wires, micro-antennas, photonic crystals, and dendritic patterned arrays) to create oscillatory motion to then drive a current may be used, plasmonic nanostructure, electron excitation and ejection, a sterling engine with the laser energy providing the heat source may be used, a steam engine or a turbine engine with the laser energy providing the heat source may be used (see, e.g., U.S. Pat. No. 6,837,759, which uses a chemical reaction as a heat source turbine engine in an ROV, the entire disclosure of which is incorporated herein by reference).

For size considerations, as well as over all system costs, in general, all other factors being equal, the greater the efficiency of the photo-conversion device in turning the laser energy into electric energy the more desirable. It being understood that in all of these consideration there are design tradeoffs for the ROV, tool, robot, laser application device, and for specific applications, conditions and environments. While it is generally desirable to have the ROV as small as possible, to reduce the ROV's drag, some increase in size may be acceptable to obtain a higher power conversion rate by using a larger photo-conversion device. Preferably the photo-conversion device is of the type of the novel photovoltaic device(s) provided in this specification.

The high power optical fiber further provides the ability, in a single fiber, to convey high power laser energy down to the ROV, tool, robot, or other laser application device, convey control signals and data down to the ROV, tool, robot, or other laser application device, and convey up from the ROV, tool, robot, or other laser application device, control information and data (including video data). In this manner the high power optical fiber has the ability to perform, in a single very thin, e.g., less than 1000 μm diameter fiber, the functions of transmitting operating power, transmitting and receiving control information, and transmitting data and other information from a remote location or the distal end (e.g., the laser device end) of the fiber (data could also be transmitted down the optical cable to the distal end). As used herein the term "control information" is to be given its broadest meaning possible and would include all types of communication to and from the ROV, tool, robot, or other laser application device, and to and from such devices' components and systems that would provide for the control of such devices, their movements, and/or their operations. In addition to a single fiber, and in particular because of their thinness and low weight, multiple fibers (e.g., one, two, three, four or more) can be utilized.

Additionally, either as a single fiber, in which case a high power beam splitter, switch or both, will be needed within, for example, an ROV, or by way of a second high power fiber, the high power laser energy can be used to power a laser delivery tool, which can be located on a manipulator arm of for example, an ROV, or otherwise associated with the ROV, or be a stand-alone tool or device. The laser delivery tool has the capability to deliver high power laser energy to a subsea target to perform an operation on that target. Thus, an ROV with a high power laser tool can be used to perform tasks, such as for example, cutting of tubulars, removal of biologic growth, sediments, and materials from subsea structures, welding of materials, trenching and the removal, in particular of hard materials, such as hard rocks or concrete, present at the surface of the seafloor during a trenching operation.

When packaging the high power laser fiber into a tether, depending upon the intended use, only a single fiber configured as an optical cable, having shielding may be used. However, it is preferred that the fiber be contained in a protective tube that also provides strength. Further, buoyancy issues should be taken into consideration when making a tether and the packaging of the fiber should have material incorporated therein, or associated therewith, to set the buoyancy, whether it be neutral, positive or negative.

Additionally, fairings may be employed to further reduce the drag of the optical fiber and/or optical fiber tether. For example, when multiple fibers, fibers and cables, or cables are used the may be contained with, as a part of or otherwise associated with an outer member that has a shape designed to reduce drag, such as having the cables and/or fibers in a line, giving rise to a flat or ribbon type of tether, and which could further have tapered or narrowed edges at the sides of the ribbon like structure.

Turning to FIG. 1 there is illustrated an embodiment of a laser-ROV system having a support vessel 100. The support vessel 100 could by any type of ship, boat or barge, that is suitable for the operational conditions of the laser-ROV (e.g., sea conditions, weight requirements, deck space requirements, etc.) The support vessel could also be an offshore oilrig, or a submarine (manned or unmanned). Additionally, instead of a support vessel a shore-based support system could be employed. The support vessel contains a laser housing or laser room 102, which contains a high power laser(s) and laser support equipment. The high power laser is optically connected to an optical slip ring assembly 106, by way of high power optical fiber 103. The optical slip ring assembly 106 is positioned in, or otherwise associated with, a spool 104 containing a high power laser tether 107. The spool has supports 105. The support vessel 100 may further have a crane 108, or other lifting device, which has an attachment device 109 for securing and lifting the ROV 111 in and out of the body of water 124. The attachment device 109 could be a custom made device for a particular ROV, or it could be as simple as a hook, shackle or choker. The vessel 100 is shown on the surface 120 of a body of water 124 with a laser powered ROV 111 being shown as it approaches the seafloor 125. There is also shown a tether-handling device 110, which in this embodiment is attached to the vessel 110, positioned above the surface 120 of the body of water 124.

Turning to FIG. 2 there is shown an embodiment of a laser-ROV 211 that is operating in a body of water 224. The laser-ROV 211 has an ROV frame 213, which supports a tether attachment device 212, which is attached to high power laser tether 207. The laser-ROV has a tether attachment device 212, which places the tether, either directly or indirectly through other optical components, in optical association with the components of the photo-electric housing 216. The tether attachment device 212 may have a connecting or coupling device as provided in U.S. Patent Application Ser. No. 61/493,174, the entire disclosure of which is incorporated herein by reference, or it may have a commercially available high power laser connector or coupler. The ROV 211 also has operational testing and observation related equipment, such as a lights 217, 221, a sensor 218 such as a temperature sensor, and a camera 219. The laser-ROV 211 has thrusters, for example thruster 215, 214. The ROV has a manipulator arm 222, which has a tool 223, for example a laser cutter.

The laser cutter may be optically associated with the tether. The tether may have separate high power fibers for providing high power energy to the laser cutter and to a photo-conversion device, or the tether may have a single high power fiber for providing laser energy to the photo-conversion device and the laser cutter. A high power optical cable, external to the out cover of the tether, but which may be associated therewith, such as by cable ties, may also be used to provide laser energy to the laser cutter.

Figure 2A:
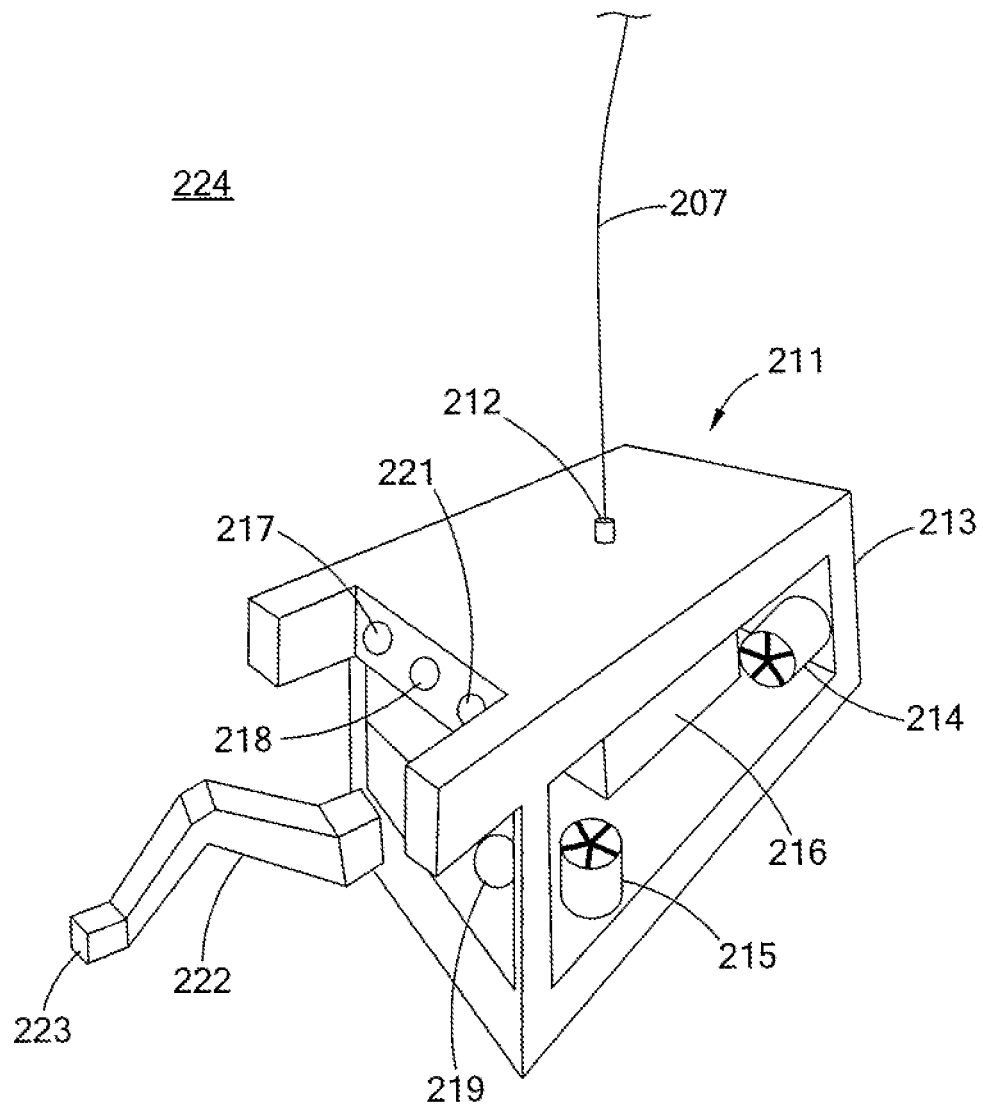
FIG. 2A is a perspective view of a laser subsea vehicle system in accordance with the present invention.
Figure 2B:
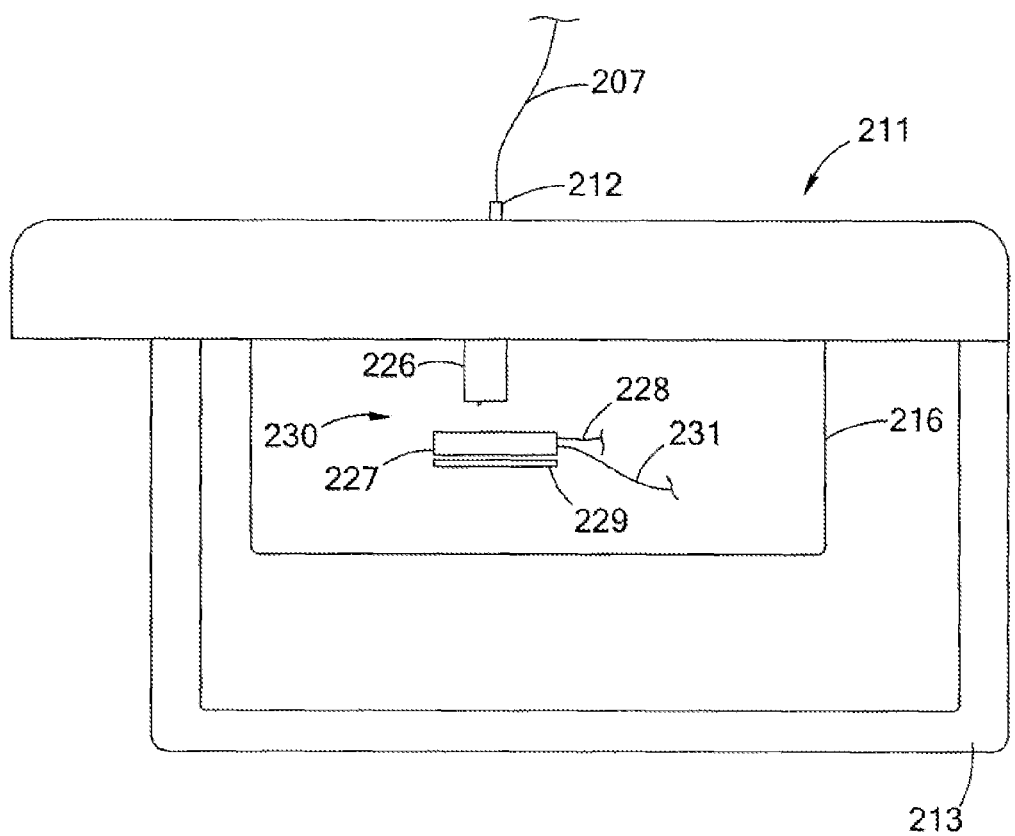
FIG. 2B is schematic view of a laser subsea vehicle in accordance with the present invention.

Turning to FIG. 2B there is shown a cross-sectional schematic view of the laser-ROV 211 of FIG. 2A. In FIG. 2B there is provided a laser photovoltaic assembly 230, contained within the photo-electric housing 216. The laser photovoltaic assembly 230 having a laser delivery assembly 226 and a photovoltaic component 227, and a thermal management device 229, e.g., a cooling device. The high power laser tether 207 and the tether attachment 212 may be associated with the frame 213 and are at least partially contained within, or otherwise associated with housing 216. One or more or all of the tether 207, the tether attachment 212, the laser delivery assembly 226, may be permanently attached and in optical communication, releasably attached and in optical communication, and combinations and variations of these. Electrical wires or cable 228, 231 are connected to the photovoltaic component 227 and to form an electric circuit and convey electricity generated by the photovoltaic assembly to the systems, batteries, equipment and apparatus of the ROV.

FIGS. 3A-C, 4 and 5 provide examples of embodiments of laser-photovoltaic assemblies. In general photovoltaics are semiconductor materials that are used to convert light directly into electricity at the atomic level. These materials exhibit a property known as the photovoltaic effect.

Photovoltaics are used, and well known, to those of skill in the semiconductor, solar panel, solar energy and related arts. In general solar panels, and thus, most photovoltaic cells and semiconductor materials evidencing a photovoltaic effect are designed to handle sunlight. Sunlight is light that contains a broad distribution of wavelengths and is not coherent. Although some of these solar panels, cells and materials may be more efficient than others at converting certain wavelengths, or wavelength bands within the broad spectrum of sunlight, to electric energy, these conventional, solar based, materials, structures and assemblies, have little to no applicability for the present photovoltaic assemblies, and have substantial drawbacks and negatives, e.g., size, weight, grid design and overall series resistance, efficiency, and shape, to their use in laser-powered tools and assembles.

Thus, preferably, the novel laser-photovoltaic assemblies and materials, of the types disclosed herein are employed in the laser-powered tools and assemblies contemplated by this specification. In general, in these assemblies and materials, a specifically selected (or designed) photovoltaic material(s) is matched with a narrow wavelength band of light, and in particular coherent light, to optimize the efficiency of the conversion of the light energy to electric energy. In particular, and by way of illustration, a narrow band of wavelengths of light, e.g., less than 10 nm, less than 5 nm, and less than 2 nm, may be paired with a particular type of photovoltaic material or cells.

Further, the selection of the wavelength and the photovoltaic material may also be based upon minimizing the amount of transmission losses to the laser beam from non-linear effects as the laser beam is transmitted by the optical fiber from the laser to the laser-powered tool, e.g., from the laser on the ship through the tether to the ROV. Preferably, the photovoltaic materials and the laser, and in particular the laser beam wavelength (or wavelength band width), should be selected to optimization both the reduction in non-linear effects and the power conversion efficiency. Thus, for example, a 1.5 μm diode laser may be used with a GaSb (Gallium Antimony) photovoltaic material.

Turning to FIGS. 3A to 3B there is provided a perspective view, a longitudinal cross-sectional view and a transverse cross-sectional view, respectively, of an embodiment of a laser-photovoltaic ("laser-PV") assembly 300, having an optical fiber 301 having a fiber face 302 from which a high power laser beam 311 is propagated, or launched. The laser beam 311 is launched into a photovoltaic assembly ("PV assembly") 303, which has a cooling jacket 304; other types of cooling devices may be employed provided that they can dissipate or otherwise manage the excess heat that is produced by the high power laser beam contacting the photovoltaic cells, e.g., 305, 306, 307, 308, 309, and potentially other sections of the photovoltaic assembly 303 inner side surface 310 and inner bottom surface 321. The photovoltaic assembly 303 is in the shape of a tube having a sealed bottom. Thus, the photovoltaic assembly 303 has an inner side surface 310 and an inner circular bottom surface 321. Both inner surfaces are covered with, have, or are, photovoltaic cells ("PV cells"), preferably made up of a material that was selected to match the wavelength of the laser beam 311 (or visa versa, i.e., the laser beam could be selected to match the photovoltaic material(s) used in the photovoltaic cells; recognizing that the selection of the wavelength may, and preferably should, also take into consideration the reduction of non-linear effects). The photovoltaic assembly 303 and the laser-PV assembly 300 have an axis 322, that in this figure is normal to the fiber face 302, and which may also preferably be coaxial with the fibers axis, at least at or near, the area of the fiber face 302. The laser beam 311 diverges as it leaves the fiber face 302 and forms an angle 312 with the axis 322. The laser beam 311 then enters photovoltaic assembly 303 through opening 319 and impinges upon, or strikes, the inner side surface 310 and the side photovoltaic cells, e.g., 306. The laser beam 311 first contacts the photovoltaic assembly 303 at angle 315. At that point, some of the laser energy is absorbed by the photovoltaic cells and converted to electricity, while other of the laser energy from the laser beam 311, is reflected further into the photovoltaic assembly 303. This action of reflection, is shown by representative reflected laser beam rays 313, 314. The laser beam reflects off of the inner side surface 310 initially at angle 316. It being understood that there will be many different rays and angles as the laser beam 311 is reflected and propagated further into the photovoltaic assembly 303. (Although not shown, there may also be reflections from the bottom surface 321, back through the photovoltaic assembly 303.)

Further with this and other laser-PV assemblies the optics, and the configuration of the fiber face can be used to optimize the path and beam profile of the laser beam as it interacts with the PV cells in the PV assembly. Further, the shape of the PV assembly and the location of the cells in the assembly can be optimized for a particular laser beam profile or visa versa, to optimize the overall power conversion efficiency of the laser-PV assembly.

Figure 4:
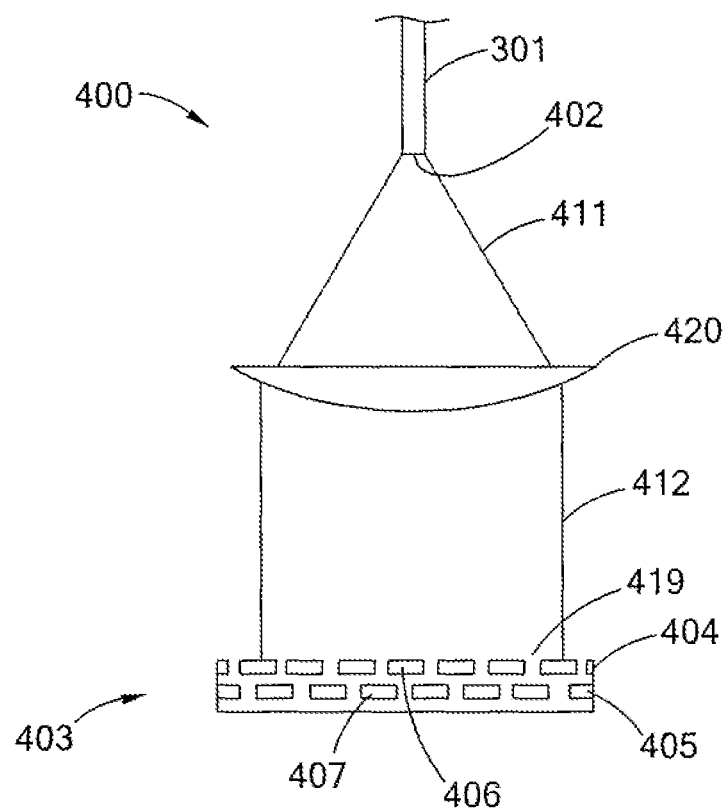
FIG. 4 is a schematic view of a laser-photovoltaic assembly in accordance with the present invention.

In FIG. 4 there is provided an embodiment of a laser-PV assembly 400 having a multilayer disc type PV assembly 403.

In this embodiment the high power laser beam 411 is launched from fiber face 402 and diverges from the fiber face until entering collimating optics 420, where it then leaves those optics as a collimated beam 412 and travels to the PV assembly opening 419, into the PV assembly 403, and strikes the first layer 404 of PV cells, e.g., 406. Some of the laser beam 412 passes through or past the first layer 404 and then strikes the second layer 405 of PV cells, e.g., 407. Preferably, a cooling means or thermal management means (not shown) is used with this PV assembly. Although shown as two staggered layers, additional staggered layers may be employed, or only a single layer uniform layer, e.g., plainer and non-staggered, may be used. The staggering, and relative positioning of the staggered layers may provided benefits to heat management issues, overall space, i.e., size, considerations and the management of back reflections.

Figure 5:
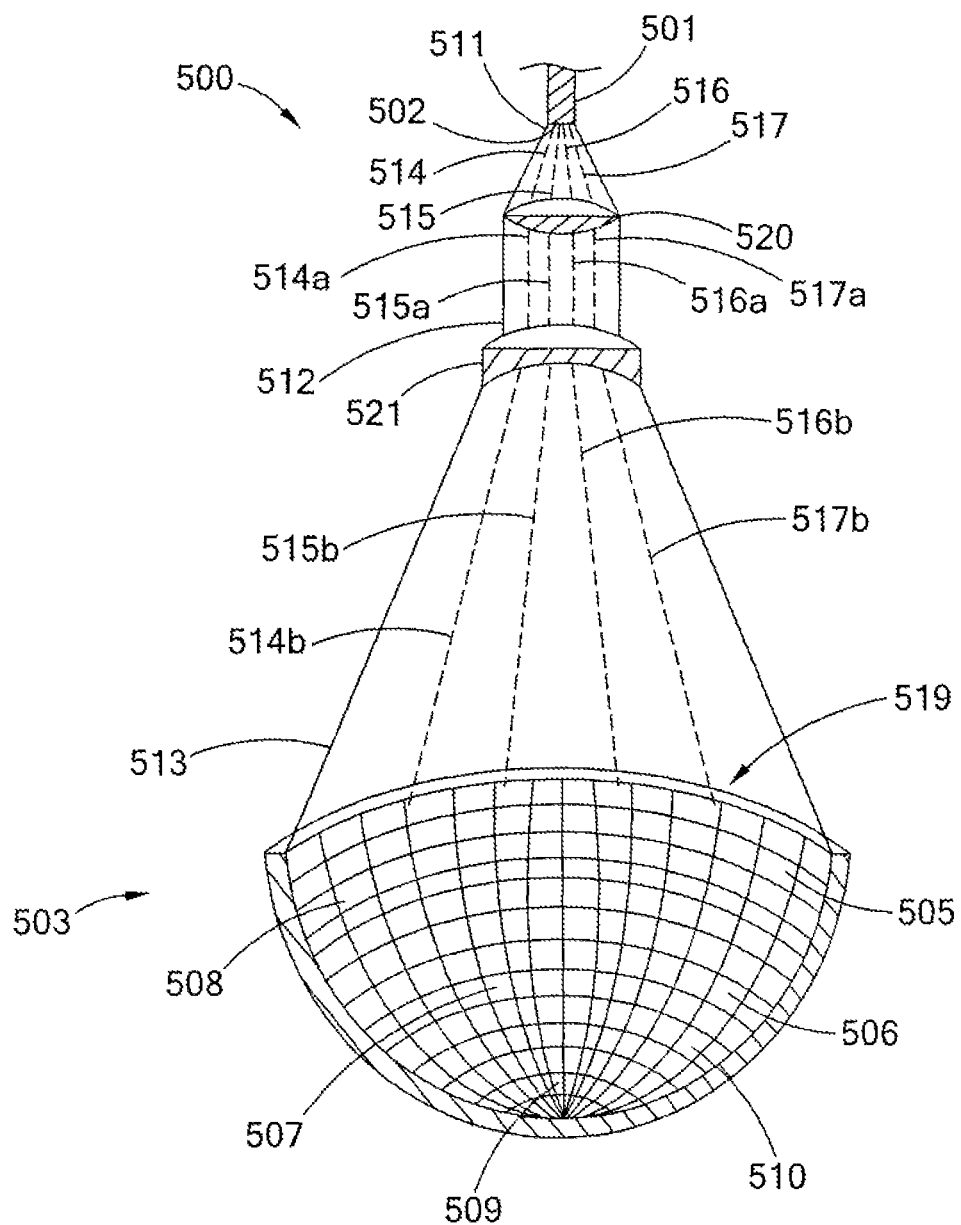
FIG. 5 is a cross-sectional perspective view of a laser-photovoltaic assembly in accordance with the present invention.

In FIG. 5 there is provided an example of an embodiment of a laser-PV assembly 500 having a hemispherical type PV assembly 503. In this embodiment a high power laser beam 511 is launched from the face 502 of an optical fiber 501. The laser beam 511 diverges, as shown by exemplary and illustrative rays 514, 515, 516, 517 until it enters collimating optics 520, where it leaves as a collimated beam 512 as shown by exemplary and illustrative rays 514a, 515a, 516a, 517a. Collimated beam 512 then enters diverging optics 521, where it leaves as diverging beam 513, as shown by exemplary and illustrative rays 514b, 515b, 516b, 517b and enters the PV assembly 503 by way of opening 519. The PV assembly 503 is in a half-hemispherical shape, e.g., a half of a hollow ball. The PV assembly 503 has a hemispherical inner surface 510 that has, contains or holds, PV cells, e.g., 505, 506, 507, 508, 509, 510.

The optics, fiber types, fiber face, heat management, cooling, number of fiber, laser power, laser type, other considerations, and shapes and configurations of assembles can be arranged and configured in many different ways and combinations without departing from the spirit of the present inventions. In the embodiments of FIGS. 3 and 5 the optically active surfaces, e.g., the surfaces that are designed to, capable of, or intended to, receive laser energy and convert that energy into electricity such as by having, or being made up by, PV cells or otherwise having a photovoltaic material, are on the inside of the assembly. It is contemplated that these optically active surfaces, i.e., the surfaces of, may be on the outside of the assembly, on the outside and inside, on flat panel like structures, e.g., the embodiment of FIG. 4, discs, balls, other shapes, and other combinations and variations of these.

Thus, these various configurations and considerations may be used to provide predetermined and specific energies (e.g., W/cm$^2$) and predetermined and specific energy distributions patterns (e.g., W/cm$^2$ on a PV cell-by-cell basis), on the optically active surfaces of the PV assembly. Thus, using the embodiment of FIG. 5 by way of illustration, examples of different laser energies on a particular PV cell for exemplary energy distribution patterns are provided in Table I.

TABLE I

| Energy distribution pattern | PV cell 505 | PV cell 506 | PV cell 507 | PV cell 508 | PV cell 509 | PV cell 510 |
| --- | --- | --- | --- | --- | --- | --- |
| 1 | 200 W/cm$^2$ | 200 W/cm$^2$ | 200 W/cm$^2$ | 200 W/cm$^2$ | 200 W/cm$^2$ | 200 W/cm$^2$ |
| 2 | 200 W/cm$^2$ | 200 W/cm$^2$ | 200 W/cm$^2$ | 200 W/cm$^2$ | 0 W/cm$^2$ | 200 W/cm$^2$ |
| 3 | 100 W/cm$^2$ | 200 W/cm$^2$ | 200 W/cm$^2$ | 100 W/cm$^2$ | 10 W/cm$^2$ | 100 W/cm$^2$ |
| 4 | 25 W/cm$^2$ | 75 W/cm$^2$ | 75 W/cm$^2$ | 25 W/cm$^2$ | 350 W/cm$^2$ | 200 W/cm$^2$ |
| 5 | 300 W/cm$^2$ | 200 W/cm$^2$ | 50 W/cm$^2$ | 10 W/cm$^2$ | 50 W/cm$^2$ | 100 W/cm$^2$ |

In general the energy distribution pattern of the laser beam as it strikes the surfaces of the laser PV assembly, and in particular the optically active surfaces of that assembly, may be in a predetermined energy distribution pattern. This predetermined energy distribution pattern can address, and preferably maximize, thermal issues, efficiency issues, and back reflection issues.

Energy distribution pattern 1, from Table I is a uniform pattern as projected on the optically active surface, which in this example is the interior of a sphere. This uniform pattern may be employed with and in view of the ability to have photocell efficiency optimized for a given power density.

Energy distribution pattern 2, from Table I is a uniform pattern with a black out, as projected on the optically active surface, which in this example is the interior of a sphere. The black out may be obtained by optics and may further be shaped and positioned to address and minimize back reflections.

Energy distribution pattern 3, from Table I is a linear pattern as projected on the optically active surface, which in this example is the interior of a sphere. This pattern provides for the use of simple, durable and less expensive optics.

Energy distribution pattern 4, from Table I is Gaussian pattern as projected on the optically active surface, which in this example is the interior of a sphere. This energy distribution pattern requires no optical modification of most beams as they exit the fiber face, e.g., no optics are needed between the fiber face from which the laser beam is launched and the optically active surface.

Energy distribution pattern 5, from Table I is asymmetric pattern as projected on the optically active surface, which in this example is the interior of a sphere. Such a pattern may be used to address asymmetries in abilities to dissipate heat, or asymmetries (or other design constraints) arising from the placement of the laser PV assembly in a tool, robot, or ROV.

Moreover, in addition to applications in subsea equipment, these laser-photovoltaic assemblies can be employed in drilling, monitoring, logging and measuring activities associated with creating boreholes, such as boreholes for the exploration and production of hydrocarbons and geothermal energy. Further these laser-photovoltaic assemblies may have military applications, manufacturing applications and other applications, where the use of a high power optical fiber, and especially the very thin and light weight characteristics of such fibers, to deliver high power laser energy to a remote location, and especially a small or otherwise difficult to access location, is desirable; and it is further desirable to convert some or all of the delivered high power laser energy into electrical energy.

In general, the high power laser systems may include, conveyance structures and deployment systems for use in delivering high power laser energy over great distances, without substantial power loss, and to work areas where the high power laser energy may be utilized. Preferably, the system may include one or more high power lasers, which are capable of providing: one high power laser beam, a single combined high power laser beam, multiple high power laser beams, which may or may not be combined at various points or locations in the system, or combinations and variations of these. Long distance high power laser conveyance structures and deployment systems are provided in US Patent Application Publication Numbers 2010/0044106, 2010/0044103 and 2010/0215326, and in pending U.S. patent application Ser. Nos. 12/840,978, 13/210,581, 61/493,174; the entire disclosures of each of which are incorporated herein by reference.

A single high power laser may be utilized in the system, or the system may have two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 5 kW, 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers).

For example a preferred type of fiber laser would be one that includes 20 modules or more. The gain bandwidth of a fiber laser is on the order of 20 nm, the linewidth of the free oscillator is 3 nm, Full Width Half Maximum (FWHM) and may range from 3 nm to 5 nm (although higher linewidths including 10 nm are envisioned and contemplated). Each module's wavelength is slightly different. The modules further each create a multi-mode beam. Thus, the cumulative effect of combining the beams from the modules is to maintain the Raman gain and the Brillouin gain at a lower value corresponding to the wavelengths and linewidths of the individual modules, and thus, consequently reducing the SBS and SRS phenomenon in a fiber when the combined beams are transmitted through the fiber. An example of this general type of fiber laser is the IPG YLS-20000. The detailed properties of which are disclosed in US patent application Publication Number 2010/0044106.

In some embodiments, a fiber laser emitted light at wavelengths comprised of 1060 nm to 1080 nm, 1530 nm to 1600 nm, 1800 nm to 2100 nm, diode lasers from 400 nm to 1600 nm, $CO_2$ Laser at 10,600 nm (however, $CO_2$ laser do not couple into conventional fused silica optical fibers, and thus, a solid fiber capable of transmitting these wavelengths, or hollow light pipe or later developed optical means may be utilized to transmit this laser beam), or Nd:YAG Laser emitting at 1064 nm can couple to the optical fibers. In some embodiments, the fiber can have a low water content. Preferably, the water content of the fiber should be as low as is possible.

Examples of lasers, and in particular solid-state lasers, such as fibers lasers, are set forth in US Patent Application Publication Numbers 2010/0044106, 2010/0044105, 2010/0044104 and 2010/0215326 and in pending U.S. patent application Ser. Nos. 12/840,978, 13/210,581 and 61/493,174; the entire disclosures of each of which are incorporated herein by reference. Further diode lasers, and for example, such lasers having a wavelength of from about 0.9 microns to 2 microns may be utilized.

In general, lasers propagate laser beams having coherent light. All of the lasers described or discussed in this specification propagate laser beams having coherent light.

Generally, coherent light is any light having light waves that are in phase with one another. Coherent light can be distinguished from incoherent light, such as for example sunlight and light from a household light bulb. Further, coherence is related to the ability of light to show interference effects. Thus, a light field may be coherent when there is a fixed phase relationship between the electric field values at different locations or at different times. Partial coherence means that there is some (although not perfect) correlation between these phase values. A partially coherent beam or light will nevertheless be considered within the general definition of "coherent" or "coherent light."

In general, coherence may also further be characterized as temporal and spatial coherence. In general, spatial coherence is expressed through the output being a narrow beam that is diffraction limited. Spatial coherence is characterized by a strong correlation between the electric fields at different locations across a beam profile. For example, within a cross-section of a beam from a laser with diffraction-limited beam quality, the electric fields at different positions oscillate in a totally correlated way, even if the temporal structure is complicated by a superposition of different frequency components. In general, temporal (e.g., longitudinal) coherence relates to a polarized wave at a single frequency whose phase is correlated over a relatively large distance (the coherence length) along the beam. Temporal coherence is characterized by a strong correlation between the electric fields at one location but different times. For example, the output of a single-frequency laser can exhibit a very high temporal coherence, as the electric field temporally evolves in a highly predictable fashion: it exhibits a clean sinusoidal oscillation over extended periods of time.

Unless specifically provided otherwise, the terms coherent, coherent light, coherent light source and similar terms should be given their broadest possible meaning and would include all laser beams, and would include a collection of one, two or a plurality of coherent sources or beams combined together. The terms coherent, coherent light, and coherent light source expressly exclude the sun, solar energy and sunlight.

In Table II there are provided examples of various photovoltaic materials and their preferred wavelengths for maximum efficiency (e.g., the highest conversion rate of laser energy of a particular wavelength into electric energy). It being understood that other, new, combined, or tailored PV materials, in addition to those set forth in Table II for a laser beam having a specific wavelength, for a multimode laser beam having one, two, three or more wavelengths, or for a range of wavelengths, may be utilized in addition to the materials provided in Table II. Here photovoltaic material refers to the material that would be used for the base layer of a PV cell, the primary layer where the laser light would be absorbed and converted to electrical energy.

about 1 cm to about 10 cm, and the height of the active layers, not including the substrate, is about 0.5 to about 10 μm (microns). More preferably, the width and length are about 4 cm and the height of the active layers, not including the substrate, is about 4 μm. The specific cell dimensions depend on a number of factors, including the number of PV cells in the PV assembly, the PV material(s) used and whether or not the substrate is removed during device preparation.

The laser PV cell has a front 1301, which is intended to receive or be struck by the laser energy, e.g., the laser beam, and a back contact 1305. The front 1301 has a grid 1302, a pair of busbars 1303a, 1303b, and anti-reflective coating 1304. From the front 1301 to the back contact 1305, the cell 1300 may be made up of several layers of material, 1309, 1310, 1311, 1312, 1313. Electrical wires, contact, or leads, not show in the drawing, are electrically connected to the pair of busbars 1303a, 1303b and the back surface 1305. These wires are then used to facilitate the incorporation of the cell into a PV assembly for providing laser-electric power to an apparatus, such as an ROV or downhole tool.

Figure 13:
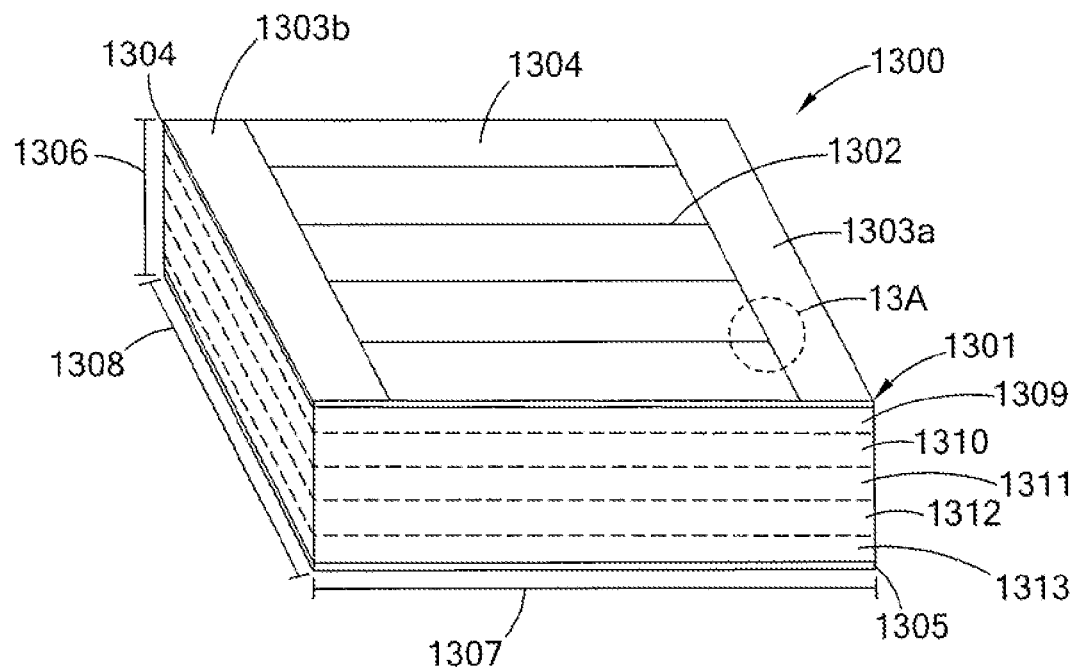
FIG. 13 is a perspective view of a laser-photovoltaic cell in accordance with the present invention.
Figure 13A:
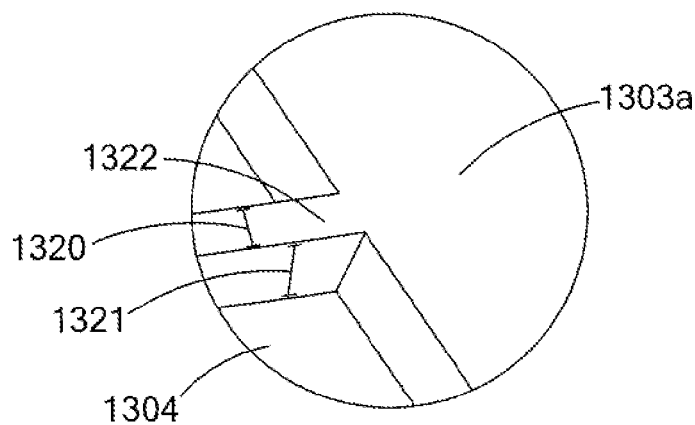
FIG. 13A is a detailed perspective view of the laser-photovoltaic cell of FIG. 13 taken along section 13A.

In FIG. 13A there is shown an enlargement of the area shown by dashed circle 13A in FIG. 13. Thus, turning to FIG. 13A, the grid 1302 has a grid width 1320, a grid height 1321, and a grid-facing surface 1322. Generally, the ratio of the area of the grid-facing surface to the area of the front 1301 that is not covered by busbars 1303a, 1303b, provides the relative

TABLE II

| Photovoltaic Material | Band Gap | Preferred Laser Wavelength | Preferred Laser Energy |
|---|---|---|---|
| $Al_xIn_yGa_{1-x-y}As$ ($0 \leq x \leq 0.45, 0 \leq y \leq 1$) | 0.50-2.00 eV | 400 nm-2100 nm | 0.59-3.10 eV |
| $Si_xGe_{1-x}$ ($0 \leq x \leq 1$) | 0.66-1.11 eV | 870 nm-1880 nm | 0.66-1.42 eV |
| $Al_xIn_yGa_{1-x-y}P$ ($0 \leq x \leq 0.80, 0 \leq y \leq 1$) | 1.35-2.40 eV | 400 nm-925 nm | 1.34-3.10 eV |
| $Al_xIn_yGa_{1-x-y}N$ ($0 \leq x \leq 0.5, 0.1 \leq y \leq 1$) | 0.65-3.10 eV | 400 nm-1900 nm | 0.65-3.10 eV |
| $In_xGa_{1-x}Sb$ ($0 \leq x \leq 0.3$) | 0.55-0.73 eV | 1380 nm-2100 nm | 0.59-0.90 eV |
| $In_xGa_{1-x}N_yAs_{1-y}$ ($0 \leq x \leq 0.3, 0 < y \leq 0.1$) | 0.50-1.40 eV | 870 nm-2100 nm | 0.59-1.42 eV |
| $In_xGa_{1-x}N_yAs_{1-y-z}Sb_z$ ($0 \leq x \leq 0.2, 0 < y \leq 0.04, 0 < z < 0.06$) | 0.90-1.40 eV | 870 nm-1380 nm | 0.90-1.42 eV |
| $In_xGa_{1-x}As_yP_{1-y}$ ($0 \leq x \leq 1, 0 \leq y \leq 1$) | 0.50-2.26 eV | 400 nm-925 nm | 1.34-3.10 eV |

It should be understood that in addressing laser energy and band gaps, in general, each type of semiconductor or photovoltaic material has a specific band gap and a preferred laser energy. In addition to the preferred laser energy, the semiconductor materials may be used with any laser with having an energy higher than that material's band gap (with efficiency decreasing in proportion to the difference between the laser energy and the semiconductor band gap). Alloys, may also be sued as photovoltaic materials.

In FIG. 13 there is provided a general embodiment of a laser photovoltaic cell that may be used in a laser PV assembly. The laser PV cell 1300 is cubic having a length 1307, a width 1308 and a height 1306. Although shown in this embodiment as having generally a cube shape, the laser PV cell may be other shapes and configurations, such as for example cylindrical, cylindrical-oval, and other volumetric shapes. Generally the length of the laser PV cell may be from about 0.05 cm to about 40 cm, the width can be from about 0.05 cm to about 40 cm, and the height is about 0.25 to about 1000 μm (microns). Preferably, the length of the PV cell may be from about 1 cm to about 10 cm, the width can be from amount of the front surface (and thus in general the layers below) that is shielded or shaded from the laser beam, or the grid shadowing fraction. The smaller this ratio, the greater the number of photons from the laser beam that will pass through the anti-reflective coating 1304 and into layer 1309.

Thermal issues, back reflection issues and heat management issues for the busbars, and for the grid pattern, may be address and managed by the various techniques and solutions provided in this specification. For example, laser beam patterns can be selected to avoid, minimize or manage the striking of the busbars, grids or both, with the laser energy, e.g., black outs, i.e., locations where there is little or no laser energy, in the pattern can be created that follow, are identical to, or are substantially identical to the grid pattern, busbars or both. Thus, for example, optics such as diffractive or refractive optics, e.g., a Fresnel lens for a concentric grid pattern, could be used to create a beam distribution to minimize or avoid the laser striking the grid pattern, the busbars or both. Interference patterns generated in the beam could used to create a beam distribution to minimize or avoid the laser striking the grid pattern, the busbars or both. Alone, or in conjunction with beam patterns, providing additional, tailored, or enhanced heat dissipation may be used. Angles and reflective surfaces to reflect or redirect the light from the busbar or grid to not absorb the light and redirect toward an optically active surface may be used alone or in conjunction with the other means for addressing, back reflections, thermal issues and other issues related to the laser beam striking the grid, busbars or both.

Layers 1309, 1310, 1311, 1312, 1313 may be made of the same material or they may be made from different materials. A laser PV cell may have more or less layers. Thus, for example the laser PV cell could be a one-layer cell, or it could be a multilayer cell having, two, three, four, or more layers; and may have tens of layers, such as for example if the cell is a multi-junction or metamorphic cell. In general in determining the materials for the layers, and their respective placement relative to the other layers and the front or front surface, consideration should be given to the laser wavelength(s), the materials band gap, the materials lattice constant, the doping levels and the thickness of the layers.

In general, using a single-junction laser PV cell as an example, layer 1311 is the base and has a material composition and band gap tailored to the laser energy and it absorbs the majority of the laser light. Layer 1310 is the emitter. The emitter is a thick, highly doped layer designed to have minimal sheet resistance while also having a band gap larger than the laser energy, so that it will not absorb a significant fraction of the laser light. The front most layer or window, layer 1309, has a band gap larger than layer 1310. Layer 1311 is the back surface field and it has a larger band gap than layer 1310. (Layer(s) 1313 may be a buffer layer, contact layers and/or include the substrate.)

Laser PV cells may include more than one junction, such as two junctions or three junctions. Each individual junction is composed of one or more layers, and connected to the other junctions in series via tunnel diodes or tunnel junctions. Thus, monolithic multi-junction laser PV cells may include tens of layers stacked on top of each other. If the laser light contains a single wavelength, then the base layers of each junction will typically be the same material and same band gap, with only the thickness varying. The thickness of the base layer will be least for the top junction and most for the bottom junction, so that the currents produced by each junction are substantially the same. If the laser light contains more than one wavelength, then the PV cell will be designed so that the highest energy (lowest wavelength) laser light will be absorbed by the top junction and the lowest energy (highest wavelength) laser light will be absorbed by the bottom junction. Thus the base layer of the top junction will have a higher band gap than the base layer of the bottom junction.

Generally, the current that a single multi-junction PV cell produces is limited to the lowest amount of current that any single junction in the cell creates. Thus, it may be desirable to configure the junction of the PV cell, the energy, and energy distribution of the laser beam(s), the wavelength(s) of the beam(s), relative thickness for the layers, the shape, size and properties of the optically active surface of the PV assembly, the overall configuration of the laser-PV assembly, and combinations and variations of these and other factors set forth in this specification and known to those of skill in the photovoltaic arts, such that each junction produces essentially the same, if not the same, amount of current. Similarly, such configurations of single multi-junction PV cells could be applied to other and more complicated multi-junction cells. For, example, based upon the absorption constant for the material of a layer intended to absorb a particular wavelength of laser beam and other considerations, a relative thickness for a layer can be determined to thus, in essence, match the current produced by that layer with the other layers in the cell. For a cell designed to absorb and convert multiple laser wavelengths concurrently, the laser power intensities may also be adjusted to produce essentially the same amount of current in each junction. As such, there is contemplated an embodiment of a laser-PV assembly having PV cells in which, based upon predetermined factors and configurations, provide a predetermined current per junction, which predetermined current may be slightly different from one PV cell junction to the other, substantially different from one PV cell junction to the other, essentially the same from on PV cell junction to the other, the same from one PV cell junction to the other and combinations and variations of these.

Again, using the schematic of FIG. 13 for illustrative purposes, in a metamorphic PV cell, layer 1313 may represent a set of metamorphic buffer layers used to transition the lattice-constant. Metamorphic buffer layers may also compose other layers.

The ability to provide high laser power to the PV assemble (e.g., by means of a single fiber delivering 5, 10, 20, 30 kW, or more kW, or by providing multiple fibers each providing 5, 10, 20, 30 or more kW of laser power), the ability to shape, focus and direct the laser beam, beams or combined beam, to provide predetermined high energy patterns to a PV assembly and the PV cells in that PV assembly, the ability to select and match both the laser beam wavelength (or wavelengths for a multimode laser beam) and intensity (or intensities for a multimode laser beam) and the PV cells and their materials to enhance efficiency of the cells, provides for laser PV cells and laser PV assemblies of the present invention that are capable of providing greater, and substantially greater power than is obtained from conventional solar cells and solar panels. In particular, the ability to use in a predetermined manner a coherent light source, and coherent light energy, provides substantial advantages, and obtains results believed to be unobtainable, with solar or other incoherent light sources. These advantages include, for example, the ability to operate in harsh, remote and difficult to access locations, and locations in which there is little or no sun light, and location in which it would be difficult, if not essentially impossible, to provide sufficient energy by an incoherent light source to perform intended operations of a system or tool, for example an ROV. Such locations would include, for example, the interior of a pipeline, a location under the surface of a body of water, a location on the sea floor, and a location under the surface of the earth, such as in a borehole or mine. By the specific design of the laser PV cells and assemblies, the output current and voltage can be tailored, as well. For example, using a three-junction PV cell will enhance the voltage and decrease the current compared to a single-junction PV cell, holding other factors constant.

In laser PV cells, for example those that may be used to power an ROV, the currents for a cell may be greater than about 10 amps, greater than about 100 amps, greater than about 1,000 amps, greater than about 3,000 amps, from about 100 amps to about 6,000 amps, from about 1,000 amps to about 5,000 amps, and from about 2,500 amps to about 3,500 amps. The specific current per cell will depend on the design of the PV assembly, including the area of the individual PV cell, the incident laser intensity, the grid design, the cell efficiency, and the number of junctions in the solar cell. For example, for a PV assembly consisting of a single PV cell with one junction, the current may be greater than 1000 amps. For a PV assembly consisting of 100 PV cells that each have two junctions, the current may be 10-50 amps. The current of the PV assembly will depend on the same factors as the current per cell, as well as the number of PV cells in the assembly and how the cells are connected together in series and in parallel. To address and handle these high currents the amount of grid shadowing, or the fraction of the front cell surface that is covered by the grid on the PV cell, should preferably be substantially larger than for conventional PV cells. Thus, and again referring to FIGS. 13, 13A for the purposes of illustration, the total number of grid lines, or members of the grid 1302 could be increased on the front 1301 of the cell 1300, the height 1321 of the grid could be increased, the width 1320 of the grid could be increased and combinations and variations of these. The grids may be made from metals having good electrical conductivity, thus, for example they may be made from aluminum, copper, gold, nickel and/or silver, preferably made primarily from aluminum, copper, gold, nickel and/or silver and more preferably are primarily composed of silver. These metals compose the majority of the grid, but other elements are frequently used at the semiconductor-metal interface to promote adhesion and low resistance, such as chromium, titanium, nickel, platinum, and germanium. The grid metals are deposited by evaporation or are electroplated.

To minimize the resistance of the grid, and thus reduce the amount of heat loss, (e.g., reduce the loss of electrical energy to heat and the need to manage that heat), the height 1321 of the grid, the width 1320 of the grid, and both can be increased. Thus, the grid height may be about 4 µm, about 5 µm, about 4-5 µm, greater than about 4 µm, greater than about 10 µm, greater than about 20 µm and greater. The grid width may be about 1 µm, about 2 µm, about 5 µm, about 10 µm and greater than about 1 µm, greater than about 2 µm, greater than about 5 µm and greater than about 10 µm. Thus, for example, a grid may have a grid height in the range of about 5-10 µm and the grid width in the range of about 5-10 µm. The configuration, pattern, shading, height and width of a grid may be the same, substantially the same, difference, or substantially different, within a PV cell and from one PV cell to the next in a particular laser-PV assembly, based upon factors, such as, back reflection mitigation and management, the configuration of the optically active surface of the PV assembly, size constraints on the PV assembly, and heat management.

Preferably, the grid height will be maximized with the grid width being minimized. In this manner for any given grid pattern the greatest cross-sectional area of a grid member is obtained, while minimizing the total area of the grid facing surface 1322. Minimizing the total area of the grid facing surface 1322, minimizes the amount of laser energy that is blocked by the grid from entering the cell through the anti-reflective coating 1304 on the front 1301 of the cell 1300.

Additionally, the grid may be configured and positioned to minimize any shadows that may be created by the placement or position of the laser PV cells in the laser PV assembly, and to enhance the amount of laser energy that enters the cell. In this manner the optically active surface of the laser-PV assembly may be optimized. Thus, for example, the facing surface 1322, may be configured to be pointed, curved or angled. Although the grids are shown to be normal to the facing surface 1322, they could be placed on different angles, which angles make the grid members essentially parallel with the rays for the laser beam and thus minimize any shadowing effect that may occur. For example, in the embodiment of a laser PV assembly of FIG. 3 the rays of the laser beam 311, will be striking a PV cell at a particular angle, e.g., 315. The grating for that PV cell can be specifically positioned and matched with this angle, to minimize any shadow that the grating may form, and to thus maximize the amount of laser energy entering the cell. In addition, optics may be used to direct the incident light away from the grid lines, minimizing or eliminating losses due to grid shadowing.

Additionally, the placement and configuration of the grating on each PV cell, as well as the overall grating configuration of the PV assembly that is obtained when the PV cells are positioned in the PV assembly, may be used to manage and preferably minimize back reflections, e.g., high power laser energy that reflects back in the direction of the fiber, optics or both and which can be very detrimental to the laser delivery system.

The anti-reflective coating 1304 (again using the schematic of FIG. 13 for illustrative purposes) should be selected to, and capable of handling the laser wavelengths and powers that are contemplated by the present inventions. The anti-reflective coatings have reflection losses of less than ten percent, and preferably less than one percent, in the wavelength range of the incident laser(s). The anti-reflective coating will have one or more thin film layers with thicknesses chosen to minimize reflection over the wavelength range of the incident laser(s). The anti-reflective coating may consist of one or more layers of $Al_2O_3$, CeO, InAlP, $MgF_2$, $Ta_2O_5$, $TaO_x$, $SiO_2$, $TiO_2$, SiN, and ZnS. For example, the coating could consist of 65 nm of ZnS and 125 nm of $MgF_2$. Nanostructures and surface texturing may also be used to reduce reflection losses and to change the angle of laser light as it travels through the PV cell, so that less PV cell material is needed.

The high power laser and electrical energies that will be present when using a laser PV cell and a laser PV assembly combined with the inability to convert all (100%) of the laser's light energy into electrical energy, as well as, the inability to transmit all of the electrical energy away from the PV cell, will create heat. This heat may be viewed as waste heat and removed by a cooling system associated with the PV assembly. The system may be a closed loop system, similar to systems that are used to cool high power lasers, such as fiber lasers. Preferably, however, for ROV applications and other applications where the laser system will be at least partially operating in an environment that provides a large heat sink, such as the ocean and in particular the deep ocean, the system may be an open loop system that takes in sea water from outside the ROV flows the sea water over, around, or by the PV assembly to cool the assemble, and remove the excess heat by returning it to the sea with the outflow. The heat could also be captured and used for secondary generation of electricity, by for example a Sterling Engine or a thermal electric device.

Many of the PV materials have very narrow temperature ranges in which they will operate at maximum conversion efficiencies. In general, and by way of example, a 10 degree C. increase in temperature may cause a loss of conversion efficiency of about 1.5%. Thus, preventing the heating of the PV cells and the PV assembly may be important to efficient operation.

The band gap of a material changes with temperature, increasing as temperature decreases. Thus the optimal material and composition used as the base layer in laser PV cells depends on the intended operating temperature of the device. For example, an optimal material for converting a 1080 nm laser at 25° C. is $In_{0.21}Ga_{0.79}As$. However, for the same laser at 85° C., the optimal material is $In_{0.23}Ga_{0.77}As$ and at 5° C. it is $In_{0.20}Ga_{0.80}As$. Metamorphic growth techniques are helpful in tuning material composition, and therefore band gap, to be optimized for a given laser wavelength range at a given operating temperature, because they remove the constraint of lattice matching to a substrate. In choosing the material composition to use for laser PV cells, the operating temperature range of the application is taken into account in order to maximize efficiency.

In situations where there many be a wide range of environmental temperatures, such as for example operating at or near the surface of the Gulf of Mexico and then at depths of 10,000 feet under the surface, the selected band gap (tuned band gap) and cooling methods (thermal management) may be optimized to provided the greatest efficiency over the anticipated temperature ranges. The thickness and materials of the back contact (for illustrative purposes back contact 1305 of the embodiment of FIG. 13) may primarily consist of aluminum, copper, gold, nickel or silver, and may be alloys of these metals and other elements. As with the top contact, other elements are frequently used at the semiconductor-metal interface to promote adhesion and low resistance, such as chromium, titanium, nickel, platinum, and germanium.

Thus, for a given power distribution on a given optically active surface and a given heat dissipation orientation, a steady state temperature distribution of the photocells will occur. This temperature distribution can be effected and utilized by selection of photoactive materials that for the given parameters of the system optimum PV efficient is achieved and maintained at the steady state distribution.

The laser and laser systems have the capability to provide multimode laser beams. Thus, for example, a 20 kW laser beam may have 5 different wavelength, e.g., 1066, 1068, 1070, 1773, 1075 nm. Further, these different wavelengths in the multimode beam may have different power levers, e.g., the 1066 may be 4 kW, while the 1070 beam may be 10 kW. This ability to provide a high power multimode laser beam to a PV cell and PV assembly in a remote location provides the ability to match, or tailor the multimode laser beam characteristics (e.g., power, wavelength) and the construction of a PV cell and assembly (e.g., layer materials, band gap, thickness, relative placement to other cells, optics used to alter the laser beam). For example, a multijunction PV cell may have individual junctions tailored to the different wavelengths of the laser beam to maximize the voltage out of the PV cell. This is especially important for high efficiency when the wavelengths in the multimode beam are substantially different from each other. In addition, optics may be used to split a multimode laser beam and direct the different wavelengths to different PV cells, each tailored for a specific laser wavelength.

Pulsed lasers may be used to transmit power while reducing losses due to heating and cooling system requirements. Further a single mode laser may be utilized for example in the ROV, TMS, subsea equipment, robot, or tool. In this manner the single mode laser is placed in optical communication with the high power long distance umbilical and the laser energy from the umbilical is re-lased by the single mode laser as a single mode laser beam. The single mode beam may be further utilized in applications such being directed towards a PV assembly for conversion into electrical energy, or with a laser cutting tool.

Figure 17:
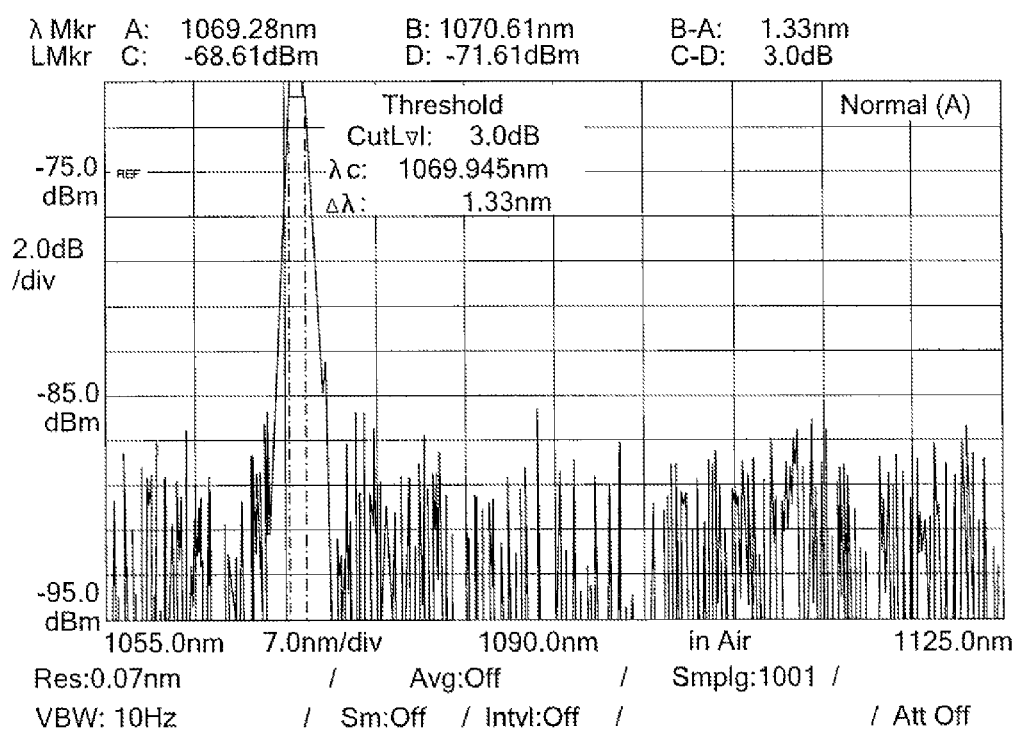
FIGS. 17-19 are spectrums of laser energy transmitted in accordance with aspects of the present invention showing the absence of SRS phenomena.

Turning to FIG. 17 there is provided and a spectrum of a high power laser beam from an IPG YLS 20000 laser operated at a duty cycle of 10% for a 1 kHz pulse rate. The high power laser beam was transmitted through the 2 km fiber. The spectrum for 4,868 Watt power is shown at FIG. 17. The absence of SRS phenomenon is clearly shown in the spectrum. (As used herein terms such as, "absence of", "without any" or "free from" a particular phenomena or effect means that for all practical purpose the phenomena or effect is not present, and/or not observable by ordinary means used by one of skill in the art) Further the linear relationship of the launch (input) and output power confirms the absence of SBS phenomena. Further details regarding this high power laser beam and spectral may be found in US Patent Application Publication No. 2010/0215326, regarding FIG. 4 of that application and the associated description, the entire disclosure of which is incorporated herein by reference.

Figure 18:
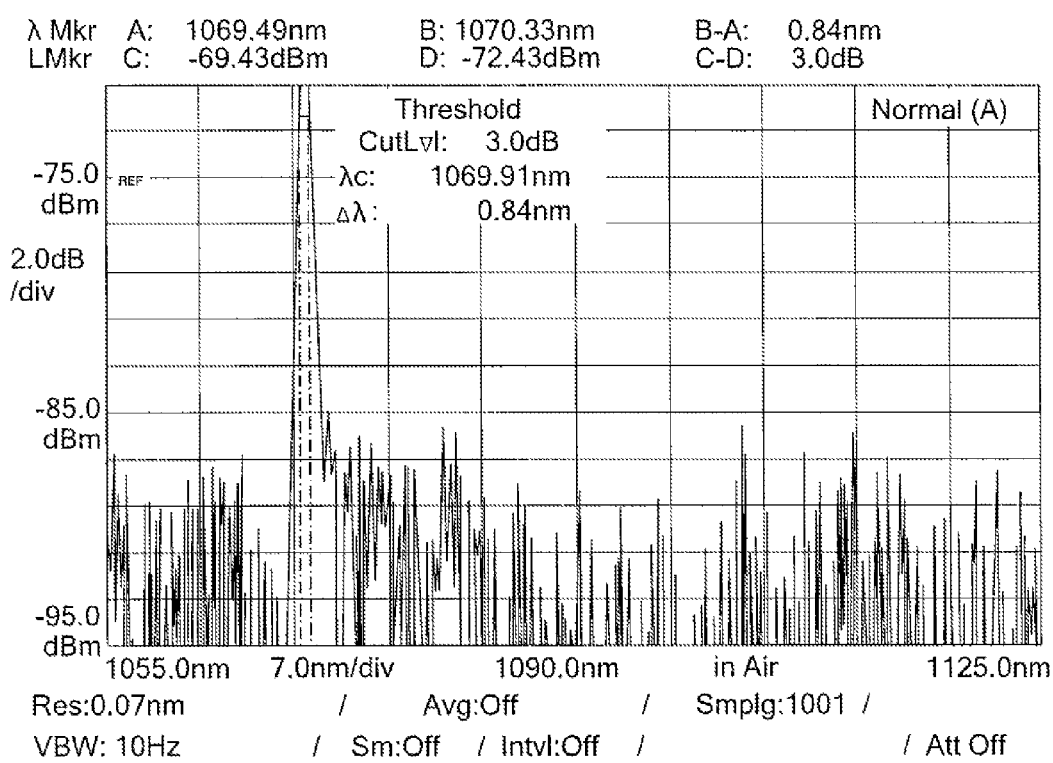

Turning to FIG. 18 there is provided a spectrum of a high power laser beam from an IPG YLS 20000 laser operated to provide a continuous wave. The laser beam was transmitted through the 2 km fiber. The spectrum for 4 modules at 100% laser setting is shown at FIG. 18. The absence of SRS phenomenon is clearly shown in the spectrum. Further the linear relationship of the input and output power confirms the absence of SBS phenomena. Further details regarding this high power laser beam and spectral may be found in US Patent Application Publication No. 2010/0215326, regarding FIG. 5 of that application and the associated description, the entire disclosure of which is incorporated herein by reference.

Figure 19:
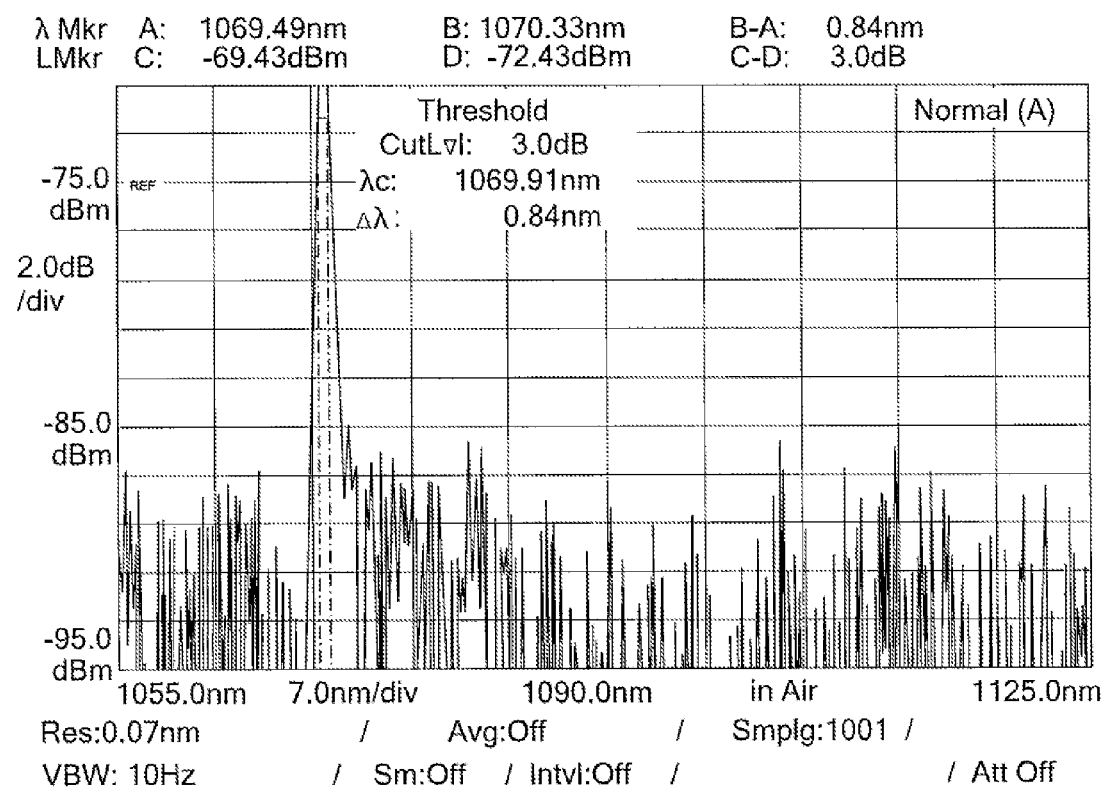

Turning to FIG. 19 there is provided a spectrum of a high power laser beam from an IPG YLS 20000 laser operated to provide a continuous wave. The laser beam was transmitted through a 2 km fiber. The spectrum for 10 modules at 9,300 W output power, 90% laser setting is shown at FIG. 19. The absence of SRS phenomenon is clearly shown in the spectrum. Further the linear relationship of the input and output power confirms the absence of SBS phenomena. Further details regarding this high power laser beam and spectral may be found in US Patent Application Publication No. 2010/0215326, regarding FIG. 6 of that application and the associated description, the entire disclosure of which is incorporated herein by reference.

EXAMPLE 1

Figure 20:
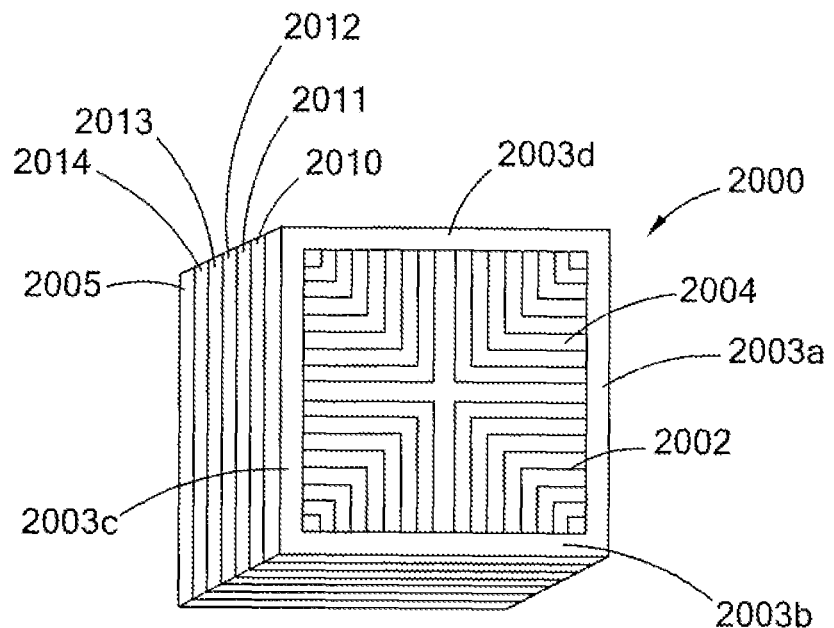
FIG. 20 is a perspective view of a laser-photovoltaic assembly in accordance with the present invention.

Turning to FIG. 20 there is shown an embodiment of a laser PV assembly having 1 single junction PV cell 2000 for use with a laser beam having a spectrum of the type shown in FIGS. 16-19. The single junction PV cell 2000 has a grid design 2002 optimized for low resistance, including 4 busbars 2003*a*, 2003*b*, 2003*c*, 2003*d*. The single junction PV cell 2000 has an antireflective coating 2004. The PV cell 2000 has a window 2010, a highly doped, low resistance emitter 2011, a base with band gap tailored to the laser energy 2012, a back surface field 2013, buffer layer(s) and/or substrate 2014 and a back contact 2005.

EXAMPLE 2

Figure 21:
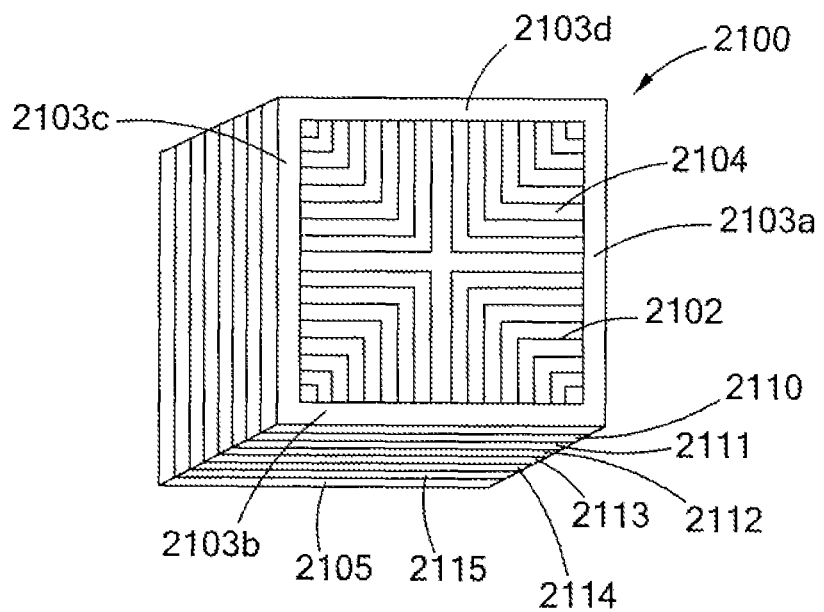
FIG. 21 is a perspective view of a laser-photovoltaic assembly in accordance with the present invention.

Turning to FIG. 21 there is shown an embodiment of a laser PV assembly having 1 triple junction PV cell 2100 for use with a laser beam having a spectrum of the type shown in FIGS. 16-19. The triple junction PV cell 2100 has a grid design 2102 optimized for low resistance, including 4 busbars 2103*a*, 2103*b*, 2103*c*, 2103*d*. The triple junction PV cell 2100 has an anti-reflection coating 2104. The PV cell has a top junction 2110, a middle junction 2112 and a bottom junction 2114. The junctions are connected together in series by tunnel junctions 2111 and 2113. Each of the top 2110, middle 2112 and bottom 2114 junctions has an emitter, base, back surface field, and may also include a window and buffer layer(s). The base of each junction is the same material, with a band gap tailored to the laser energy. The thickness of the base in each junction is chosen such that the current produced by each junction is approximately the same. Thus, the base is thinnest in the top junction 2110 and thickest for the bottom junction 2114. Current is collected from the busbars 2103*a*, 2103*b*, 2103*c*, 2103*d* and the back contact 2105.

EXAMPLE 3

Figure 22:
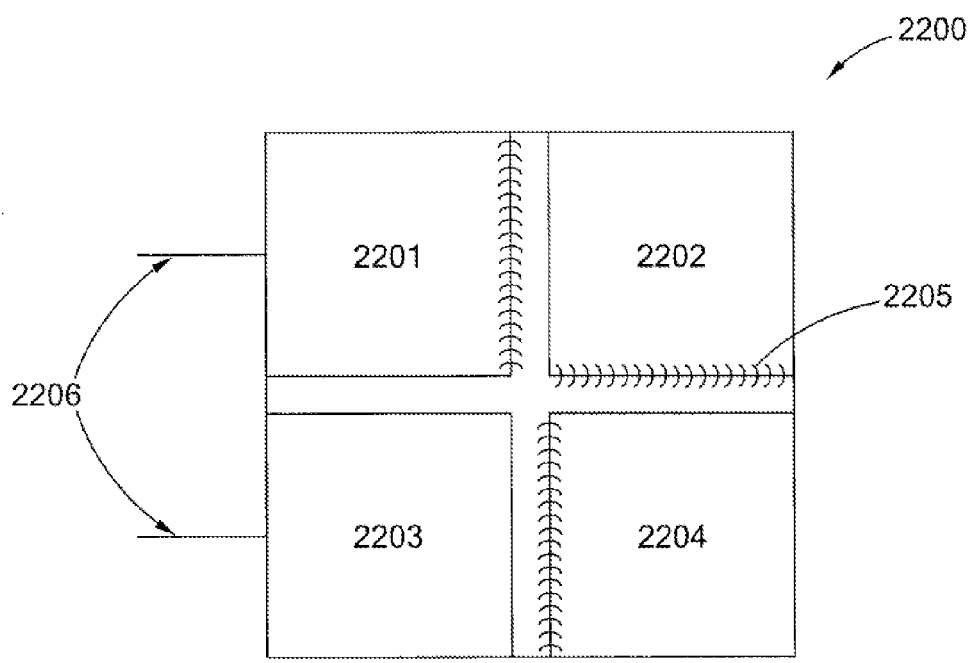
FIG. 22 is a plan view of a laser-photovoltaic assembly of laser-photovoltaic cells of the present invention.

Turning to FIG. 22 there is shown an embodiment of a laser PV assembly 2200 having 4 PV cells 2201, 2202, 2203, 2204 connected in series for use with a laser beam having a spectrum of the type shown in FIGS. 16-19. The 4 PV cells 2201, 2202, 2203, 2204 may all have the same design, which may be similar to those shown in Examples 1 and 2. The cells are connected in series by wire bonds 2205 or other interconnections so that the total current out of the PV assembly 2200 is the lowest of the currents produced by the 4 PV cells 2201, 2202, 2203, 2204, and the voltage out of the assembly is approximately the sum of the voltages of the 4 PV cells 2201, 2202, 2203, 2204 when operating at that single current. In this illustration, power is extracted from the assembly by leads 2206.

EXAMPLE 4

What may be characterized as an inverse laser diode may be used as a Photo-convert assembly. In the inverse laser diode an absorptive medium is selected for a for the particular wavelength of the laser, which is excitable for the emission of electrons. The medium can be a quantum well device, e.g., an energy potential is set up on a medium, which requires a predetermined energy level to excite an electron, or ionic particle, out of its place. The width of the active region of the quantum well will define the wavelength of active absorption.

Generally, in the operation of high power laser systems the management or mitigation of back reflections in designing the system may be a factor, and in some embodiments may be a significant factor. Back reflections may be managed in several ways, including the selective placement of absorbent and reflective surfaces in the laser beam launch area, the use of materials and components designed to handle back reflections (see, e.g., U.S. Patent Application Ser. No. 61/493,174, the entire disclosure of which is incorporated herein by reference.)

Thus, for example in the embodiment of FIG. 5 the radius of curvature of the sphere should be such it is larger than the distance from the bottom of the sphere to launch point of the laser. In this manner any focusing effect of the spherical shape would focus the back reflections well beyond the laser fiber face and any optics.

Turning to FIG. 14, there is provided a cross-sectional perspective view of an embodiment of laser-PV assembly 1401 in the shape of a Wood's Horn, which may have enhanced back reflection management properties. The PV assembly has an opening 1402 where the laser beam enters. The inner surface 1406 of the PV Assembly 1401 has a multiplicity of PV cells, e.g., cell 1403. The inner surface 1406 curves and narrows, (like the interior of a cornucopia) until it reached end 1405.

Turning to FIG. 15, there is provided a cross-sectional view of an embodiment of a laser PV assembly 1501. The laser PV assembly 1504 has an inner surface 1502, which is an optically active surface, and has a length 1504. At the end 1505, which is the furthest point from the opening 1506 where the laser beam enters, there is provided a conical inner surface 1503, which may mitigate the effect of back reflections by minimizing the likelihood that they would travel back up the assembly and out the opening 1506. The length of the assembly and the angle and size of the cone, can be adjusted, based upon laser beam properties, to obtain the most efficient minimization of back reflections. In addition to a cone, other shapes may be employed at end 1505, or at other points along the length 1504, to prevent or minimize the likelihood that any back reflections travel back up the assembly 1501 and out opening 1506.

In FIG. 16, there is provided a cross-sectional view of a PV assembly 1600 having an inner surface 1602 and a tapered conical end section 1603. Based upon the laser beam properties the shape and depth of the tapered conical end 1603 can be adjusted to obtain the most efficient minimization of back reflections.

In the following embodiments of sub-sea laser equipment, a single or multiple laser cutters may be utilized. Thus, if only a single optical fiber is used a source of stored energy may be employed to perform other mechanical operations, such as operation of the thrusters, cameras or sensors, so that all of the laser power is used by the cutter, or at least available to the cutter during cutting operations. Thus, batteries could be utilized, a super capacitor, a fly wheel, or other storage device may be utilized.

Figure 6:
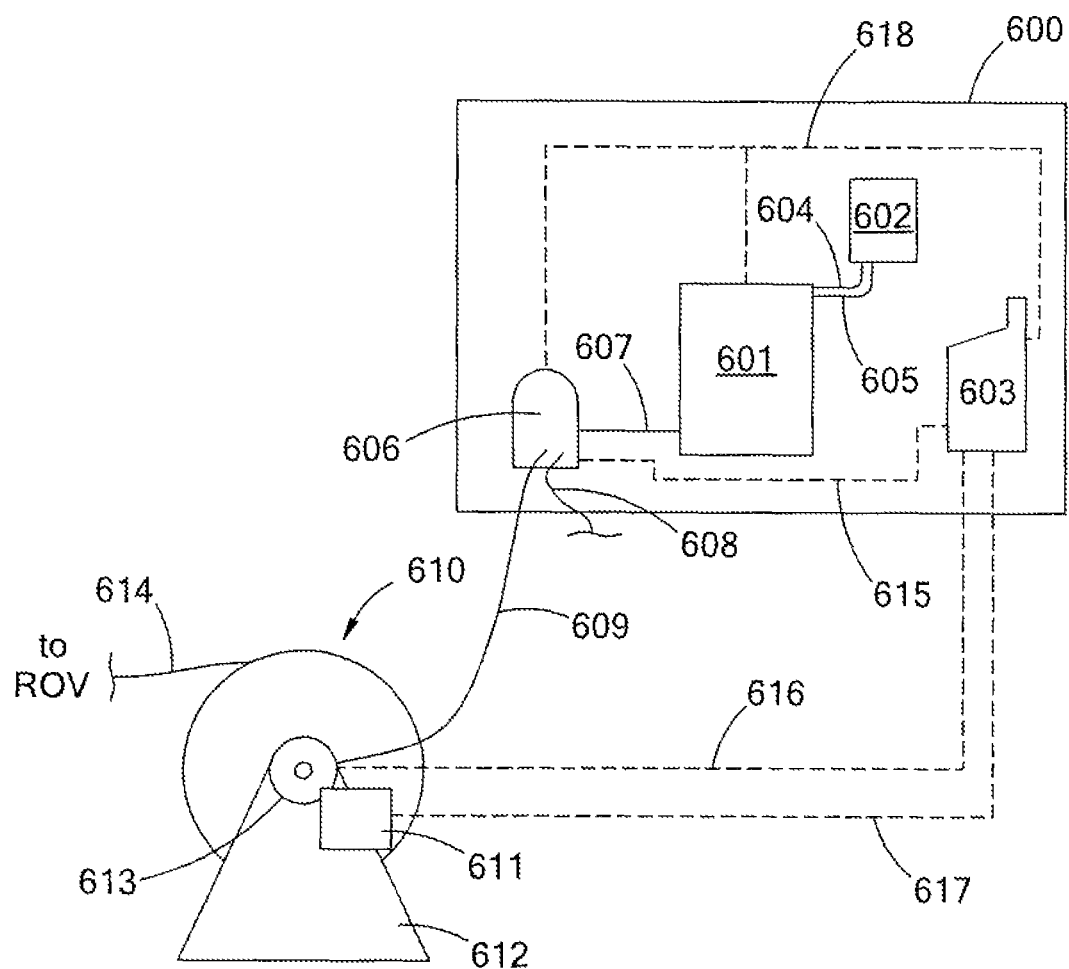
FIG. 6 is a schematic view of a laser system of the present invention for use in a laser subsea vehicle system in accordance with the present invention.

In FIG. 6 there is provided a schematic of an embodiment of a laser housing and spool, and control assembly for use with a laser-ROV. A laser housing 600 has a high power laser 601 that has a chiller 602 and lines 604 and 605 for circulating cooling fluids. A high power optical fiber 607 optically connects the laser 601 and a high power beam switch 606. The beam switch 606 is optically associated with two, or more, high power laser fibers 609 and 608. High power fiber 609 is optically associated with an optical slip ring 613 on spool 610 and fiber 608 is available to other uses, such as to power a high power laser cutting tool associated with an ROV. The spool 610 has a high power laser tether 614 wound around it in a spiral fashion. The spool has a drive and control mechanism 611 and supports 612.

Further teachings and details of the spool and optical slip ring are disclosed in US patent application Publication No. 2010/0044106. In addition to a spool and optical slip ring, a creel may be employed as a means to handle and wind and unwind a high power laser tether, or other mechanical and opto-mechanical devices may be used. Examples of such devices are disclosed in US patent application Publication No. 2010/0044106, and in U.S. patent application Ser. No. 13/210,581, the entire disclosures of each of which are incorporated herein by reference.

There is also shown in FIG. 6 and example of an embodiment of a communication and control network for the operation of a laser-ROV system. Thus, there is shown a controller 603 that is in data and control communication with the laser 601 and beam switch 606 as represented by dashed line 618. The controller 603 is also in data and control communication with the spool drive mechanism 611 as represented by dashed line 617. Data may further be obtained from the ROV, either by way of the high power laser fiber in tether 614 or by way of a separate data fiber or line incorporated with into the tether 614. If the data is being returned by way of the high power fiber in tether 614, that information can be communicated to the controller 603 either by way of dashed line 616, and or 615.

Figure 7:
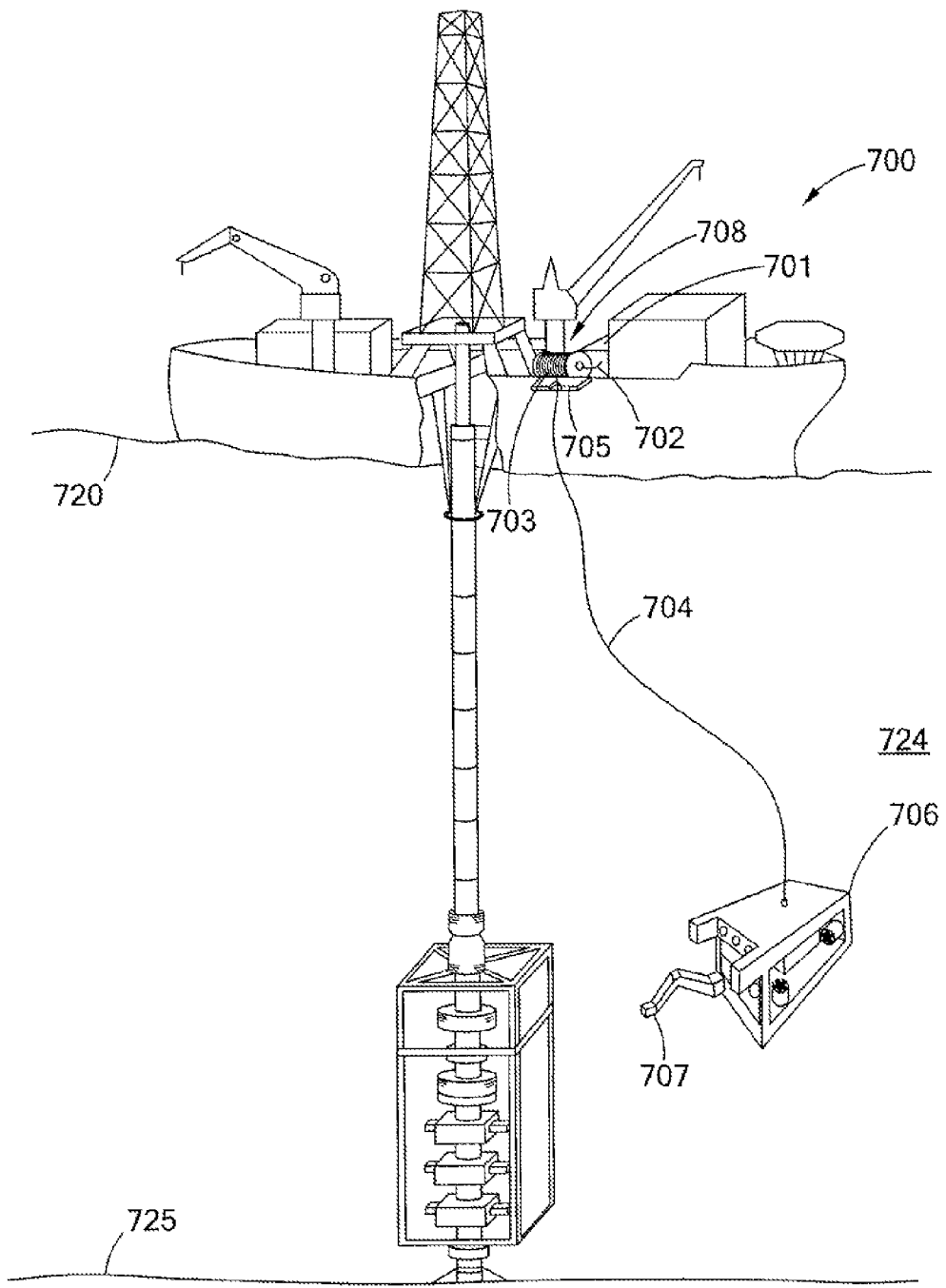
FIG. 7 is a perspective view of a laser subsea vehicle system of the present invention engaged in laser subsea operations in accordance with the present invention.

In FIG. 7 there is provided an embodiment of a laser-ROV system associated with an offshore drilling rig. Thus, a support vessel 700, which may be a drill ship, has a laser-ROV system 708 that has a laser housing 701, a high power laser optical fiber 702 that optically connects the laser (not shown) in the laser housing 701 to the spool 703. The spool has a high power laser tether 704 wound around it. The tether 704 could greater than 500 ft, greater than 1000 ft, greater than 5,000 ft and 10,000 ft or greater in length. The support vessel 700 is on the surface 720 of a body of water 724 having a seafloor 725 or bottom. There is also provided a tether-handling device 705 for managing the tether with respect to the support vessel and other structures as it is unwound and wound. A heave compensation device or system may also be utilized with the laser-ROV system 708 and may, for example, be associated with the spool 703, the handling device 705, or the deployed tether 704.

The laser-ROV 706 is powered by the high power laser energy that is transmitted by the laser tether 704. The laser-ROV has a laser delivery assembly 707 that has a high power laser tool, for example, a high power laser cutter. In this figure, the laser-ROV has been deployed by the drill ship during drilling operations and has proceeded to near the seafloor 725 where a BOP is located. The laser delivery assembly may be used to cut and/or remove unwanted material from the outside of the BOP.

Although not shown in any of the figures, an ROV having a laser cutter could be used to clean and remove unwanted material from the hull of a floating offshore platform (FSOP) and its associated subsea equipment and pipes. These platforms are very large and can remain at sea, on station for extended periods of time. Further, a submersible robot could be affixed to the hull of the FSOP and this robot could be fitted with a laser cutter. The robot would than automatically, or as directed, move about the hull of the ship removing unwanted material therefrom.

Figure 8:
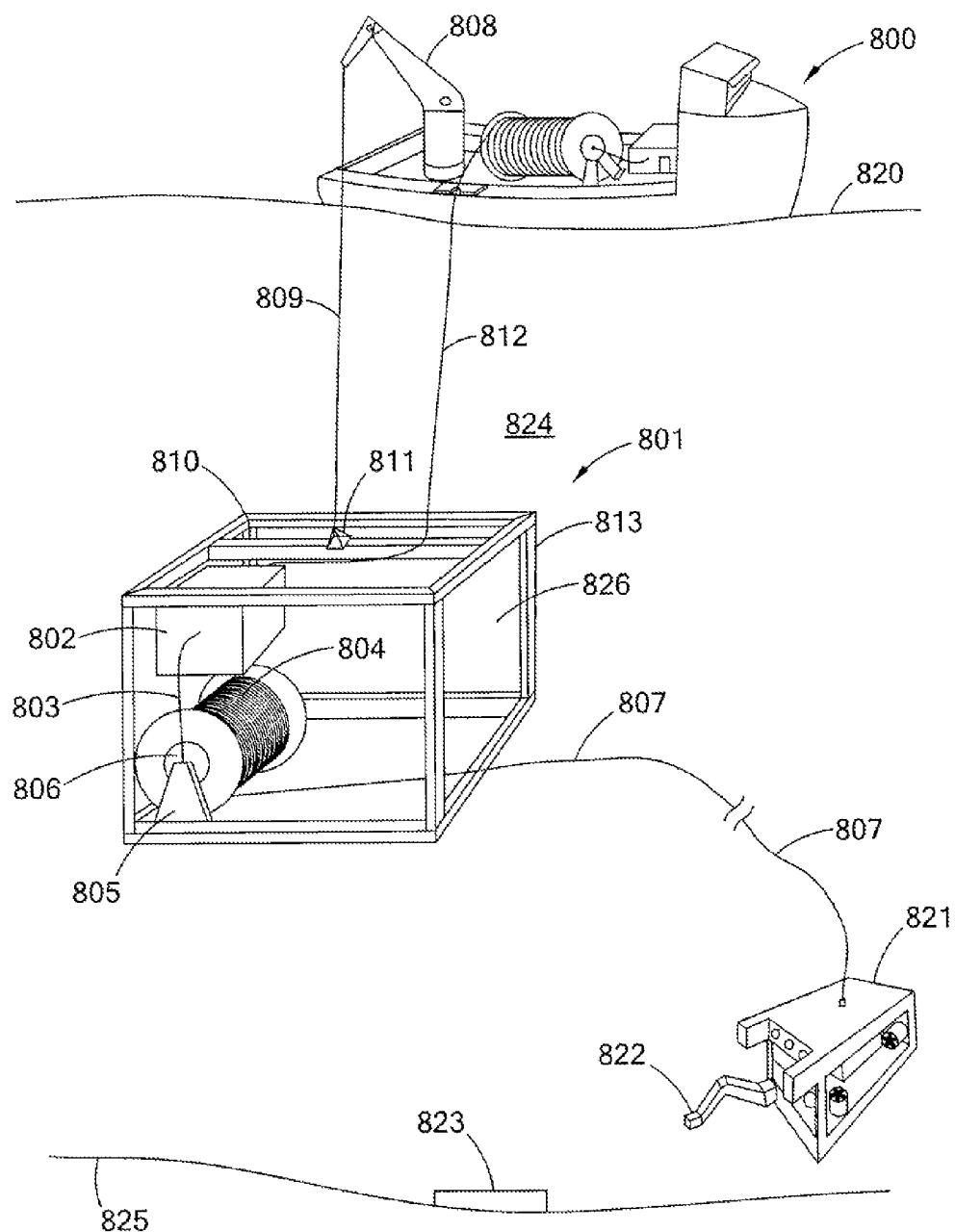
FIG. 8 is a perspective view of a laser subsea vehicle system utilizing a laser tether management system of the present invention, engaged in subsea laser operations in accordance with the present invention.

In FIG. 8 there is shown a laser-ROV having a laser tether management system. Thus, support vessel 800 has a lifting device 808 and a lifting cable 809 that is affixed by connector 811 to and supporting a tether management system (TSM) 810. The support vessel 800 also has a spool for delivering electrical energy to the TMS 810 via electric cable 812. The TSM 810 has a laser-ROV system 801 that has a laser housing 802, a high power fiber 803 optically connecting a high power laser (not shown) in the laser housing 802 with an optical slip ring 806 on spool 804. Spool 804 has supports 805 that are connected to, or otherwise part of or affixed to, the frame 813 of the TMS 810. The spool 804 contains high power laser tether 807 that can be unwound as laser powered ROV 821 leaves the TSM 810 by way of opening 826. In this embodiment the laser powered ROV 821 has a laser cutter tool 822 that is also powered by the laser tether 807. (Although not shown, in this embodiment the laser tether may have two high power optical fibers or there may be a single optical fiber and a beam splitter, beam switch, or both, in the ROV to direct the laser energy to power the ROV and the laser cutting tool.)

In the illustration of FIG. 8 the TSM 810 and ROV 821 have been deployed by the support vessel on the surface 820 of the body of water 824. The TSM 810 is deployed at or near the seafloor 825, but a substantial horizontal distance away from the object 823 to be worked upon by the ROV's laser cutter. This distance from the TSM to the object could be about 500 ft or greater, about 1000 ft or greater, about 5000 ft or greater or about 10,000 feet or greater. The ROV will then move away from the TSM and toward the location of the object 823, which could be an underwater mine, explosive, listening device, or other type of military subsea equipment. Once in position the laser cutter could be fired disabling the object. However, if the ROV is at or near the object and it should explode during the disablement procedure the ROV could be destroyed or damaged. Thus, the laser cutting tool, or a portion of it can be affixed to the object, the ROV can then back away, while unwinding or otherwise playing out extra high power optical fiber that remains connected to the laser cutter on the object. In this way once the ROV is far enough removed from the object the laser can be fired without risk to the ROV.

Figure 9:
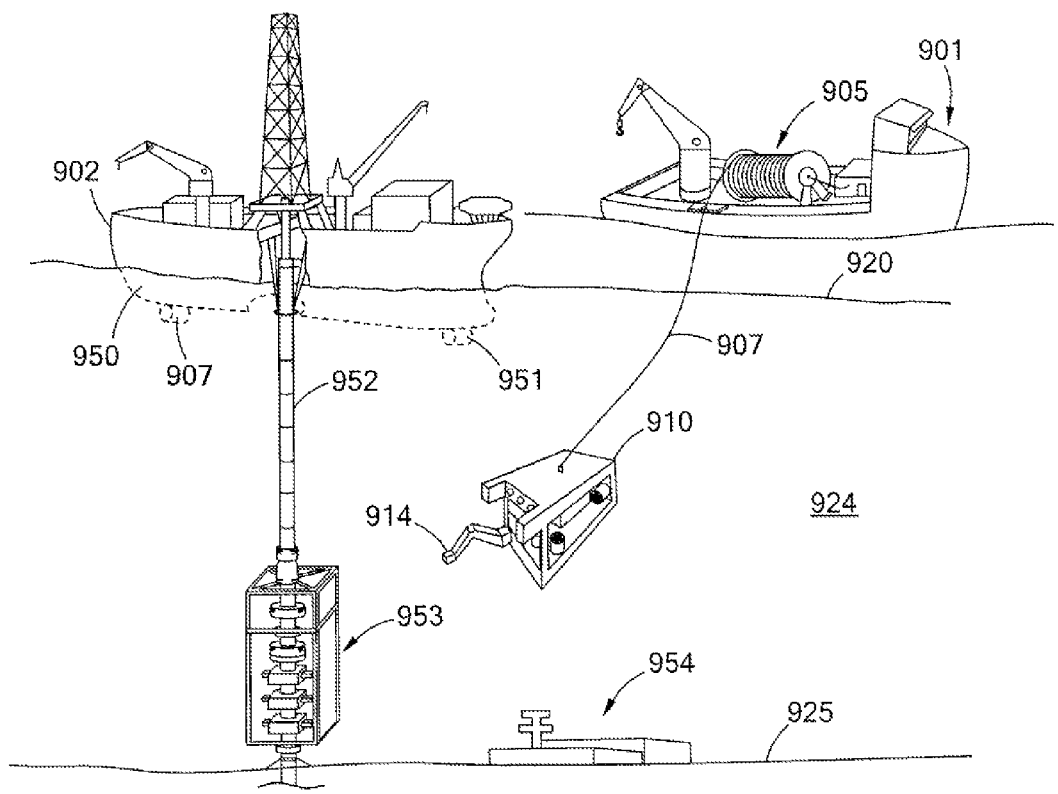
FIG. 9 is a perspective view of a laser subsea vehicle system of the present invention engaged in subsea laser operations in accordance with the present invention.

In FIG. 9 there is shown a work vessel having a laser-ROV system on station with a drilling rig. Support vessel 901 is on the surface 920 of a body of water 924 having a bottom or seafloor 925. The support vessel has a laser-ROV system 905, as described herein, and has deployed the laser-ROV 910 into the body of water 924. The laser-ROV is in optical communication, via laser tether 907, with a high power laser not shown in laser support system 905. The laser ROV has a laser cutting or cleaning tool 914 and is in the process of cleaning and/or maintaining subsea production equipment 954, and/or BOP 953, riser 952 and the submerged portions of the hull 950, and dynamic positioning thrusters 951 of drill ship 902.

Figure 10:
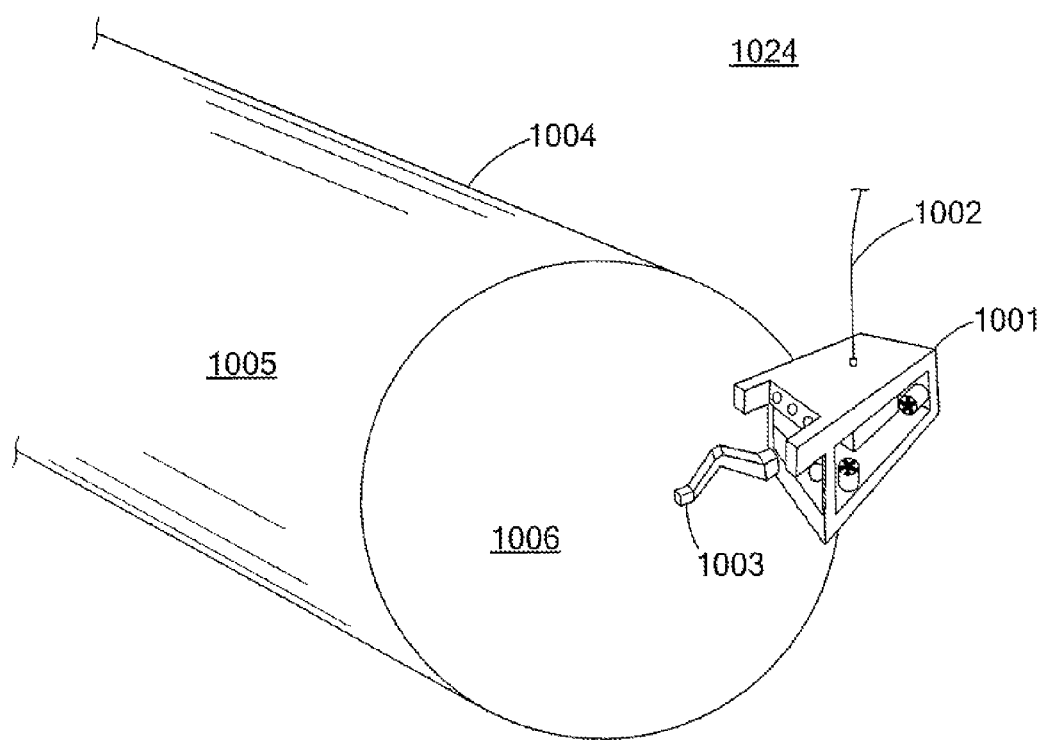
FIG. 10 is a perspective view of a laser subsea vehicle of the present invention engaged in subsea operations in accordance with the present invention.

In FIG. 10 there is illustrated another potential use for a laser-ROV. In this use the laser ROV 1001 having laser tether 1002 is being used to removed organisms, such as mussels from the interior 1006 and exterior 1004, of a subsea pipe 1005, that extends out into body of water 1024. This pipe 1005 could be for example an intake pipe for a power plant located along the Great Lakes in the US.

Figure 11:
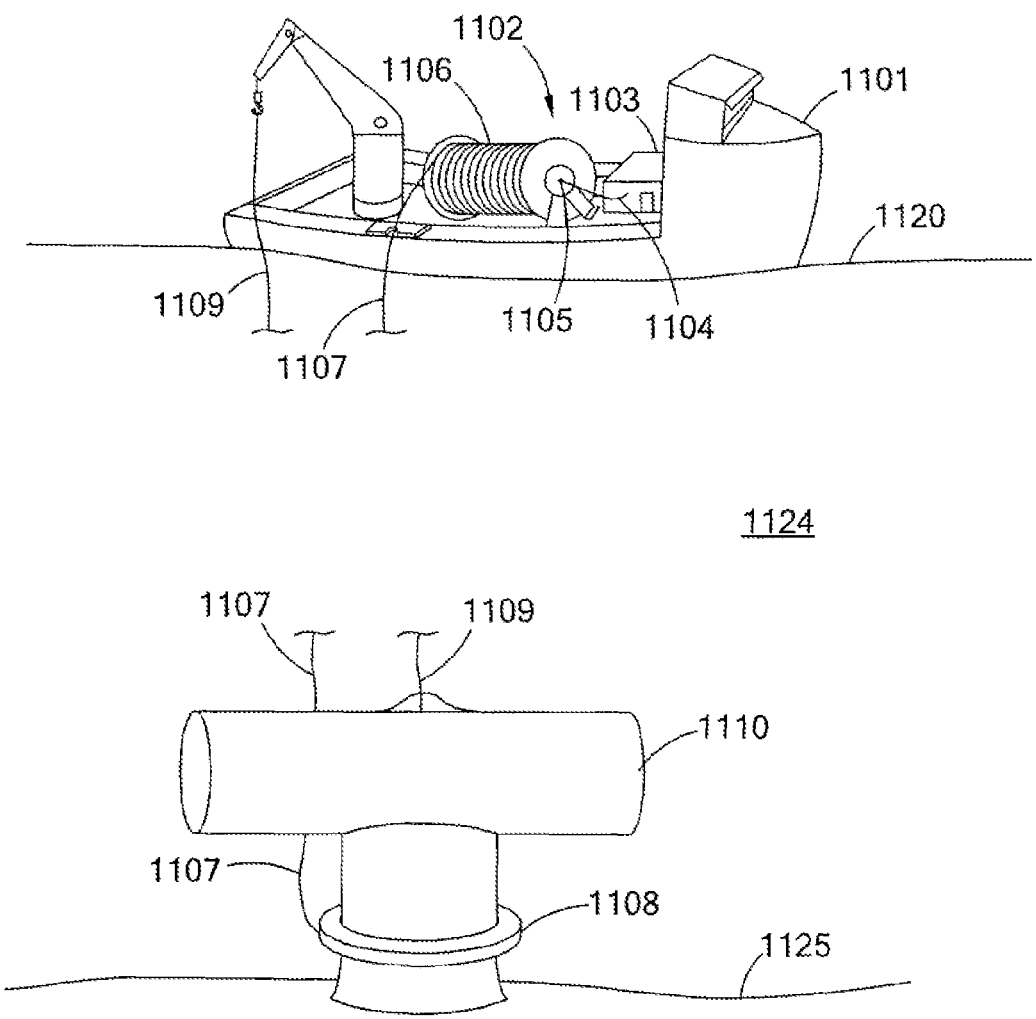
FIG. 11 is a perspective view of a laser subsea vehicle system in accordance with an embodiment of the present invention.

In FIG. 11 there is illustrated and example of an embodiment of a laser subsea equipment. Thus, there is provided a large subsea trencher 1110, such as for example Rotech T8000, which has had high power laser delivery assembly 1108, having high power laser cutters (not shown) added to it. The laser delivery assembly 1108 is optically connected to a high power laser in the laser housing 1103 of support vessel 1101 by laser tether 1107. The support vessel 1101 is on the surface 1120 of the body of water 1124, having seafloor 1125. The vessel 1101 has a high power laser system 1102, a high power laser housing 1103, a high power laser fiber 1104 optically connected to an optical slip ring 1105 wound on a spool 1106. There is also shown a support cable 1109 for trencher 1110. Other support cables for the trencher may be needed for its operation, which are not shown in this figure but are known to those of skill in the art.

In FIG. 12 there is shown and example of an embodiment of a laser subsea vehicle. There is shown a laser subsea tractor 1206, such as the SMD 2.4MW Rock Trencher, having a trenching tool 1207 that has a laser cutter 1208. The laser cutter is optically connected to the surface and a high power laser (not shown) in laser housing 1201 by high power optical tether 1205. There is also shown a spool 1203, an optical slip ring 1204 and a high power optical fiber 1202. The tractor is located on the seafloor 1225 of the body of water 1224 having a surface 1220 upon which the support vessel 1200 is positioned.

Although single laser cutters are shown, more or less may be employed. Further the positions of the laser cutters or laser cleaners with respect to the tool and the ROV may be varied.

The laser housing or room, e.g., 600 of the embodiment of FIG. 6, may be modular, that is, the room may be a self-contained unit such as a container used for shipping that has been fitted with electrical, communication and optical fittings. In this case, it is also preferable that the container has climate control features, e.g., heaters and air conditioners, built in or otherwise incorporated into the room. The laser room could be a structure that is integral to the support vessel, or it could be a combination of modular components and integral components. Any such structure will suffice and any placement, including on a separate laser vessel, or on shore, can be employed, provided that the laser equipment and operators are sufficiently protected from the offshore environmental and operating conditions, and that the laser system is readily capable of being integrated into, or with, the other systems of the laser-ROV.

The controller, e.g., 603 of the embodiment of FIG. 6, may be any type of processor, computer, programmed logic controller (PLC), or similar computer device having memory and a processor; that may be, or is, used for industrial, marine or factory automation and control. In the system the controller preferably should be in data and control communication with the laser-ROV.

The laser systems of for use with laser-ROVs, laser-subsea equipment, laser subsea vehicles, and other types of laser-tools and systems contemplated by this specification, may utilize a single high power laser, or they may have two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths preferably in about the 1550 nm (nanometer), or 1083 nm ranges. Examples of lasers, and in particular solid-state lasers, such as fibers lasers, are set forth in US Patent Application Publication Numbers 2010/0044106, 2010/0044105, 2010/0044104 and 2010/0215326 and in pending U.S. patent application Ser. Nos. 12/840,978, 13/210,581 and 61/493,174; the entire disclosures of each of which are incorporated herein by reference. Further diode lasers, and for example, such lasers having a wavelength of from about 0.9 microns to 2 microns may be utilized.

High powered optical cables, spools of such cables and assemblies of such cables of the type shown and disclosed in US patent application publications 2010/0044106, 2010/0044103, and 2010/0215326 and in pending U.S. patent application Ser. Nos. 12/840,978 and 13/210,581 may be used as high power laser tethers, the entire disclosure of each of which are incorporated herein by reference. Thus, the laser tether may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have other optical or metal fiber for the transmission of data and control information and signals; it may be any of the combinations set forth in the forgoing patents and combinations thereof. Further, these combinations may have material added or may themselves have materials selected to have a predetermined buoyancy for a particular application, which could be a variable buoyancy, a negative buoyancy, a positive buoyancy or a neutral buoyancy.

Table III provides a summary of potential operating conditions and configurations for an embodiment of a system for, utilizing a GaSb laser-PV assembly and a 1.5 micron diode laser, such as in an ROV.

TABLE III

| Power Available to ROV (We) | PV Power Output (We) | AC inverter | Power Conversion | Power Transmission (6 km) | OSR | Fiber Launch | Laser Input Power | Direct Diode Laser Efficiency | Electrical Input Power | Number of Fivers | PV Area (cm²) | Diameter of Circular PV (cm) | Cooling Pump Requirements (W) at PV |
|---|---|---|---|---|---|---|---|---|---|---|---|---|---|
| 869.6 | 1,000 | 90% | 40% | 71% | 94% | 98% | 3,688 | 25% | 14,751 | 1 | 48 | 7.8 | 130 |
| 1,739 | 2,000 | | | | | | 7,376 | | 29,503 | 1 | 97 | 11.1 | 261 |
| 2,609 | 3,000 | | | | | | 11,064 | | 44,254 | 2 | 145 | 13.6 | 391 |
| 3,478 | 4,000 | | | | | | 14,751 | | 59,006 | 2 | 193 | 15.7 | 522 |
| 4,348 | 5,000 | | | | | | 18,439 | | 73,757 | 2 | 242 | 17.5 | 652 |
| 5,217 | 6,000 | | | | | | 22,127 | | 88,508 | 3 | 290 | 19.2 | 783 |
| 6,087 | 7,000 | | | | | | 25,815 | | 103,260 | 3 | 338 | 20.8 | 913 |
| 6,957 | 8,000 | | | | | | 29,503 | | 118,011 | 3 | 386 | 22.2 | 1,043 |
| 7,826 | 9,000 | | | | | | 33,191 | | 132,763 | 4 | 435 | 23.5 | 1,174 |
| 8,696 | 10,000 | | | | | | 36,879 | | 147,514 | 4 | 483 | 24.8 | 1,304 |

The laser cutters and laser cleaners and laser delivery assemblies used for a laser tool with an ROV, subsea vehicle or subsea equipment, may be any suitable device for the delivery of high power laser energy. Thus, any configuration of optical elements for culminating and focusing the laser beam can be employed. A further consideration, however, is the management of the optical effects of fluids, e.g., sea water, mud or other material that may be located within the beam path between laser cutter and the structure to be cut.

Such fluids could include, by way of example, water, seawater, salt water, brine, drilling mud, nitrogen, inert gas, diesel, mist, foam, or hydrocarbons. There can also likely be present in these drilling fluids borehole cuttings, e.g., debris, which are being removed from, or created by, the advancement of the borehole or other downhole operations. There can be present two-phase fluids and three-phase fluids, which would constitute mixtures of two or three different types of material. These fluids can interfere with the ability of the laser beam to cut the tubular. Such fluids may not transmit, or may only partially transmit, the laser beam, and thus, interfere with, or reduce the power of, the laser beam when the laser beam is passed through them. If these fluids are flowing, such flow may further increase their non-transmissiveness. The non-transmissiveness and partial-transmissiveness of these fluids can result from several phenomena, including without limitation, absorption, refraction and scattering. Further, the non-transmissiveness and partial-transmissiveness can be, and likely will be, dependent upon the wavelength of the laser beam.

In particular, for those configurations and embodiments where the laser has a relatively long distance to travel, e.g., greater than about 1" or 2" (although this distance could be more or less depending upon laser power, wavelength and type of drilling fluid, as well as, other factors) it is advantageous to minimize the detrimental effects of such fluids and to substantially ensure, or ensure, that such fluids do not interfere with the transmission of the laser beam, or that sufficient laser power is used to overcome any losses that may occur from transmitting the laser beam through such fluids. To this end, mechanical, pressure and jet type systems may be utilized in conjunction with the ROV tool and/or as a part of the ROV tool to reduce, minimize or substantially eliminate the effect of the drilling fluids on the laser beam.

For example, mechanical devices may be used to isolate the area where the laser cut is to be performed and the fluid removed from this area of isolation, by way of example, through the insertion of an inert gas, or an optically transmissive fluid, such as an oil or diesel fuel. The use of a fluid in this configuration has the added advantage that it is essentially incompressible. Moreover, a mechanical snorkel like device, or tube, which is filled with an optically transmissive fluid (gas or liquid) may be extended between or otherwise placed in the area between the laser cutter and the structure to be cut. In this manner the laser beam is transmitted through the snorkel or tube to the structure.

A jet of high-pressure gas may be used with the laser cutter and laser beam. The high-pressure gas jet may be used to clear a path, or partial path for the laser beam. The gas may be inert, or it may be air, oxygen, or other type of gas that accelerates the laser cutting. The relatively small amount of oxygen needed, and the rapid rate at which it would be consumed by the burning of the tubular through the laser-metal-oxygen interaction, should not present a fire hazard or risk to the drilling rig, surface equipment, personnel, or subsea components.

The use of oxygen, air, or the use of very high power laser beams, e.g., greater than about 1 kW, could create and maintain a plasma bubble or a gas bubble in the cutting area, which could partially or completely displace the drilling fluid in the path of the laser beam.

A high-pressure laser liquid jet, having a single liquid stream, may be used with the laser cutter and laser beam. The liquid used for the jet should be transmissive, or at least substantially transmissive, to the laser beam. In this type of jet laser beam combination the laser beam may be coaxial with the jet. This configuration, however, has the disadvantage and problem that the fluid jet does not act as a waveguide. A further disadvantage and problem with this single jet configuration is that the jet must provide both the force to keep the drilling fluid away from the laser beam and be the medium for transmitting the beam.

A compound fluid laser jet may be used as a laser cutter. The compound fluid jet has an inner core jet that is surrounded by annular outer jets. The laser beam is directed by optics into the core jet and transmitted by the core jet, which functions as a waveguide. A single annular jet can surround the core, or a plurality of nested annular jets can be employed. As such, the compound fluid jet has a core jet. This core jet is surrounded by a first annular jet. This first annular jet can also be surrounded by a second annular jet; and the second annular jet can be surrounded by a third annular jet, which can be surrounded by additional annular jets. The outer annular jets function to protect the inner core jet from the drill fluid present in the annulus between the laser cutter and the structure to be cut. The core jet and the first annular jet should be made from fluids that have different indices of refraction. In the situation where the compound jet has only a core and an annular jet surrounding the core the index of refraction of the fluid making up the core should be greater than the index of refraction of the fluid making up the annular jet. In this way, the difference in indices of refraction enable the core of the compound fluid jet to function as a waveguide, keeping the laser beam contained within the core jet and transmitting the laser beam in the core jet. Further, in this configuration the laser beam does not appreciably, if at all, leave the core jet and enter the annular jet.

The pressure and the speed of the various jets that make up the compound fluid jet can vary depending upon the applications and use environment. Thus, by way of example the pressure can range from about 3000 psi, to about 4000 psi to about 30,000 psi, to preferably about 70,000 psi, to greater pressures. The core jet and the annular jet(s) may be the same pressure, or different pressures, the core jet may be higher pressure or the annular jets may be higher pressure. Preferably the core jet is higher pressure than the annular jet. By way of example, in a multi-jet configuration the core jet could be 70,000 psi, the second annular jet (which is positioned adjacent the core and the third annular jet) could be 60,000 psi and the third (outer, which is positioned adjacent the second annular jet and is in contact with the work environment medium) annular jet could be 50,000 psi. The speed of the jets can be the same or different. Thus, the speed of the core can be greater than the speed of the annular jet, the speed of the annular jet can be greater than the speed of the core jet and the speeds of multiple annular jets can be different or the same. The speeds of the core jet and the annular jet can be selected, such that the core jet does contact the drilling fluid, or such contact is minimized. The speeds of the jet can range from relatively slow to very fast and preferably range from about 1 ms (meters/second) to about 50 m/s, to about 200 m/s, to about 300 m/s and greater. The order in which the jets are first formed can be the core jet first, followed by the annular rings, the annular ring jet first followed by the core, or the core jet and the annular ring being formed simultaneously. To minimize, or eliminate, the interaction of the core with the drilling fluid, the annular jet is created first followed by the core jet.

In selecting the fluids for forming the jets and in determining the amount of the difference in the indices of refraction for the fluids the wavelength of the laser beam and the power of the laser beam are factors that should be considered. Thus, for example for a high power laser beam having a wavelength in the 1080 nm (nanometer) range the core jet can be made from an oil having an index of refraction of about 1.53 and the annular jet can be made from a mixture of oil and water having an index of refraction from about 1.33 to about 1.525. Thus, the core jet for this configuration would have an NA (numerical aperture) from about 0.95 to about 0.12, respectively. Further details, descriptions, and examples of such compound fluid laser jets are contained in U.S. Patent Application, Ser. No. 61/378,910 and in Ser. No. 13/222,931 (which claims the benefit of priority of Ser. No. 61/378,910), the entire disclosures of each of which are incorporated herein by reference.

The angle at which the laser beam contacts the structure to be cut may be determined by the optics within the laser cutter or it may be determined by the angle or positioning of the laser cutter itself. The laser cutters have a discharge end from which the laser beam is propagated. The laser cutters also have a beam path. The beam path is defined by the path that the laser beam is intended to take, and extends from the discharge end of the laser cutter to the material or area to be cut, e.g., the target area.

The laser tethers for the laser cutters provide the laser energy and other materials that are needed to perform the cutting operation. Although shown as a single cable multiple cables could be used. Thus, for example, in the case of a laser cutter employing a compound fluid laser jet the tether could include a high power optical fiber, a first line for the core jet fluid and a second line for the annular jet fluid. These lines could be combined into a single cable or they may be kept separate. Additionally, for example, if a laser cutter employing an oxygen jet is utilized, the cutter would need a high power optical fiber and an oxygen line. These lines could be combined into a single tether or they may be kept separate as multiple tethers. The lines and optical fibers should be covered in flexible protective coverings or outer sheaths to protect them from fluids, the subsea environment, and the movement of the laser cutters, while at the same time remaining flexible enough to accommodate the orbital movement of the laser cutters.

It is preferable that any feed-through assemblies in the subsea equipment for a high power laser fiber, the conduits, the support cables, the laser cutters and other subsea components associated with the operation of the laser systems and/or cutters and/or cleaners, should be constructed to meet the pressure requirements for the intended use. If some components do not meet the pressure requirements for a particular use, or if redundant protection is desired, such components may be contained in or enclosed by a structure that does meet the requirements. For deep and ultra-deep water uses the subsea laser system, cutter, and/or cleaner, components should preferably be capable of operating under pressures of 2,000 psi, 4,500 psi, 5,000 psi or greater. The materials, fittings, assemblies, useful to meet these pressure requirements are known to those of ordinary skill in the offshore drilling arts, related sub-sea ROV art, and in the high power laser art.

The laser cutter and/or cleaning tools of the present invention may be used with a laser powered ROV or they may be used with a convention ROV or other conventional subsea equipment, or with a land based system or a robotic device or system.

Further, the laser cutting and/or cleaning tools may be used as a stand-alone subsea tool, down hole tool, mining tool, cleaning tool or other tool for other or multiple applications. In one such embodiment the laser tool would be lowered from the surface by a hoisting device to the object or structure to be worked upon, e.g., cut, cleaned, bored, etc. The laser tool could then be operated by a diver, remotely operated, or operated by an ROV. For example, the stand-alone laser tool could be a cutting tool that is for example lowered to a damaged section of pipeline on the seafloor. The tool could further have cameras to assist in selecting the cutting location. The tool could be positioned from the surface at the point were the cut is too occur and then the laser cutter fired to cut the pipe. Additionally, a fixation device may be employed with the stand-alone tool, such as a grasping hook, magnetic attachment or similar means to hold the tool next to or from moving away from the work piece.

This type of stand-alone laser tool, may be a single laser cutter or laser delivery assembly, it may have multiple cutters, or it may have a ring like arrangement of multiple cutters in which the ring is attached around the structure or object to be cut, the laser cutters are fired, propagating their laser beams at the object to be cut, and the cutters and their respective beams are then rotated around the object to be cut. Thus, the configuration could be seen as the laser beams forming a pattern like the spokes of a wheel with the object to be cut located in the center of the wheel. Additionally, the cutters could have parallel beam paths and thus either the cutters could be moved across the object to be cut or the object itself could be moved through the parallel beam paths.

The laser cutters, either with an ROV or stand-alone may also have applications in various salvage operations. Thus, these laser tools could be used to cut open the hulls of sunken vessel to obtain access to their contents and done so in a much safer, less destructive and more controlled manner than using explosives. Further these laser tools could be used to cut and remove off shore structures that are required to be removed for environmental, aesthetic safety or any other reason. The laser tools provide safer, more controlled and more precise cutting than explosives and may be used for essentially any prior subsea cutting applications where explosives or shaped charges were or could be employed.

The high power cables and laser photovoltaic assemblies may further be used to power subsea structures or equipment such as a BOP.

Additionally, the subsea laser tool could be used to deliver a high power laser beam to a hydrate formation. Thus, the subsea laser tools and subsea laser devices can be used to manage, control, remove or otherwise eliminate hydrate formations on subsea structures and equipment.

Although many of the examples and discussion in this specification are directed towards ROVs and ROV mounted sub-sea laser cutters, it should be understood that these embodiments are illustrative of the present inventions. It being understood that the scope and application of the present inventions are not limited to ROVs, and are not limited to sub-sea applications. Thus, the present inventions may find applicability in, and the scope of protection would extend to, other laser tools, devices and applications, such as: robots; hydrocarbon and geothermal exploration, production and abandonment tools and activities, such as, drilling, workover, completion, decommissioning, plugging, flow control and abandonment; pipeline activities and related tools, such as, maintenance, testing repair, construction, removal and cleaning; military tools and applications; tools and applications relating to nuclear facilities and remediation; tools and applications relating to hazardous environments and remediation and other high power laser applications and uses that may be presently known or developed in the future.

The invention may be embodied in other forms than those specifically disclosed herein without departing from its spirit or essential characteristics. The described embodiments are to be considered in all respects only as illustrative and not restrictive.

What is claimed:

1. A high power offshore laser remotely operated vehicle system, for positing a remotely operated vehicle below a surface of a body of water to manage hydrate formation in a subsea structure, the system comprising:
    a. a submergible cage structure comprising an electric cable associated with a source of electrical power, and a lifting cable for lowering and raising the cage structure;
    b. the submergible cage structure retrievably housing a remotely operated vehicle, whereby, when submerged, the remotely operated vehicle is capable of exiting the cage structure to perform a laser operation and returning to the cage structure;
    c. a submergible laser housing, containing a high power laser for providing a high power laser beam having at least about 1 kW of power;
    d. the remotely operated vehicle comprising a laser beam deliver tool; and,
    e. a submergible optical fiber, optically connecting the laser beam delivery tool with the high power laser;
    f. wherein the cage structure housing the remotely operated vehicle is capable of being lowered below a surface of a body of water, the remotely operated vehicle is capable of exiting the submerged cage structure and delivering the high power laser beam to a subsea structure, whereby a hydrate formation associated with the subsea structure is reduced.

2. The system of claim 1, wherein the lifting cable and electric cable are contained in a tether.

3. The system of claim 1, wherein the high power laser beam has at least about 5 kW of power.

4. The system of claim 1, wherein the high power laser beam has a wavelength of at least 455 nm.

5. The system of claim 1, wherein the high power laser beam has a wavelength of at least 400 nm.

6. The system of claim 1, wherein the source of the high power laser beam is a diode laser.

7. The system of claim 5, wherein the source of the high power laser beam is a diode laser.

8. The system of claim 1, wherein the source of the high power laser beam is a semiconductor laser.

9. The system of claim 5, wherein the source of the high power laser beam is a semiconductor laser.

10. The system of claim 1, wherein the submergible laser housing is attached to the submergible cage structure.

11. A high power offshore remotely operated vehicle laser system, for positing a remotely operated vehicle below a surface of a body of water to perform a laser operation on a subsea structure without physically touching the subsea structure, the system comprising:
 a. a submergible cage structure comprising a tether associated with a source of electrical power;
 b. the submergible cage structure retrievably housing a ROV, whereby, when submerged, the remotely operated vehicle is capable of exiting the cage structure to perform a laser operation and returning to the cage structure;
 c. a submergible laser housing, containing a high power laser for providing a high power laser beam having a power of at least about 1 kW;
 d. the remotely operated vehicle comprising a laser beam deliver tool; and,
 e. an optical fiber, optically connecting the laser beam delivery tool with the the high power laser;
 f. wherein the cage structure housing the remotely operated vehicle is capable of being lowered below a surface of a body of water, the remotely operated vehicle is capable of exiting the submerged cage structure and delivering the high power laser beam to a subsea structure, whereby the laser operation is performed on the subsea structure without physically contacting the subsea structure.

12. The system of claim 11, wherein the high power laser beam has at least about 5 kW of power.

13. The system of claim 11, wherein the high power laser beam has a wavelength of at least 455 nm.

14. The system of claim 11, wherein the source of the high power laser beam is a semiconductor laser.

15. The system of claim 11, comprising a submergible spool containing at least a portion of the optical fiber.

16. The system of claim 11, wherein the submergible laser housing is attached to the submergible cage structure.

17. A high power offshore remotely operated vehicle laser system, for positing a remotely operated vehicle below a surface of a body of water to perform a laser operation on a subsea structure without physically touching the subsea structure, the system comprising:
 a. a deployment system comprising a tether, the tether connected to a remotely operated vehicle;
 b. a high power laser for providing a laser beam having a power of at least about 1 kW;
 c. the remotely operated vehicle comprising a laser beam deliver tool; and,
 d. an optical fiber, optically connecting the laser beam delivery tool with the high power laser, whereby the laser beam delivery tool is capable of delivering the laser beam to a subsea structure;
 e. wherein the the remotely operated vehicle is capable of being positioned below a surface of a body of water and delivering the high power laser beam to the subsea structure, whereby a laser operation is performed on the subsea structure without physically contacting the subsea structure.

18. The system of claim 17, wherein the laser operation is the elimination of a hydrate formation.

19. The system of claim 17, wherein the laser operation is the management of hydrate formation.

20. The system of claim 17, wherein the laser operation is the control of hydrate formation.

21. The system of claim 17, wherein the high power laser beam has a wavelength of at least 400 nm.

22. The system of claim 20, wherein the high power laser beam has a wavelength of at least 400 nm.

23. The system of claim 17, wherein the source of the high power laser beam is a diode laser.

24. The system of claim 20, wherein the source of the high power laser beam is a diode laser.

25. The system of claim 21, wherein the source of the high power laser beam is a diode laser.

26. The system of claim 17, wherein the source of the high power laser beam is a semiconductor laser.

27. The system of claim 20, wherein the source of the high power laser beam is a semiconductor laser.

28. The system of claim 21, wherein the source of the high power laser beam is a semiconductor laser.

29. A high power subsea laser subsea structure treatment system comprising:
 a. an offshore support vessel;
 b. a subsea laser assembly comprising a subsea high power laser, the high power laser capable of propagating at least a 1 kW laser beam;
 c. a subsea umbilical having a distal end and a proximal end defining a length there between;
 d. a high power optical fiber;
 e. a subsea remotely operated vehicle comprising a laser delivery tool;
 f. an umbilical handling device;
 g. the support vessel comprising a subsea laser assembly handling device, wherein the subsea laser assembly can be deployed from the vessel; and,
 h. a proximal end of the optical fiber in optical communication with the high power laser and a distal end of the optical fiber in optical communication with the laser delivery tool.

30. A method of performing a subsea laser operation on an offshore structure, the method comprising:
 a. deploying a remotely operated vehicle into a body of water, the remotely operated vehicle comprising a laser delivery tool in optical communication with a high power laser;
 b. positing the remotely operated vehicle below a surface of the body of water adjacent to an offshore structure;
 c. positioning the laser delivery tool to direct a laser beam to the offshore structure;
 d. providing a high power laser beam having a power of at least about 1 kW from the high power laser to the laser delivery tool, and delivering the high power laser beam from the laser delivery tool to the offshore structure; and,
 e. the laser beam performing a laser operation on the offshore structure without damaging the offshore structure.

31. The method of claim 30, wherein the offshore structure is a subsea structure.

32. The method of claim 31, wherein the laser operation is the elimination of a hydrate formation.

33. The method of claim 31, wherein the laser operation is the management of hydrate formation.

34. The method of claim 31, wherein the laser operation is the control of hydrate formation.

35. The system of claim 1, wherein the remotely operated vehicle comprises a sensor.

36. The system of claim 11, wherein the remotely operated vehicle comprises a sensor.

37. The system of claim 17, wherein the remotely operated vehicle comprises a sensor.

38. The system of claim 29, wherein the subsea remotely operated vehicle comprises a sensor.

* * * * *